(12) United States Patent
Kuzuhara et al.

(10) Patent No.: US 9,274,326 B2
(45) Date of Patent: Mar. 1, 2016

(54) ZOOM LENS SYSTEM, IMAGING DEVICE AND CAMERA

(75) Inventors: Satoshi Kuzuhara, Hyogo (JP); Yoshio Matsumura, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 138 days.

(21) Appl. No.: 13/440,998

(22) Filed: Apr. 6, 2012

(65) Prior Publication Data

US 2012/0257285 A1 Oct. 11, 2012

(30) Foreign Application Priority Data

Apr. 7, 2011 (JP) ................................. 2011-085145
Feb. 21, 2012 (JP) ................................. 2012-035346

(51) Int. Cl.
*G02B 15/14* (2006.01)
*G02B 15/177* (2006.01)

(52) U.S. Cl.
CPC .................................... *G02B 15/177* (2013.01)

(58) Field of Classification Search
CPC .................................................... G02B 15/177
USPC .................................................. 359/686, 680
See application file for complete search history.

(56) References Cited

U.S. PATENT DOCUMENTS

2009/0231708 A1* 9/2009 Shibata et al. ................ 359/686
2010/0195216 A1* 8/2010 Miyazaki et al. ............. 359/686

FOREIGN PATENT DOCUMENTS

| JP | 2001-318314 A | 11/2001 |
| JP | 2001-343587 A | 12/2001 |
| JP | 2002-014285 A | 1/2002 |
| JP | 2002-023053 A | 1/2002 |
| JP | 2003-021783 A | 1/2003 |
| JP | 2004-271937 A | 9/2004 |
| JP | 2005-266181 A | 9/2005 |
| JP | 2005-352428 A | 12/2005 |
| JP | 2006-113554 A | 4/2006 |
| JP | 2006-343554 A | 12/2006 |
| JP | 2007-065514 A | 3/2007 |
| JP | 2007-108696 A | 4/2007 |
| JP | 2007-233045 A | 9/2007 |
| JP | 2008-033212 A | 2/2008 |
| JP | 2008-040485 A | 2/2008 |
| JP | 2008-096787 A | 4/2008 |
| JP | 2008-197176 A | 8/2008 |
| JP | 2008-209727 A | 9/2008 |
| JP | 2008-304777 A | 12/2008 |
| JP | 2009-156905 A | 7/2009 |

(Continued)

*Primary Examiner* — Alicia M Harrington
(74) *Attorney, Agent, or Firm* — James W. Judge

(57) ABSTRACT

A zoom lens system, in order from an object side to an image side, comprising: a first lens unit having negative optical power; a second lens unit having positive optical power; a third lens unit having negative optical power; and a fourth lens unit having positive optical power, wherein the third lens unit is composed of two or less lens elements, the fourth lens unit is composed of two or less lens elements, the first lens unit has at least one air space between lens elements constituting the first lens unit, and the condition: $D_{air}/f_W > 0.75$ ($D_{air}$: an air space located on the most object side in the first lens unit, $f_W$: a focal length of the entire system at a wide-angle limit) is satisfied; an imaging device; and a camera are provided.

19 Claims, 34 Drawing Sheets

(56) References Cited

FOREIGN PATENT DOCUMENTS

| | | |
|---|---|---|
| JP | 2009-210741 A | 9/2009 |
| JP | 2009-216941 A | 9/2009 |
| JP | 2009-229516 A | 10/2009 |
| JP | 2009-244473 A | 10/2009 |
| JP | 2010-079311 A | 4/2010 |
| JP | 2010-122625 A | 6/2010 |
| JP | 2010-139831 A | 6/2010 |
| JP | 2010-152147 A | 7/2010 |
| JP | 2010-160276 A | 7/2010 |
| JP | 2010-181518 A | 8/2010 |
| JP | 2010-186010 A | 8/2010 |
| JP | 2010-249873 A | 11/2010 |

* cited by examiner

ZOOM LENS SYSTEM, IMAGING DEVICE AND CAMERA

CROSS-REFERENCE TO RELATED APPLICATION

This application is based on application No. 2011-085145 filed in Japan on Apr. 7, 2011 and application No. 2012-035346 filed in Japan on Feb. 21, 2012, the contents of which are hereby incorporated by reference.

BACKGROUND OF THE INVENTION

1. Field of the Invention

The present invention relates to zoom lens systems, imaging devices, and cameras. In particular, the present invention relates to: a zoom lens system in which even in a configuration that the overall length of lens system is short and the size is small, a wide view angle at a wide-angle limit and a high zooming ratio are obtained and still quick focusing is achieved and, in particular, high optical performance is obtained even in a close-object in-focus condition; an imaging device employing this zoom lens system; and a thin and compact camera employing this imaging device.

2. Description of the Background Art

In the conventional art, in cameras such as digital still cameras and digital video cameras employing an image sensor for photoelectric conversion (simply referred to as digital cameras, hereinafter), increasing demands are present for size reduction and performance improvement.

As zoom lens systems to be employed in digital cameras in which size reduction and performance improvement are achieved as described above, for example, various kinds of zoom lenses having at least a two-unit construction of negative and positive have been proposed in which a first lens unit having negative optical power and a second lens unit having positive optical power are arranged in order from the object side to the image side.

Japanese Laid-Open Patent Publication No. 2005-352428 discloses a zoom lens having a four-unit construction of negative, positive, negative, and positive and achieving magnification change by changing air spaces between individual lens units, wherein in zooming from a wide-angle limit to a telephoto limit, the interval between the first lens unit and the second lens unit is changed so that magnification change is achieved, and wherein the first lens unit is composed of three lenses, the second lens unit is composed of four lenses, the third lens unit is composed of three lenses, and the fourth lens unit is composed of one lens.

Japanese Laid-Open Patent Publication No. 2008-197176 discloses a zoom lens having a four-unit construction of negative, positive, negative, and positive and achieving magnification change by changing air spaces between individual lens units, wherein in zooming from a wide-angle limit to a telephoto limit, the interval between the first lens unit and the second lens unit is changed so that magnification change is achieved, and wherein the first lens unit is composed of three lenses, the second lens unit is composed of three lenses, the third lens unit is composed of three lenses, and the fourth lens unit is composed of one lens.

Japanese Laid-Open Patent Publication No. 2010-122625 discloses a zoom lens having a three-unit construction of negative, positive, and positive and achieving magnification change by changing air spaces between individual lens units, wherein in zooming from a wide-angle limit to a telephoto limit, the interval between the first lens unit and the second lens unit is changed so that magnification change is achieved, and wherein the first lens unit is composed of two lenses, the second lens unit is composed of three lenses, and the third lens unit is composed of one lens.

Nevertheless, each of the zoom lenses disclosed in Japanese Laid-Open Patent Publication Nos. 2005-352428 and 2008-197176 includes ten or more lenses. This causes a high lens cost and further an increased overall length of lens system. Thus, requirements for digital cameras in recent years are not satisfied.

The zoom lens disclosed in Japanese Laid-Open Patent Publication No. 2010-122625 has lenses in a number as small as six, but still has an increased overall length of lens system. Thus, requirements for digital cameras in recent years are similarly not satisfied.

SUMMARY OF THE INVENTION

An object of the present invention is to provide: a zoom lens system in which even in a configuration that the overall length of lens system is short and the size is small, a wide view angle at a wide-angle limit and a high zooming ratio are obtained and still high optical performance is obtained; an imaging device employing this zoom lens system; and a thin and compact camera employing this imaging device.

(I) The novel concepts disclosed herein were achieved in order to solve the foregoing problems in the conventional art, and herein is disclosed:

a zoom lens system having a plurality of lens units, each lens unit being composed of at least one lens element, the zoom lens system, in order from an object side to an image side, comprising:

a first lens unit having negative optical power;
a second lens unit having positive optical power;
a third lens unit having negative optical power; and
a fourth lens unit having positive optical power, wherein
the third lens unit is composed of two or less lens elements,
the fourth lens unit is composed of two or less lens elements,
the first lens unit has at least one air space between lens elements constituting the first lens unit, and
the following condition (1) is satisfied:

$$D_{air}/f_W > 0.75 \quad (1)$$

where,
$D_{air}$ is an air space located on the most object side in the first lens unit, and
$f_W$ is a focal length of the entire system at a wide-angle limit.

The novel concepts disclosed herein were achieved in order to solve the foregoing problems in the conventional art, and herein is disclosed:

an imaging device capable of outputting an optical image of an object as an electric image signal, comprising:

a zoom lens system that forms an optical image of the object; and an image sensor that converts the optical image formed by the zoom lens system into the electric image signal, wherein the zoom lens system is a zoom lens system having a plurality of lens units, each lens unit being composed of at least one lens element, the zoom lens system, in order from an object side to an image side, comprising:

a first lens unit having negative optical power;
a second lens unit having positive optical power;
a third lens unit having negative optical power; and
a fourth lens unit having positive optical power, wherein
the third lens unit is composed of two or less lens elements, the fourth lens unit is composed of two or less lens elements, the first lens unit has at least one air space between lens elements constituting the first lens unit, and the following condition (1) is satisfied:

$$D_{air}/f_W > 0.75 \tag{1}$$

where, $D_{air}$ is an air space located on the most object side in the first lens unit, and $f_W$ is a focal length of the entire system at a wide-angle limit.

The novel concepts disclosed herein were achieved in order to solve the foregoing problems in the conventional art, and herein is disclosed:

a camera for converting an optical image of an object into an electric image signal and then performing at least one of displaying and storing of the converted image signal, comprising an imaging device including a zoom lens system that forms an optical image of the object and an image sensor that converts the optical image formed by the zoom lens system into the electric image signal, wherein the zoom lens system is a zoom lens system having a plurality of lens units, each lens unit being composed of at least one lens element, the zoom lens system, in order from an object side to an image side, comprising:

a first lens unit having negative optical power;
a second lens unit having positive optical power;
a third lens unit having negative optical power; and
a fourth lens unit having positive optical power, wherein
the third lens unit is composed of two or less lens elements,
the fourth lens unit is composed of two or less lens elements, the first lens unit has at least one air space between lens elements constituting the first lens unit, and the following condition (1) is satisfied:

$$D_{air}/f_W > 0.75 \tag{1}$$

where, $D_{air}$ is an air space located on the most object side in the first lens unit, and $f_W$ is a focal length of the entire system at a wide-angle limit.

(II) The novel concepts disclosed herein were achieved in order to solve the foregoing problems in the conventional art, and herein is disclosed:

a zoom lens system having a plurality of lens units, each lens unit being composed of at least one lens element, the zoom lens system, in order from an object side to an image side, comprising:

a first lens unit having negative optical power;
a second lens unit having positive optical power; and
at least one subsequent lens unit, wherein in zooming from a wide-angle limit to a telephoto limit at the time of image taking, at least three lens units among the lens units individually move along an optical axis so that magnification change is achieved, a lens unit located on the most image side among the lens units belonging to the subsequent lens units is composed of two or less lens elements, the first lens unit is composed of three or less lens elements including a lens element having positive optical power and a lens element having negative optical power, and has at least one air space between lens elements constituting the first lens unit, and the following conditions (1), (2), and (3) are satisfied:

$$D_{air}/f_W > 0.75 \tag{1}$$

$$D_{air} \times \tan(\omega_W/2)/f_{G1} < -0.23 \tag{2}$$

$$D_{back}/f_W < 1.50 \tag{3}$$

where, $D_{air}$ is an air space located on the most object side in the first lens unit, $f_W$ is a focal length of the entire system at a wide-angle limit, $\omega_W$ is a half value of a maximum view angle)(°) at a wide-angle limit, $f_{G1}$ is a focal length of the first lens unit, and $D_{back}$ is a distance from an image side surface of a lens element located on the most image side in the entire system to an image surface.

The novel concepts disclosed herein were achieved in order to solve the foregoing problems in the conventional art, and herein is disclosed:

an imaging device capable of outputting an optical image of an object as an electric image signal, comprising:

a zoom lens system that forms an optical image of the object; and an image sensor that converts the optical image formed by the zoom lens system into the electric image signal, wherein the zoom lens system is a zoom lens system having a plurality of lens units, each lens unit being composed of at least one lens element, the zoom lens system, in order from an object side to an image side, comprising:

a first lens unit having negative optical power;
a second lens unit having positive optical power; and
at least one subsequent lens unit, wherein in zooming from a wide-angle limit to a telephoto limit at the time of image taking, at least three lens units among the lens units individually move along an optical axis so that magnification change is achieved, a lens unit located on the most image side among the lens units belonging to the subsequent lens units is composed of two or less lens elements, the first lens unit is composed of three or less lens elements including a lens element having positive optical power and a lens element having negative optical power, and has at least one air space between lens elements constituting the first lens unit, and the following conditions (1), (2), and (3) are satisfied:

$$D_{air}/f_W > 0.75 \tag{1}$$

$$D_{air} \times \tan(\omega_W/2)/f_{G1} < -0.23 \tag{2}$$

$$D_{back}/f_W < 1.50 \tag{3}$$

where, $D_{air}$ is an air space located on the most object side in the first lens unit, $f_W$ is a focal length of the entire system at a wide-angle limit, $\omega_W$ is a half value of a maximum view angle)(°) at a wide-angle limit, $f_{G1}$ is a focal length of the first lens unit, and $D_{back}$ is a distance from an image side surface of a lens element located on the most image side in the entire system to an image surface.

The novel concepts disclosed herein were achieved in order to solve the foregoing problems in the conventional art, and herein is disclosed:

a camera for converting an optical image of an object into an electric image signal and then performing at least one of displaying and storing of the converted image signal, comprising an imaging device including a zoom lens system that forms an optical image of the object and an image sensor that converts the optical image formed by the zoom lens system into the electric image signal, wherein the zoom lens system is a zoom lens system having a plurality of lens units, each lens unit being composed of at least one lens element, the zoom lens system, in order from an object side to an image side, comprising:

a first lens unit having negative optical power;
a second lens unit having positive optical power; and
at least one subsequent lens unit, wherein
in zooming from a wide-angle limit to a telephoto limit at the time of image taking, at least three lens units among the lens units individually move along an optical axis so that magnification change is achieved, a lens unit located on the most image side among the lens units belonging to the subsequent lens units is composed of two or less lens elements, the first lens unit is composed of three or less lens elements including a lens element having positive optical power and a lens element having negative optical power, and has at least one air space between lens elements constituting the first lens unit, and the following conditions (1), (2), and (3) are satisfied:

$$D_{air}/f_W > 0.75 \quad (1)$$

$$D_{air} \times \tan(\omega_W/2)/f_{G1} < -0.23 \quad (2)$$

$$D_{back}/f_W < 1.50 \quad (3)$$

where, $D_{air}$ is an air space located on the most object side in the first lens unit, $f_W$ is a focal length of the entire system at a wide-angle limit, $\omega_W$ is a half value of a maximum view angle)(°) at a wide-angle limit, $f_{G1}$ is a focal length of the first lens unit, and $D_{back}$ is a distance from an image side surface of a lens element located on the most image side in the entire system to an image surface.

The present invention provides: a zoom lens system in which even in a configuration that the overall length of lens system is short and the size is small, a wide view angle at a wide-angle limit and a high zooming ratio are obtained and still quick focusing is achieved and, in particular, high optical performance is obtained even in a close-object in-focus condition; an imaging device employing this zoom lens system; and a thin and compact camera employing this imaging device.

BRIEF DESCRIPTION OF THE DRAWINGS

This and other objects and features of this invention will become clear from the following description, taken in conjunction with the preferred embodiments with reference to the accompanied drawings in which.

DESCRIPTION OF THE PREFERRED EMBODIMENTS

Embodiments 1 to 11

FIGS. 1, 4, 7, 10, 13, 16, 19, 22, 25, 28, and 31 are lens arrangement diagrams of zoom lens systems according to Embodiments 1 to 11, respectively.

Each of FIGS. 1, 4, 7, 10, 13, 16, 19, 22, 25, 28, and 31 shows a zoom lens system in an infinity in-focus condition. In each FIG., part (a) shows a lens configuration at a wide-angle limit (in the minimum focal length condition: focal length $f_W$), part (b) shows a lens configuration at a middle position (in an intermediate focal length condition: focal length $f_M = \sqrt{(f_W * f_T)}$), and part (c) shows a lens configuration at a telephoto limit (in the maximum focal length condition: focal length $f_T$). Further, in each FIG., an arrow of straight or curved line provided between part (a) and part (b) indicates the movement of each lens unit from a wide-angle limit through a middle position to a telephoto limit. Moreover, in each FIG., an arrow imparted to a lens unit indicates focusing from an infinity in-focus condition to a close-object in-focus condition. That is, the arrow indicates the moving direction at the time of focusing from an infinity in-focus condition to a close-object in-focus condition.

The zoom lens system according to each embodiment, in order from the object side to the image side, comprises at least: a first lens unit G1 having negative optical power; and a second lens unit G2 having positive optical power. Then, in zooming, at least these first lens unit G1 and second lens unit G2 individually move in a direction along the optical axis such that at least the interval between the first lens unit G1 and the second lens unit G2 varies. In the zoom lens system according to each embodiment, lens units are arranged in a desired optical power configuration, thereby achieving size reduction of the entire lens system while maintaining high optical performance.

Further, in FIGS. 1, 4, 7, 10, 13, 16, 19, 22, 25, 28, and 31, an asterisk "*" imparted to a particular surface indicates that the surface is aspheric. In each FIG., symbol (+) or (−) imparted to the symbol of each lens unit corresponds to the sign of the optical power of the lens unit. Further, in each FIG., a straight line located closest to the right-hand side indicates the position of the image surface S. On the object side of the image surface S (FIGS. 1, 4, 7, 10, 19, 22, 25, and 31: between the image surface S and the most image side lens surface of the fourth lens unit G4, FIGS. 13 and 16: between the image surface S and the most image side lens surface of the third lens unit G3, FIG. 28: between the image surface S and the most image side lens surface of the fifth lens unit G5), a plane parallel plate P equivalent to an optical low-pass filter or a face plate of an image sensor is provided.

Figure 19:
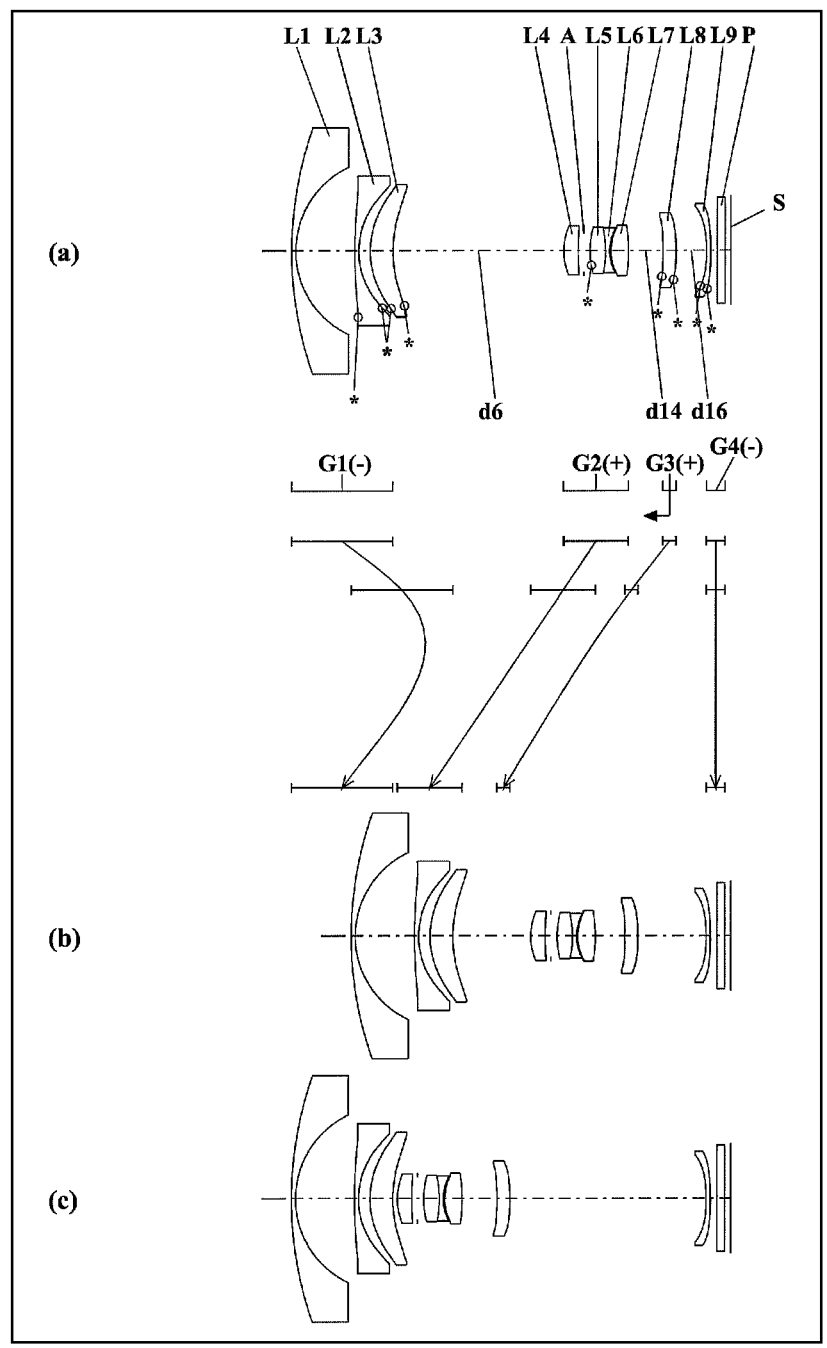
FIG. 19 is a lens arrangement diagram showing an infinity in-focus condition of a zoom lens system according to Embodiment 7 (Example 7)
Figure 20:
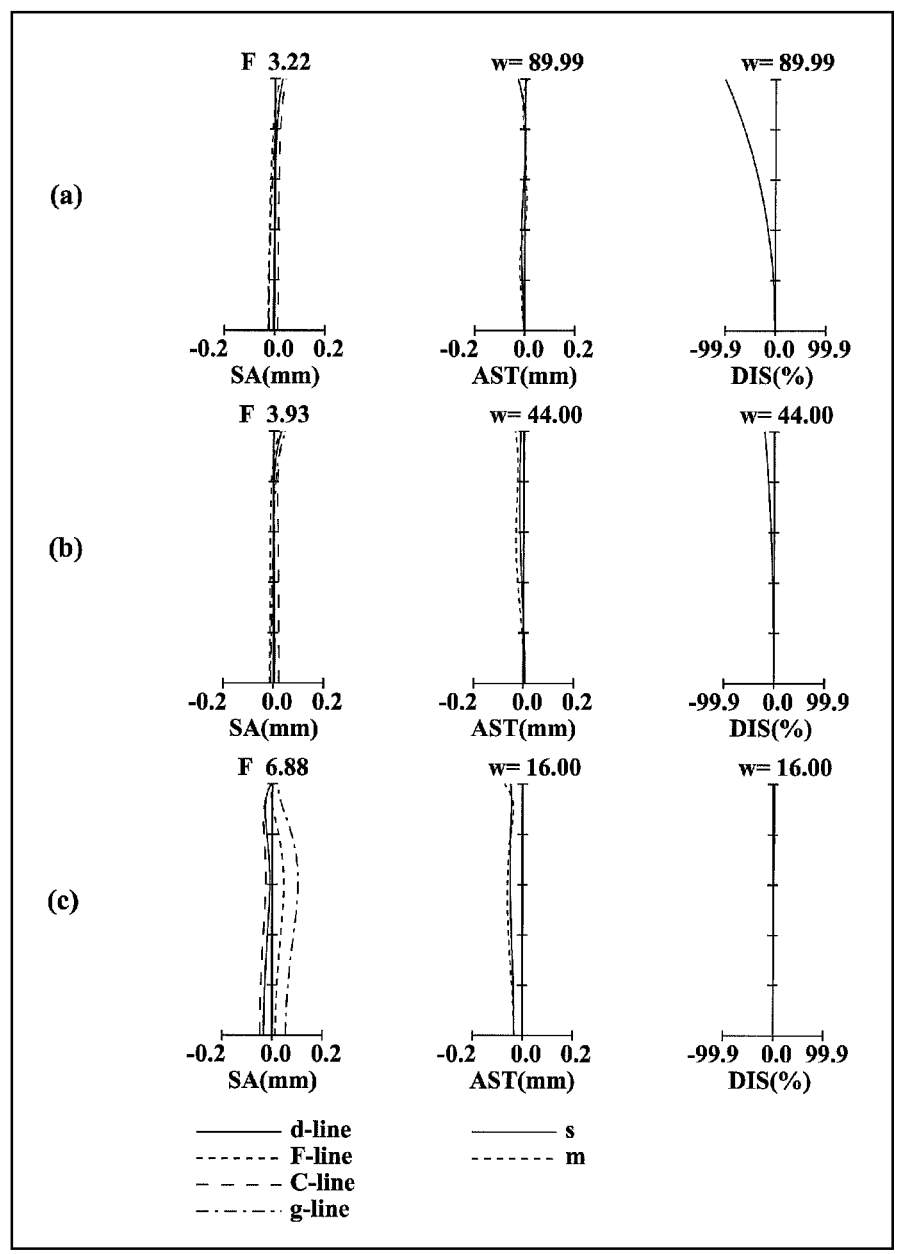
FIG. 20 is a longitudinal aberration diagram of an infinity in-focus condition of a zoom lens system according to Example 7.
Figure 21:
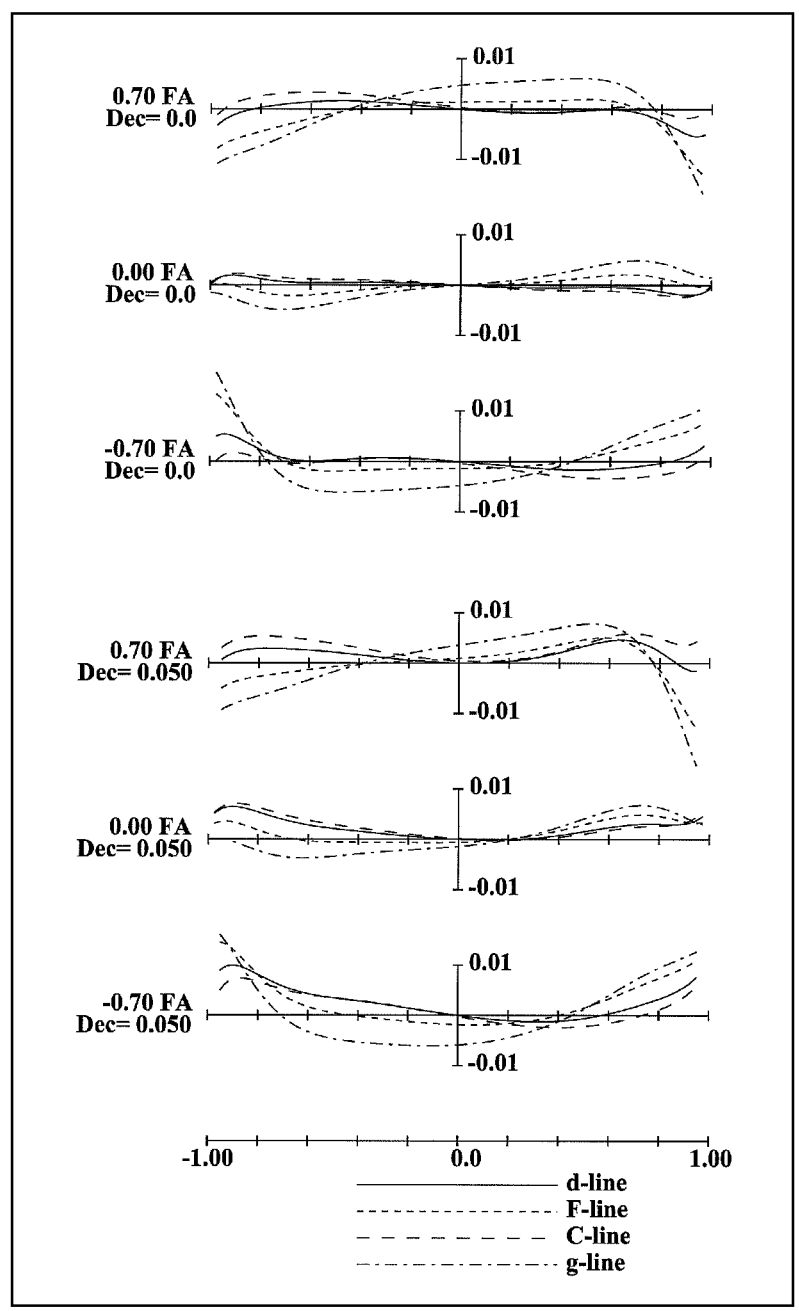
FIG. 21 is a lateral aberration diagram of a zoom lens system according to Example 7 at a telephoto limit in a basic state where image blur compensation is not performed and in an image blur compensation state.

Further, in FIGS. 1, 4, 7, 10, 13, 16, 22, 25, 28, and 31, an aperture diaphragm A is provided closest to the object side in the second lens unit G2, i.e., between the first lens unit G1 and the second lens unit G2. In FIG. 19, an aperture diaphragm A is provided in the second lens unit G2.

Figure 1:
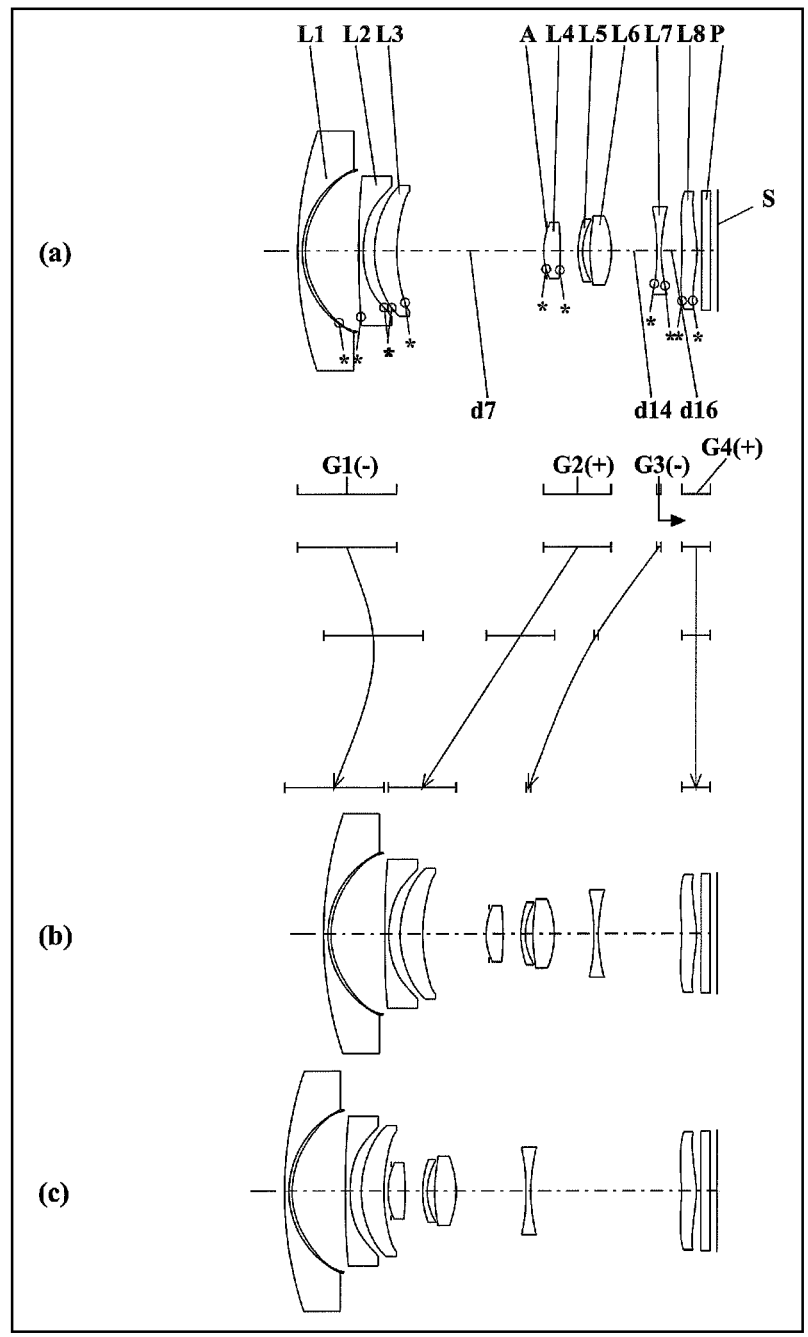
FIG. 1 is a lens arrangement diagram showing an infinity in-focus condition of a zoom lens system according to Embodiment 1 (Example 1)
Figure 2:
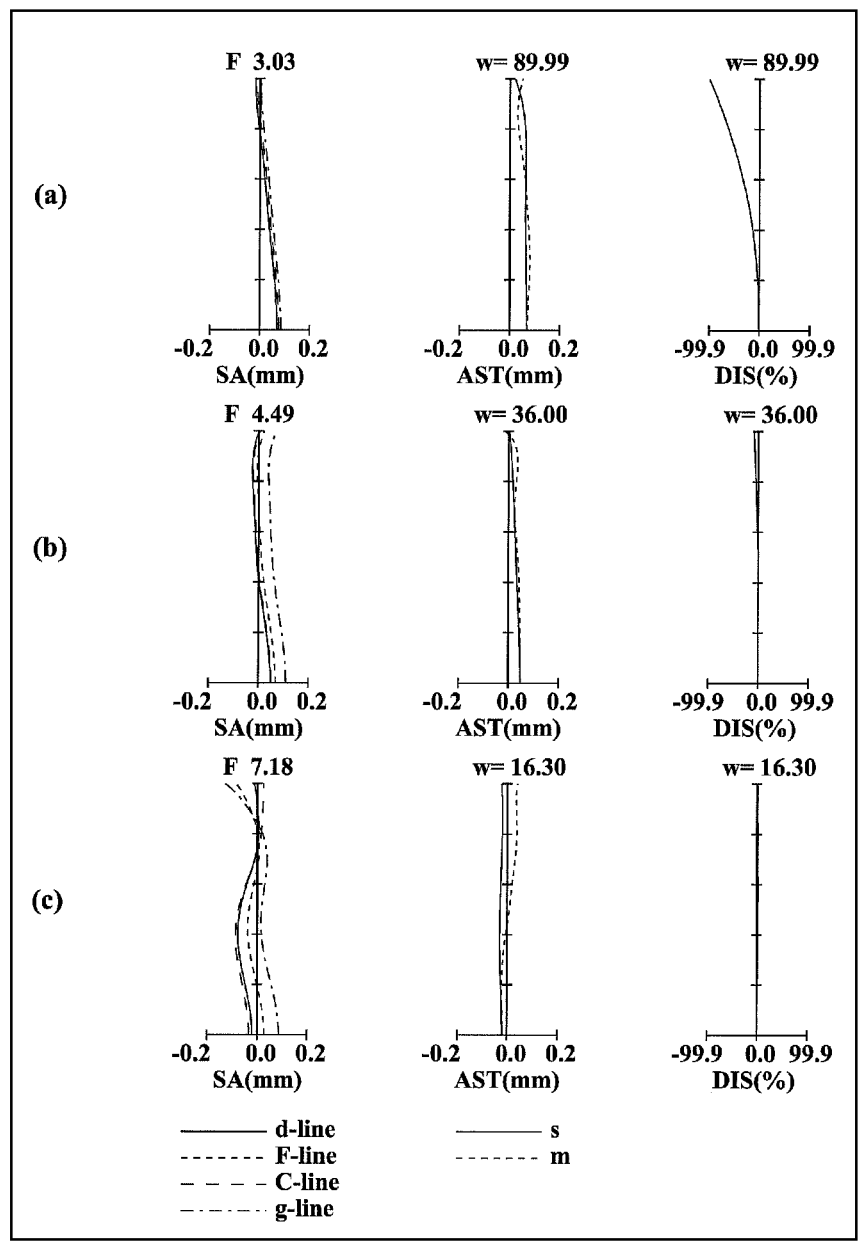
FIG. 2 is a longitudinal aberration diagram of an infinity in-focus condition of a zoom lens system according to Example 1.

As shown in FIG. 1, the zoom lens system according to Embodiment 1, in order from the object side to the image side, comprises: a first lens unit G1 having negative optical power; a second lens unit G2 having positive optical power; a third lens unit G3 having negative optical power; and a fourth lens unit G4 having positive optical power.

In the zoom lens system according to Embodiment 1, the first lens unit G1, in order from the object side to the image side, comprises: a negative meniscus first lens element L1 with the convex surface facing the object side; a negative meniscus second lens element L2 with the convex surface facing the object side; and a positive meniscus third lens element L3 with the convex surface facing the object side. Among these, an image side surface of the first lens element L1 is provided with a resin layer having an aspheric shape. Further, the second lens element L2 has two aspheric surfaces, and the third lens element L3 has two aspheric surfaces.

In the zoom lens system according to Embodiment 1, the second lens unit G2, in order from the object side to the image side, comprises: a bi-convex fourth lens element L4; a negative meniscus fifth lens element L5 with the convex surface facing the object side; and a bi-convex sixth lens element L6. The fourth lens element L4 has two aspheric surfaces.

In the zoom lens system according to Embodiment 1, the third lens unit G3 comprises solely a bi-concave seventh lens element L7. The seventh lens element L7 has two aspheric surfaces.

In the zoom lens system according to Embodiment 1, the fourth lens unit G4 comprises solely a positive meniscus eighth lens element L8 with the convex surface facing the image side. The eighth lens element L8 has two aspheric surfaces.

In the zoom lens system according to Embodiment 1, on the object side relative to the second lens unit G2 (i.e., between the third lens element L3 and the fourth lens element L4), an aperture diaphragm A is provided. On the object side relative to the image surface S (i.e., between the image surface S and the eighth lens element L8), a plane parallel plate P is provided.

In the zoom lens system according to Embodiment 1, in zooming from a wide-angle limit to a telephoto limit at the time of image taking, the first lens unit G1 moves to the object side with locus of a convex to the image side, the second lens unit G2 monotonically moves to the object side, the third lens unit G3 monotonically moves to the object side, and the fourth lens unit G4 is fixed relative to the image surface S. That is, in zooming, the first lens unit G1, the second lens unit G2, and the third lens unit G3 individually move along the optical axis such that the interval between the first lens unit G1 and the second lens unit G2 should decrease, the interval between the second lens unit G2 and the third lens unit G3 should temporarily decrease and then increase, and the interval between the third lens unit G3 and the fourth lens unit G4 should increase. Further, in zooming from a wide-angle limit to a telephoto limit at the time of image taking, the aperture diaphragm A moves along the optical axis together with the second lens unit G2.

In the zoom lens system according to Embodiment 1, in focusing from an infinity in-focus condition to a close-object in-focus condition, the third lens unit G3 moves to the image side along the optical axis.

In the zoom lens system according to Embodiment 1, the second lens unit G2 corresponds to an escaping lens unit described later. Then, at the time of retracting, the second lens unit G2 escapes along an axis different from that at the time of image taking.

In the zoom lens system according to Embodiment 1, by moving the third lens unit G3 in a direction perpendicular to the optical axis, image point movement caused by vibration of the entire system is compensated. That is, image blur caused by hand blurring, vibration and the like can be compensated optically.

Figure 4:
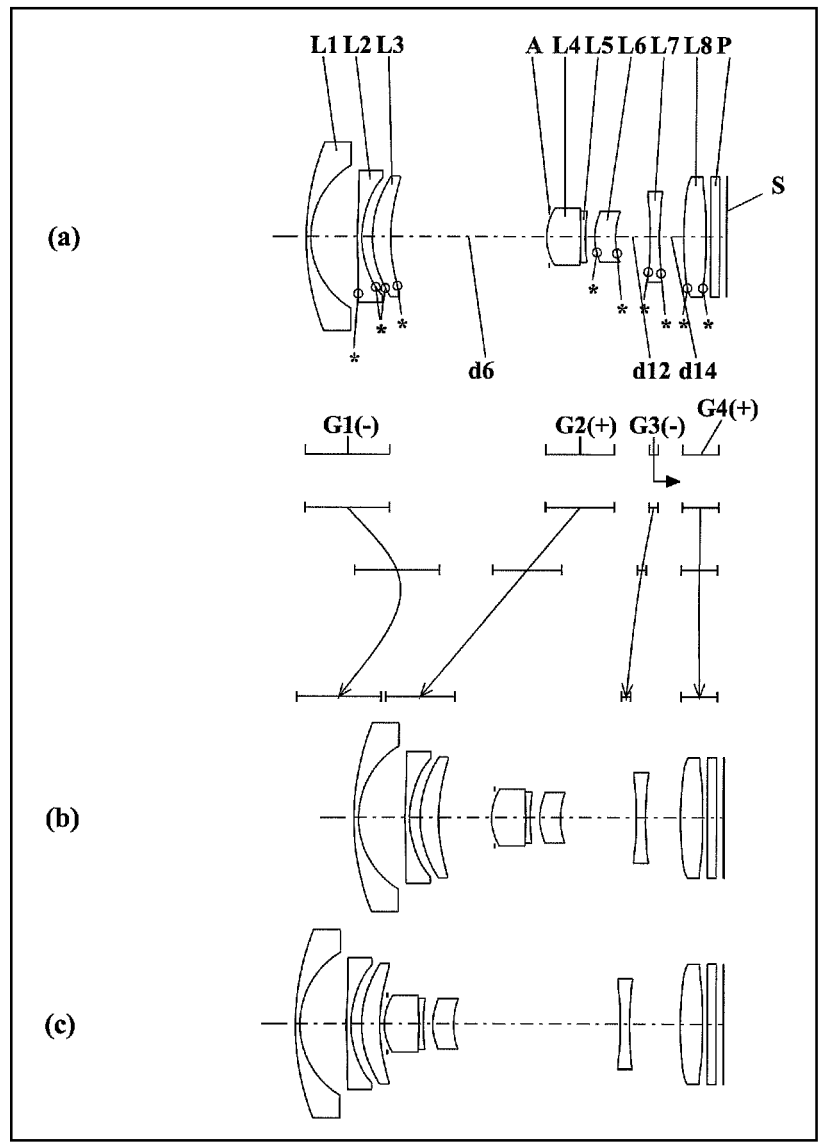
FIG. 4 is a lens arrangement diagram showing an infinity in-focus condition of a zoom lens system according to Embodiment 2 (Example 2)
Figure 5:
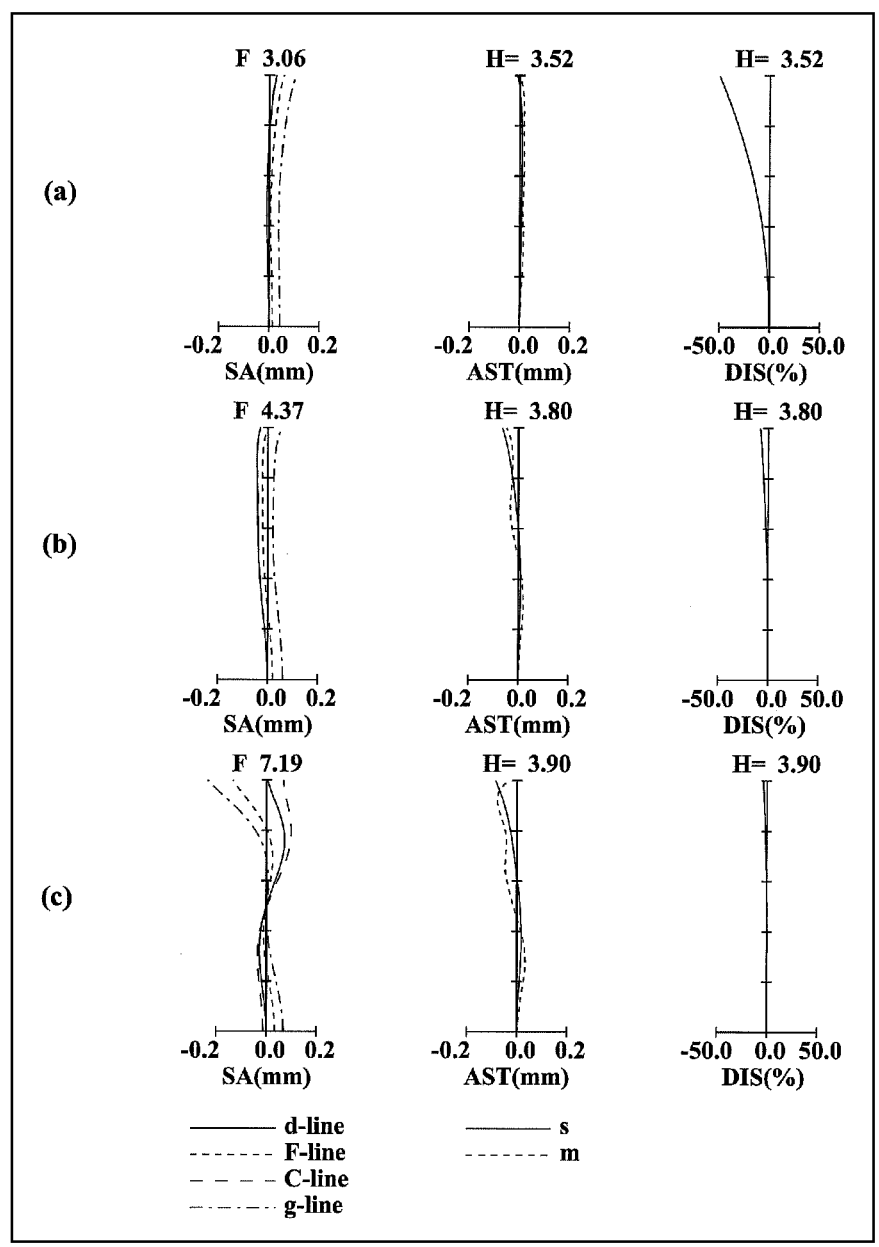
FIG. 5 is a longitudinal aberration diagram of an infinity in-focus condition of a zoom lens system according to Example 2.
Figure 6:
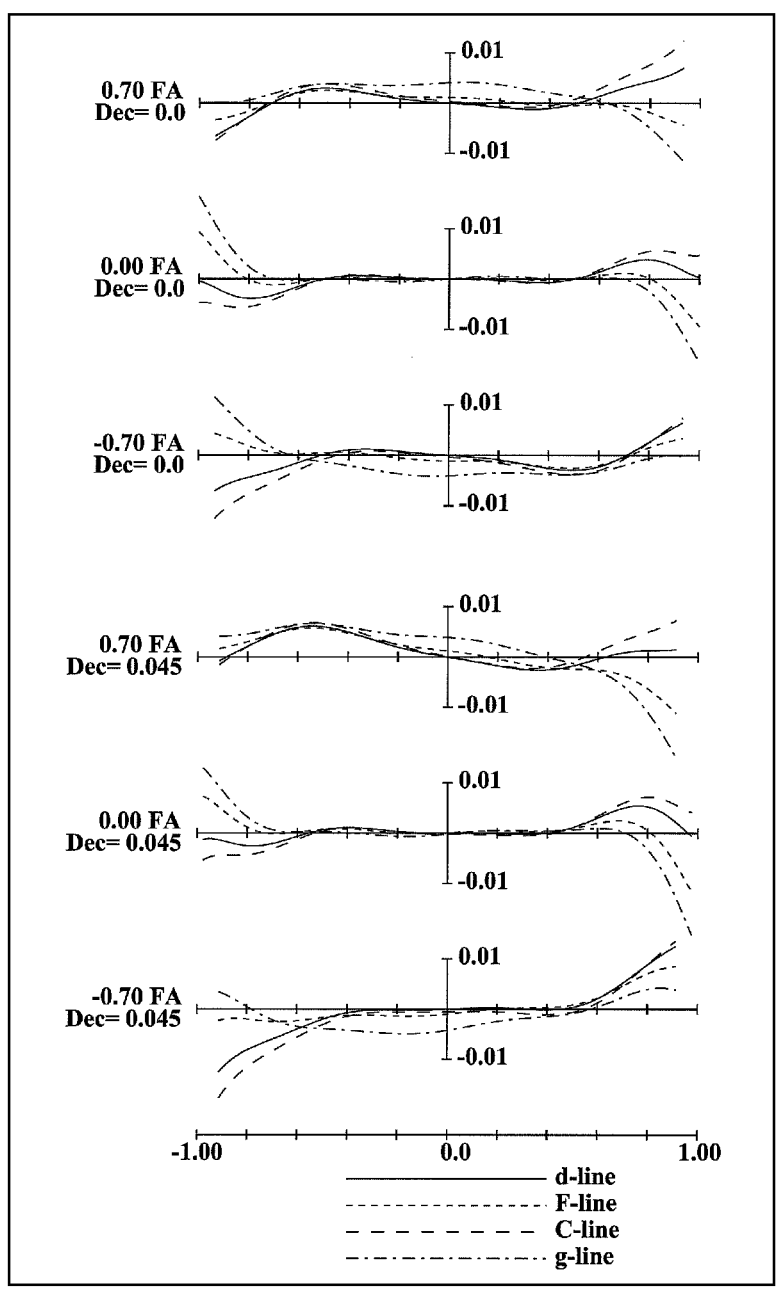
FIG. 6 is a lateral aberration diagram of a zoom lens system according to Example 2 at a telephoto limit in a basic state where image blur compensation is not performed and in an image blur compensation state.

As shown in FIG. 4, the zoom lens system according to Embodiment 2, in order from the object side to the image side, comprises: a first lens unit G1 having negative optical power; a second lens unit G2 having positive optical power; a third lens unit G3 having negative optical power; and a fourth lens unit G4 having positive optical power.

In the zoom lens system according to Embodiment 2, the first lens unit G1, in order from the object side to the image side, comprises: a negative meniscus first lens element L1 with the convex surface facing the object side; a negative meniscus second lens element L2 with the convex surface facing the object side; and a positive meniscus third lens element L3 with the convex surface facing the object side. Among these, the second lens element L2 has two aspheric surfaces, and the third lens element L3 has two aspheric surfaces.

In the zoom lens system according to Embodiment 2, the second lens unit G2, in order from the object side to the image side, comprises: a bi-convex fourth lens element L4; a bi-concave fifth lens element L5; and a positive meniscus sixth lens element L6 with the convex surface facing the object side. Among these, the fourth lens element L4 and the fifth lens element L5 are cemented with each other. Further, the sixth lens element L6 has two aspheric surfaces.

In the zoom lens system according to Embodiment 2, the third lens unit G3 comprises solely a negative meniscus seventh lens element L7 with the convex surface facing the object side. The seventh lens element L7 has two aspheric surfaces.

In the zoom lens system according to Embodiment 2, the fourth lens unit G4 comprises solely a bi-convex eighth lens element L8. The eighth lens element L8 has two aspheric surfaces.

In the zoom lens system according to Embodiment 2, on the object side relative to the second lens unit G2 (i.e., between the third lens element L3 and the fourth lens element L4), an aperture diaphragm A is provided. On the object side relative to the image surface S (i.e., between the image surface S and the eighth lens element L8), a plane parallel plate P is provided.

In the zoom lens system according to Embodiment 2, in zooming from a wide-angle limit to a telephoto limit at the time of image taking, the first lens unit G1 moves to the object side with locus of a convex to the image side, the second lens unit G2 monotonically moves to the object side, the third lens unit G3 monotonically moves to the object side, and the fourth lens unit G4 is fixed relative to the image surface S. That is, in zooming, the first lens unit G1, the second lens unit G2, and the third lens unit G3 individually move along the optical axis such that the interval between the first lens unit G1 and the second lens unit G2 should decrease, the interval between the second lens unit G2 and the third lens unit G3 should increase, and the interval between the third lens unit G3 and the fourth lens unit G4 should increase. Further, in zooming from a wide-angle limit to a telephoto limit at the time of image taking, the aperture diaphragm A moves along the optical axis together with the second lens unit G2.

In the zoom lens system according to Embodiment 2, in focusing from an infinity in-focus condition to a close-object in-focus condition, the third lens unit G3 moves to the image side along the optical axis.

In the zoom lens system according to Embodiment 2, a part of the first lens unit G1 corresponds to an escaping lens unit described later. Then, at the time of retracting, the part of the first lens unit G1 escapes along an axis different from that at the time of image taking.

In the zoom lens system according to Embodiment 2, by moving the second lens unit G2 in a direction perpendicular to the optical axis, image point movement caused by vibration of the entire system is compensated. That is, image blur caused by hand blurring, vibration and the like can be compensated optically.

Figure 7:
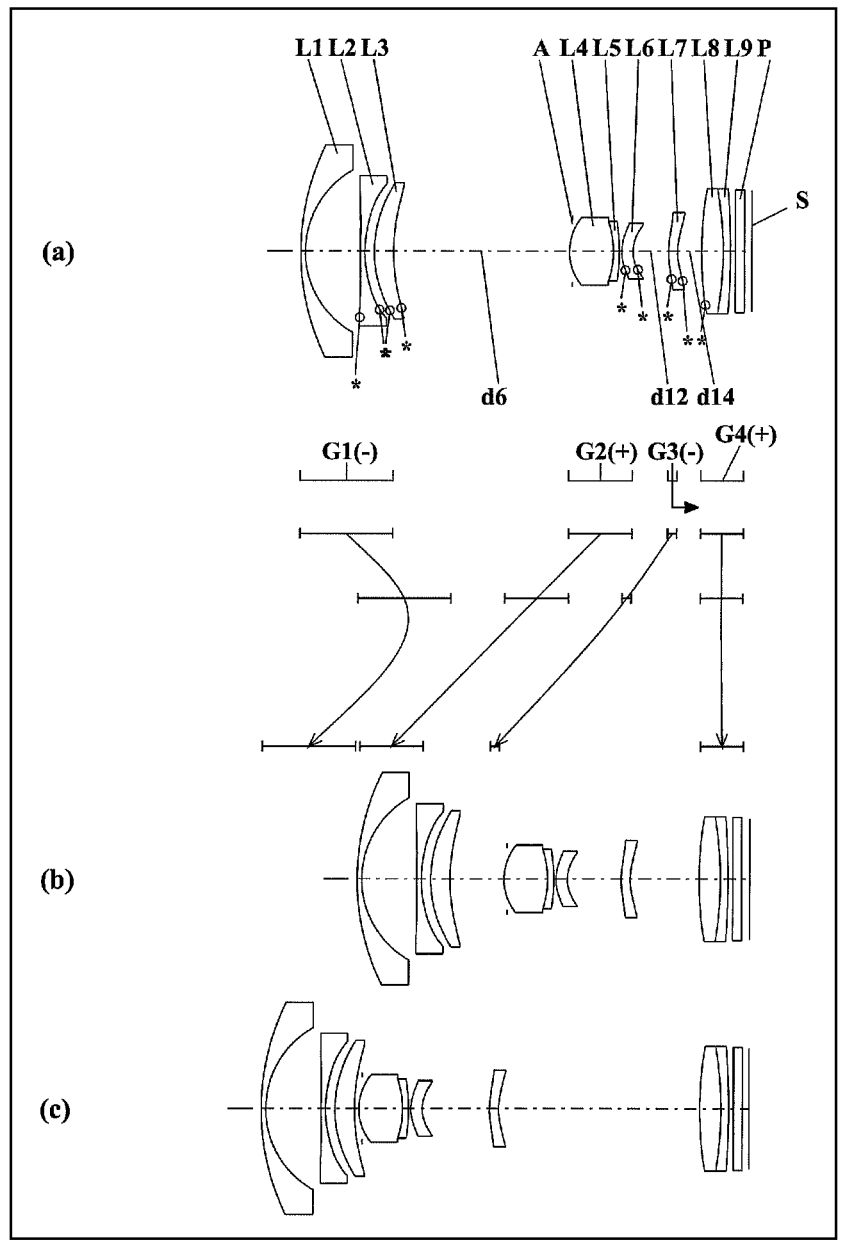
FIG. 7 is a lens arrangement diagram showing an infinity in-focus condition of a zoom lens system according to Embodiment 3 (Example 3)
Figure 8:
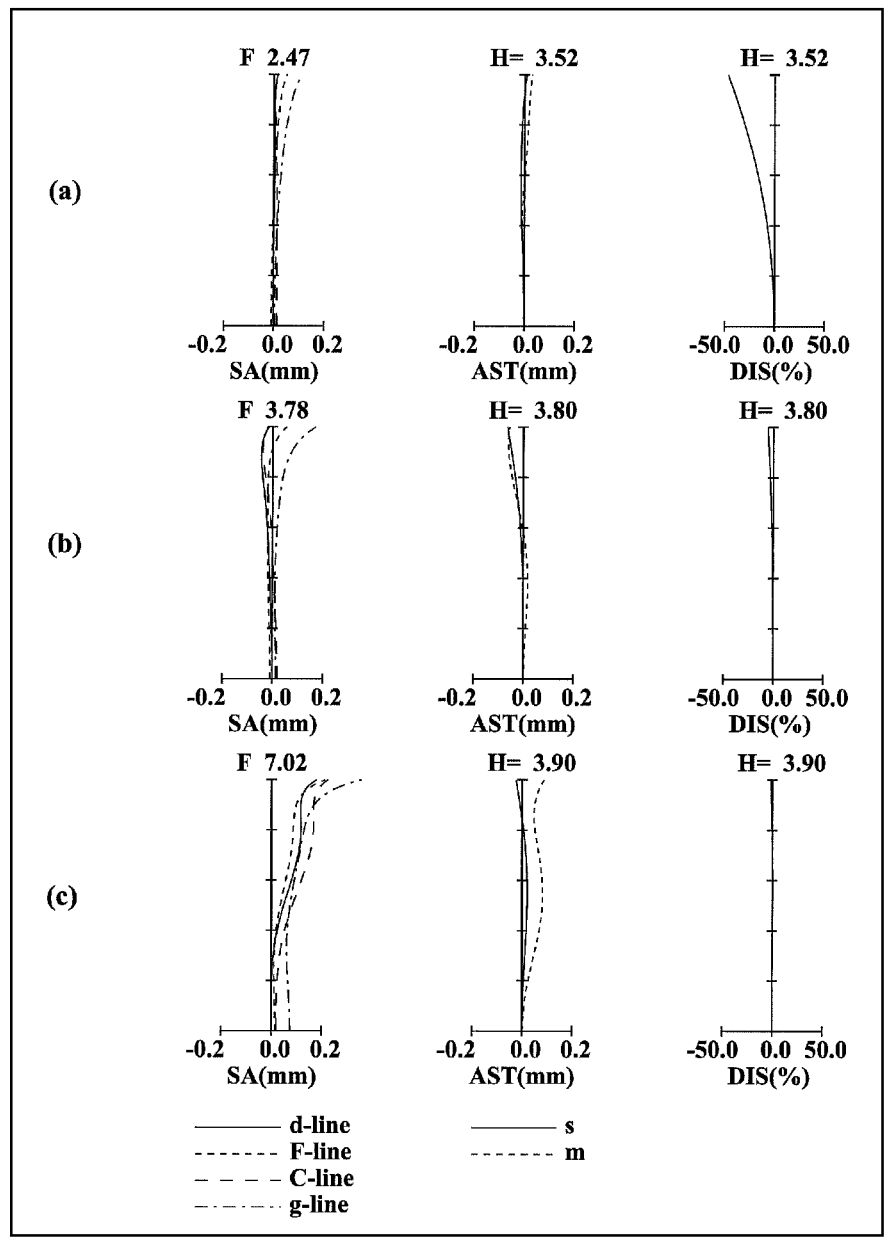
FIG. 8 is a longitudinal aberration diagram of an infinity in-focus condition of a zoom lens system according to Example 3.
Figure 9:
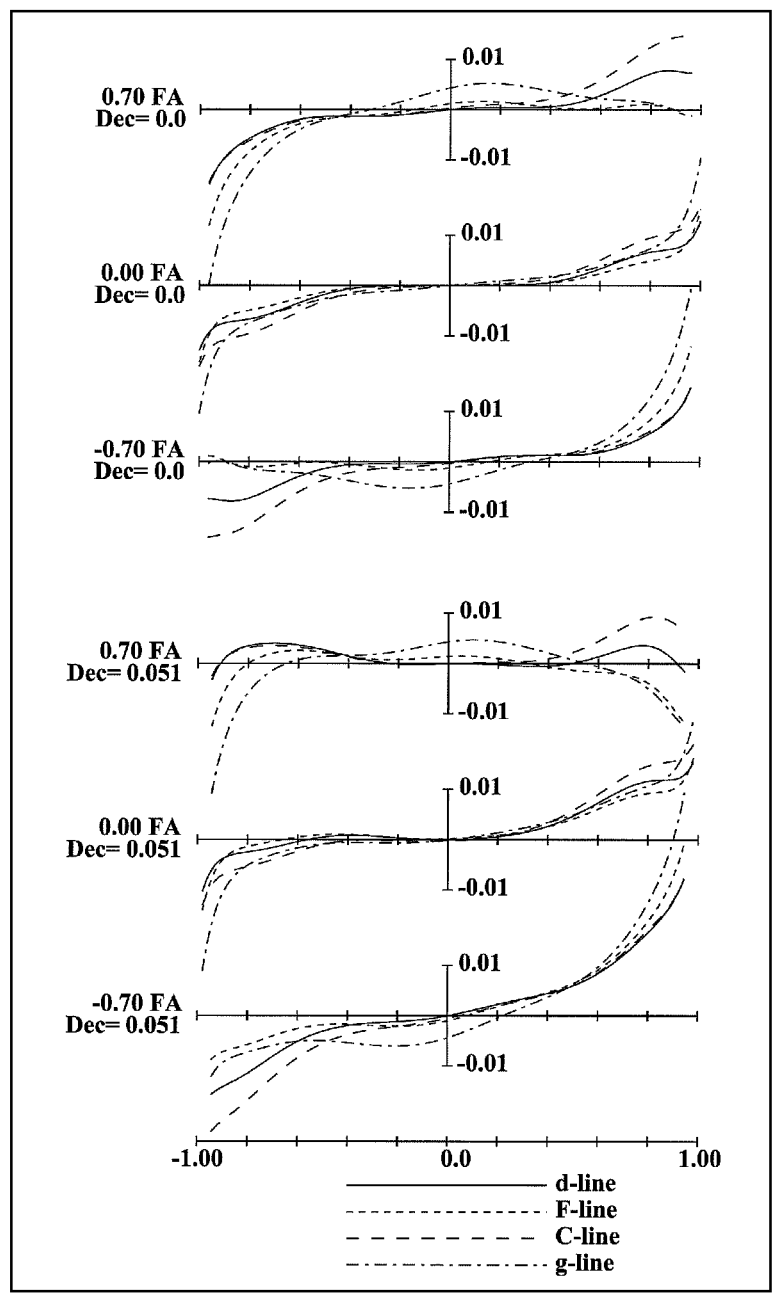
FIG. 9 is a lateral aberration diagram of a zoom lens system according to Example 3 at a telephoto limit in a basic state where image blur compensation is not performed and in an image blur compensation state.

As shown in FIG. 7, the zoom lens system according to Embodiment 3, in order from the object side to the image side, comprises: a first lens unit G1 having negative optical power; a second lens unit G2 having positive optical power; a third lens unit G3 having negative optical power; and a fourth lens unit G4 having positive optical power.

In the zoom lens system according to Embodiment 3, the first lens unit G1, in order from the object side to the image side, comprises: a negative meniscus first lens element L1 with the convex surface facing the object side; a negative meniscus second lens element L2 with the convex surface facing the object side; and a positive meniscus third lens element L3 with the convex surface facing the object side. Among these, the second lens element L2 has two aspheric surfaces, and the third lens element L3 has two aspheric surfaces.

In the zoom lens system according to Embodiment 3, the second lens unit G2, in order from the object side to the image side, comprises: a bi-convex fourth lens element L4; a negative meniscus fifth lens element L5 with the convex surface facing the image side; and a negative meniscus sixth lens element L6 with the convex surface facing the object side. Among these, the fourth lens element L4 and the fifth lens element L5 are cemented with each other. Further, the sixth lens element L6 has two aspheric surfaces.

In the zoom lens system according to Embodiment 3, the third lens unit G3 comprises solely a negative meniscus seventh lens element L7 with the convex surface facing the object side. The seventh lens element L7 has two aspheric surfaces.

In the zoom lens system according to Embodiment 3, the fourth lens unit G4, in order from the object side to the image side, comprises: a bi-convex eighth lens element L8; and a negative meniscus ninth lens element L9 with the convex surface facing the image side. The eighth lens element L8 and the ninth lens element L9 are cemented with each other. The eighth lens element L8 has an aspheric object side surface.

In the zoom lens system according to Embodiment 3, on the object side relative to the second lens unit G2 (i.e., between the third lens element L3 and the fourth lens element L4), an aperture diaphragm A is provided. On the object side relative to the image surface S (i.e., between the image surface S and the ninth lens element L9), a plane parallel plate P is provided.

In the zoom lens system according to Embodiment 3, in zooming from a wide-angle limit to a telephoto limit at the time of image taking, the first lens unit G1 moves to the object side with locus of a convex to the image side, the second lens unit G2 monotonically moves to the object side, the third lens unit G3 monotonically moves to the object side, and the fourth lens unit G4 is fixed relative to the image surface S. That is, in zooming, the first lens unit G1, the second lens unit G2, and the third lens unit G3 individually move along the optical axis such that the interval between the first lens unit G1 and the second lens unit G2 should decrease, the interval between the second lens unit G2 and the third lens unit G3 should increase, and the interval between the third lens unit G3 and the fourth lens unit G4 should increase. Further, in zooming from a wide-angle limit to a telephoto limit at the time of image taking, the aperture diaphragm A moves along the optical axis together with the second lens unit G2.

In the zoom lens system according to Embodiment 3, in focusing from an infinity in-focus condition to a close-object in-focus condition, the third lens unit G3 moves to the image side along the optical axis.

In the zoom lens system according to Embodiment 3, a part of the first lens unit G1 corresponds to an escaping lens unit described later. Then, at the time of retracting, the part of the first lens unit G1 escapes along an axis different from that at the time of image taking.

In the zoom lens system according to Embodiment 3, by moving the second lens unit G2 in a direction perpendicular to the optical axis, image point movement caused by vibration of the entire system is compensated. That is, image blur caused by hand blurring, vibration and the like can be compensated optically.

Figure 10:
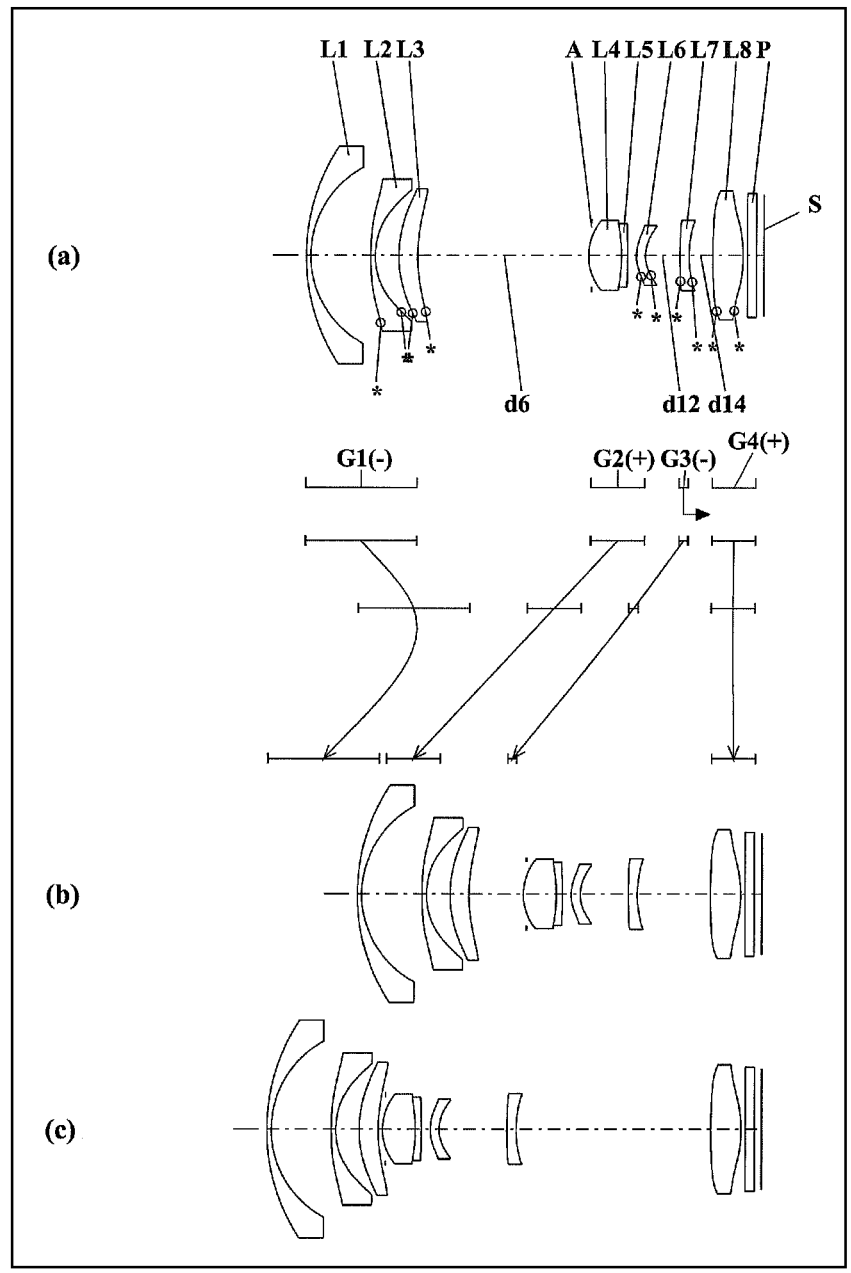
FIG. 10 is a lens arrangement diagram showing an infinity in-focus condition of a zoom lens system according to Embodiment 4 (Example 4)
Figure 11:
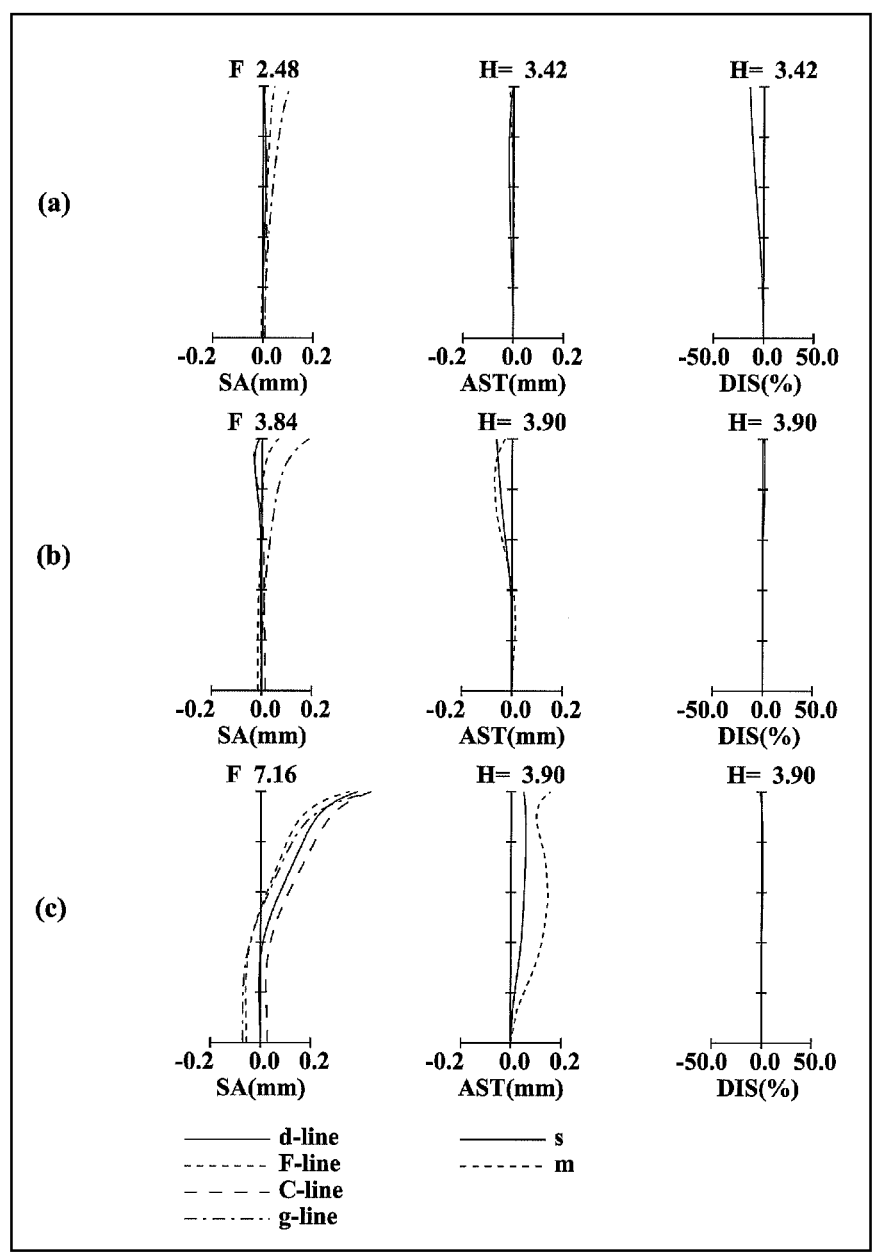
FIG. 11 is a longitudinal aberration diagram of an infinity in-focus condition of a zoom lens system according to Example 4.
Figure 12:
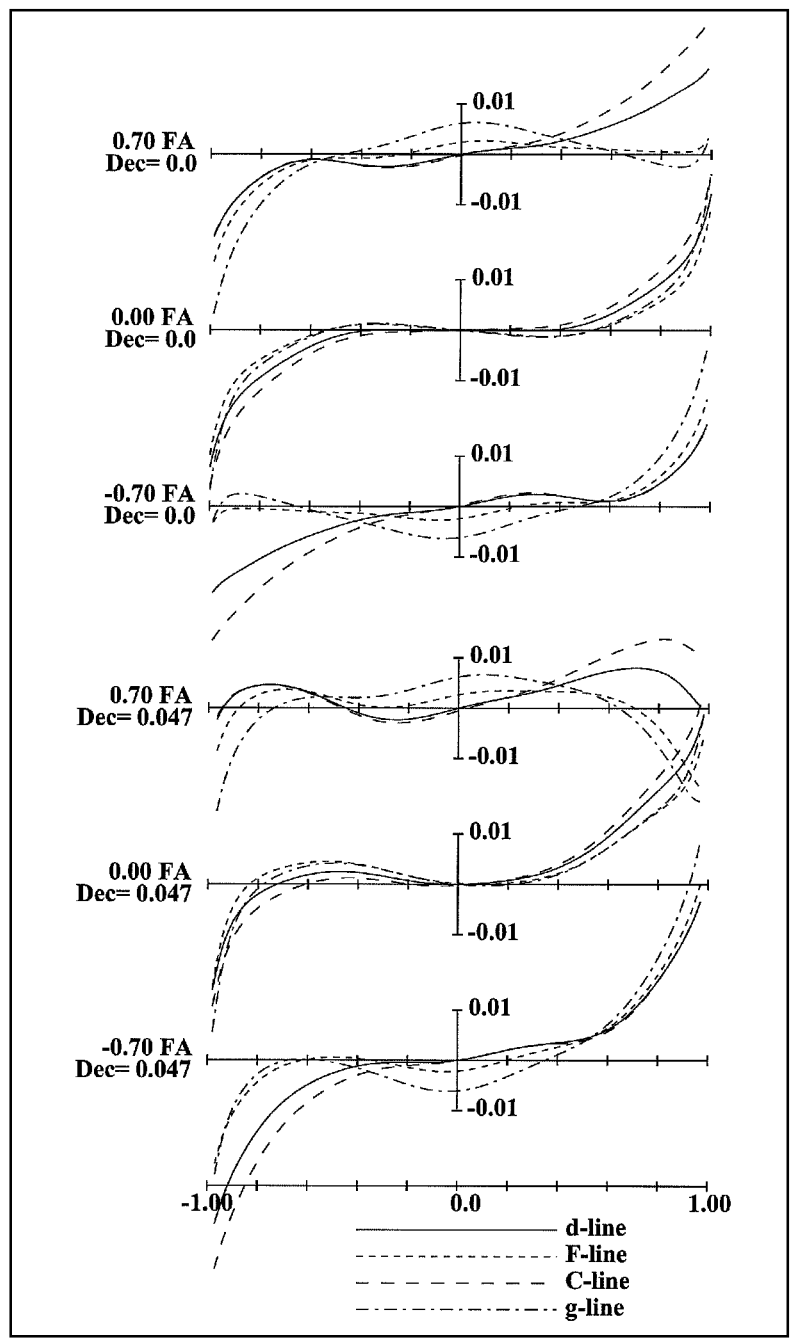
FIG. 12 is a lateral aberration diagram of a zoom lens system according to Example 4 at a telephoto limit in a basic state where image blur compensation is not performed and in an image blur compensation state.

As shown in FIG. 10, the zoom lens system according to Embodiment 4, in order from the object side to the image side, comprises: a first lens unit G1 having negative optical power; a second lens unit G2 having positive optical power; a third lens unit G3 having negative optical power; and a fourth lens unit G4 having positive optical power.

In the zoom lens system according to Embodiment 4, the first lens unit G1, in order from the object side to the image side, comprises: a negative meniscus first lens element L1 with the convex surface facing the object side; a negative meniscus second lens element L2 with the convex surface facing the object side; and a positive meniscus third lens element L3 with the convex surface facing the object side. Among these, the second lens element L2 has two aspheric surfaces, and the third lens element L3 has two aspheric surfaces.

In the zoom lens system according to Embodiment 4, the second lens unit G2, in order from the object side to the image side, comprises: a bi-convex fourth lens element L4; a negative meniscus fifth lens element L5 with the convex surface facing the image side; and a negative meniscus sixth lens element L6 with the convex surface facing the object side. Among these, the fourth lens element L4 and the fifth lens element L5 are cemented with each other. Further, the sixth lens element L6 has two aspheric surfaces.

In the zoom lens system according to Embodiment 4, the third lens unit G3 comprises solely a negative meniscus seventh lens element L7 with the convex surface facing the object side. The seventh lens element L7 has two aspheric surfaces.

In the zoom lens system according to Embodiment 4, the fourth lens unit G4 comprises solely a bi-convex eighth lens element L8. The eighth lens element L8 has two aspheric surfaces.

In the zoom lens system according to Embodiment 4, on the object side relative to the second lens unit G2 (i.e., between the third lens element L3 and the fourth lens element L4), an aperture diaphragm A is provided. On the object side relative to the image surface S (i.e., between the image surface S and the eighth lens element L8), a plane parallel plate P is provided.

In the zoom lens system according to Embodiment 4, in zooming from a wide-angle limit to a telephoto limit at the time of image taking, the first lens unit G1 moves to the object side with locus of a convex to the image side, the second lens unit G2 monotonically moves to the object side, the third lens unit G3 monotonically moves to the object side, and the fourth lens unit G4 is fixed relative to the image surface S. That is, in zooming, the first lens unit G1, the second lens unit G2, and the third lens unit G3 individually move along the optical axis such that the interval between the first lens unit G1 and the second lens unit G2 should decrease, the interval between the second lens unit G2 and the third lens unit G3 should increase, and the interval between the third lens unit G3 and the fourth lens unit G4 should increase. Further, in zooming from a wide-angle limit to a telephoto limit at the time of image taking, the aperture diaphragm A moves along the optical axis together with the second lens unit G2.

In the zoom lens system according to Embodiment 4, in focusing from an infinity in-focus condition to a close-object in-focus condition, the third lens unit G3 moves to the image side along the optical axis.

In the zoom lens system according to Embodiment 4, a part of the first lens unit G1 corresponds to an escaping lens unit described later. Then, at the time of retracting, the part of the first lens unit G1 escapes along an axis different from that at the time of image taking.

In the zoom lens system according to Embodiment 4, by moving the second lens unit G2 in a direction perpendicular to the optical axis, image point movement caused by vibration of the entire system is compensated. That is, image blur caused by hand blurring, vibration and the like can be compensated optically.

Figure 13:
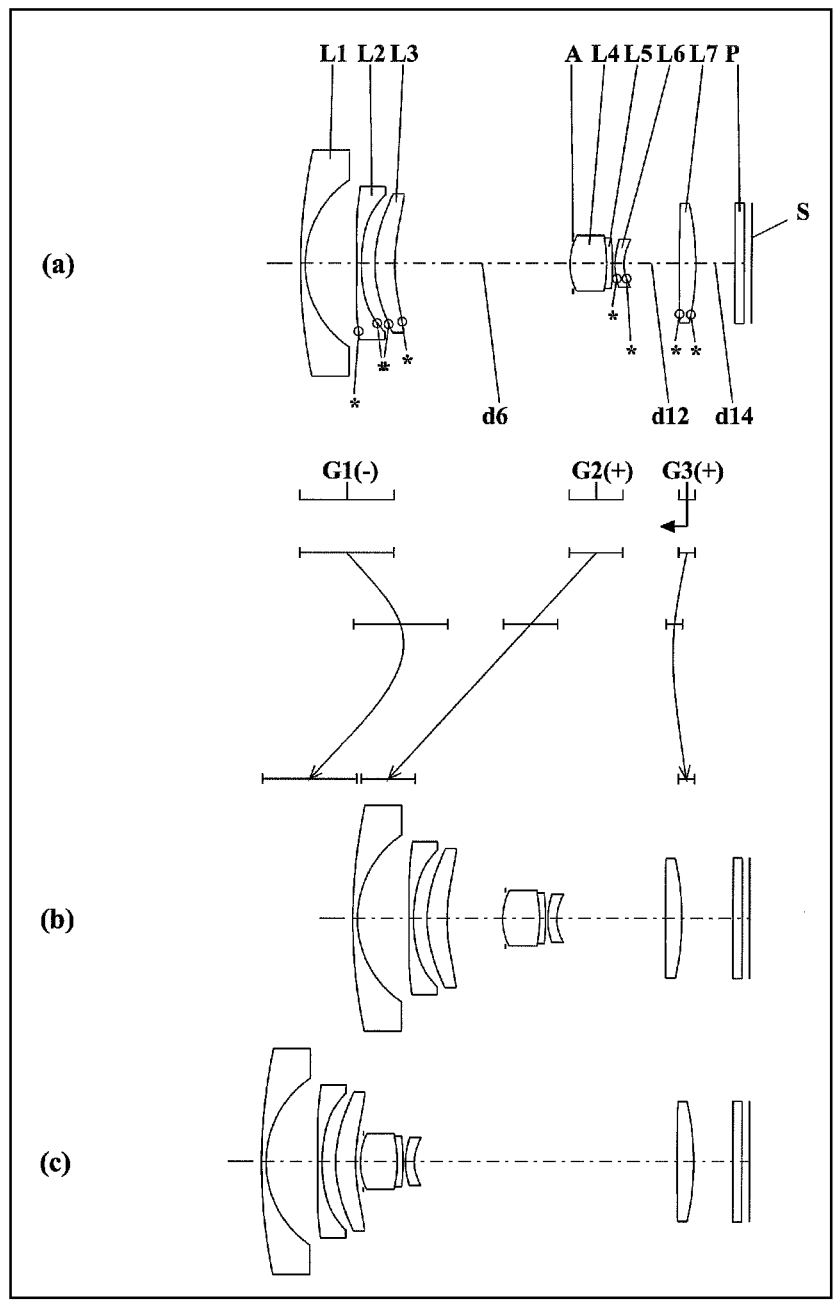
FIG. 13 is a lens arrangement diagram showing an infinity in-focus condition of a zoom lens system according to Embodiment 5 (Example 5)
Figure 14:
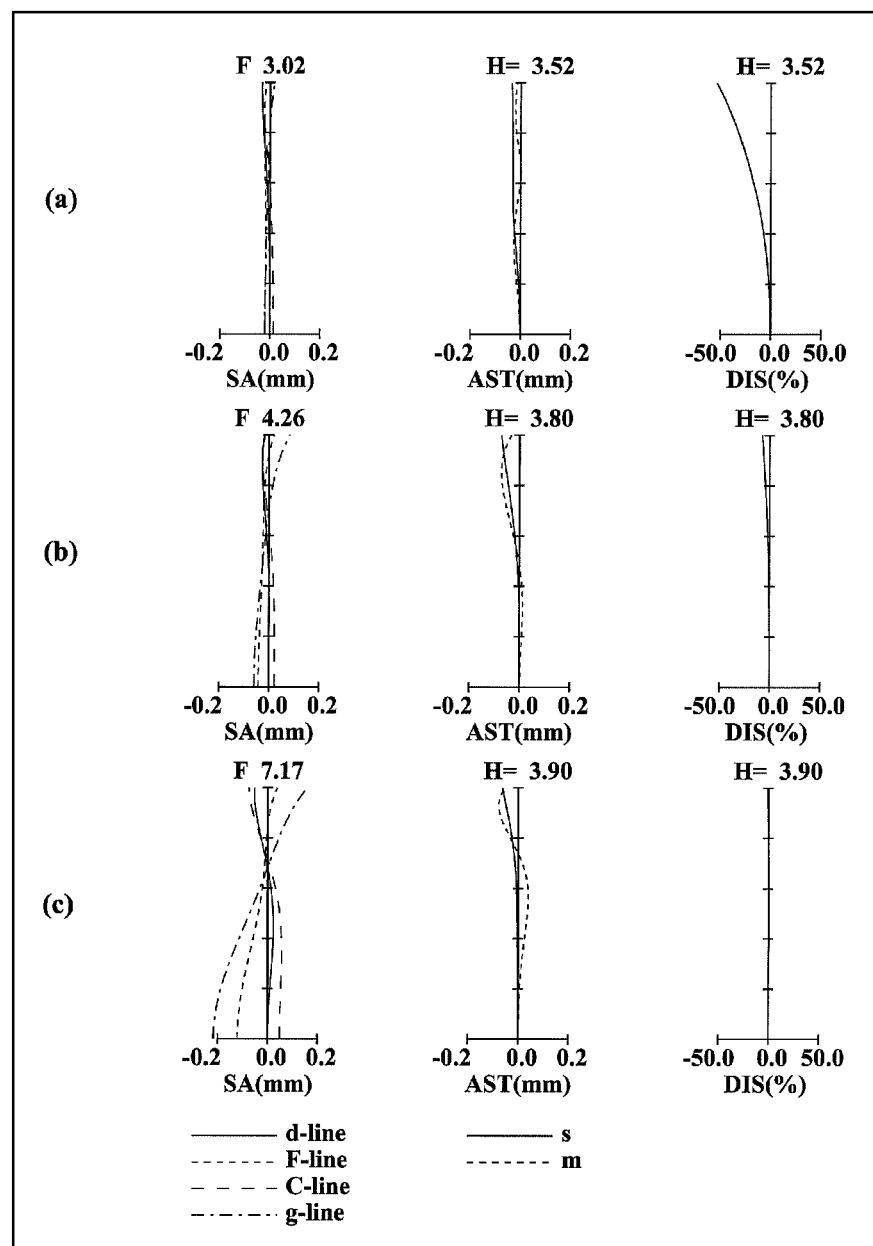
FIG. 14 is a longitudinal aberration diagram of an infinity in-focus condition of a zoom lens system according to Example 5.
Figure 15:
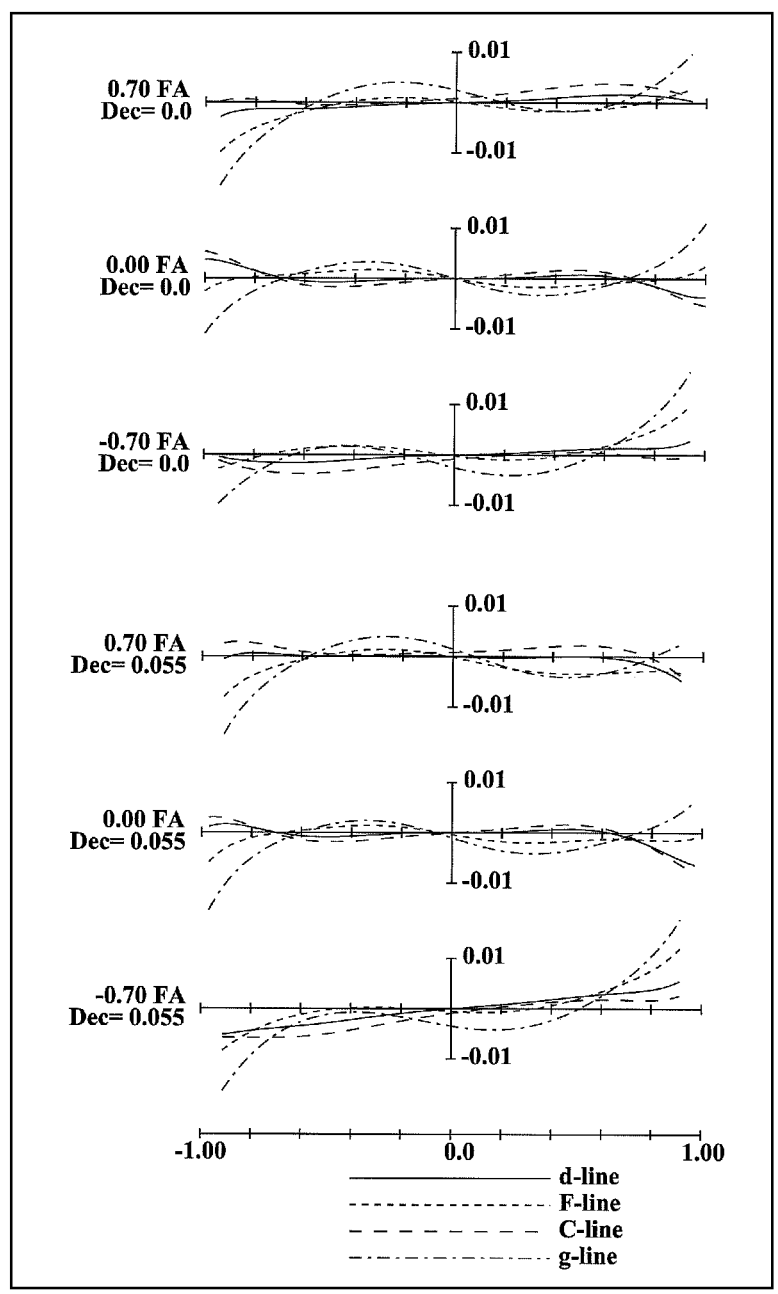
FIG. 15 is a lateral aberration diagram of a zoom lens system according to Example 5 at a telephoto limit in a basic state where image blur compensation is not performed and in an image blur compensation state.

As shown in FIG. 13, the zoom lens system according to Embodiment 5, in order from the object side to the image side, comprises: a first lens unit G1 having negative optical power; a second lens unit G2 having positive optical power; and a third lens unit G3 having positive optical power.

In the zoom lens system according to Embodiment 5, the first lens unit G1, in order from the object side to the image side, comprises: a negative meniscus first lens element L1 with the convex surface facing the object side; a negative meniscus second lens element L2 with the convex surface facing the object side; and a positive meniscus third lens element L3 with the convex surface facing the object side. Among these, the second lens element L2 has two aspheric surfaces, and the third lens element L3 has two aspheric surfaces.

In the zoom lens system according to Embodiment 5, the second lens unit G2, in order from the object side to the image side, comprises: a bi-convex fourth lens element L4; a negative meniscus fifth lens element L5 with the convex surface facing the image side; and a negative meniscus sixth lens element L6 with the convex surface facing the object side. Among these, the fourth lens element L4 and the fifth lens element L5 are cemented with each other. Further, the sixth lens element L6 has two aspheric surfaces.

In the zoom lens system according to Embodiment 5, the third lens unit G3 comprises solely a positive meniscus seventh lens element L7 with the convex surface facing the image side. The seventh lens element L7 has two aspheric surfaces.

In the zoom lens system according to Embodiment 5, on the object side relative to the second lens unit G2 (i.e., between the third lens element L3 and the fourth lens element L4), an aperture diaphragm A is provided. On the object side relative to the image surface S (i.e., between the image surface S and the seventh lens element L7), a plane parallel plate P is provided.

In the zoom lens system according to Embodiment 5, in zooming from a wide-angle limit to a telephoto limit at the time of image taking, the first lens unit G1 moves to the object side with locus of a convex to the image side, the second lens unit G2 monotonically moves to the object side, and the third lens unit G3 moves to the image side with locus of a convex to the object side. That is, in zooming, the first lens unit G1, the second lens unit G2, and the third lens unit G3 individually move along the optical axis such that the interval between the first lens unit G1 and the second lens unit G2 should decrease, and the interval between the second lens unit G2 and the third lens unit G3 should increase. Further, in zooming from a wide-angle limit to a telephoto limit at the time of image taking, the aperture diaphragm A moves along the optical axis together with the second lens unit G2.

In the zoom lens system according to Embodiment 5, in focusing from an infinity in-focus condition to a close-object in-focus condition, the third lens unit G3 moves to the object side along the optical axis.

In the zoom lens system according to Embodiment 5, the second lens unit G2 corresponds to an escaping lens unit described later. Then, at the time of retracting, the second lens unit G2 escapes along an axis different from that at the time of image taking.

In the zoom lens system according to Embodiment 5, by moving the second lens unit G2 in a direction perpendicular to the optical axis, image point movement caused by vibration of the entire system is compensated. That is, image blur caused by hand blurring, vibration and the like can be compensated optically.

Figure 16:
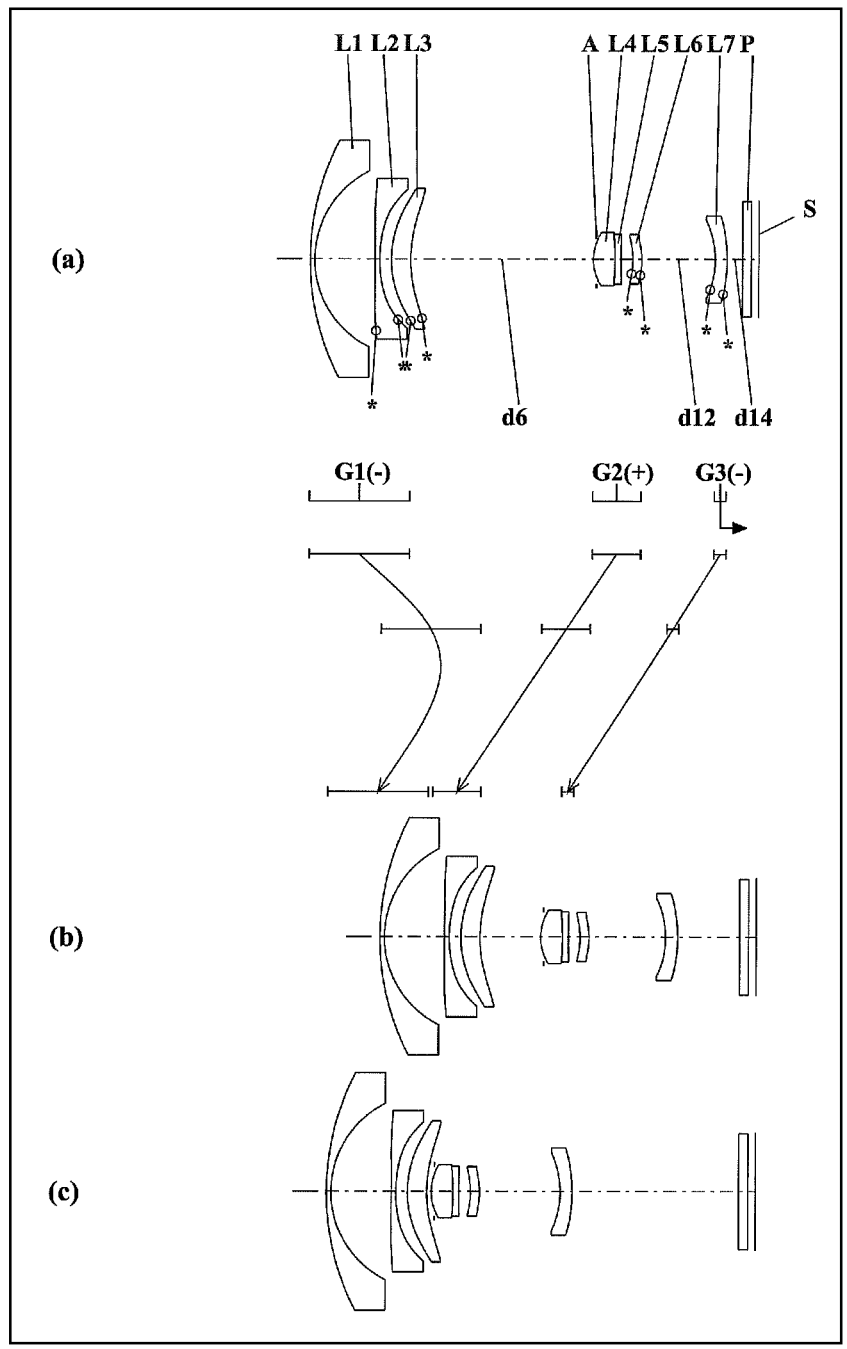
FIG. 16 is a lens arrangement diagram showing an infinity in-focus condition of a zoom lens system according to Embodiment 6 (Example 6)
Figure 17:
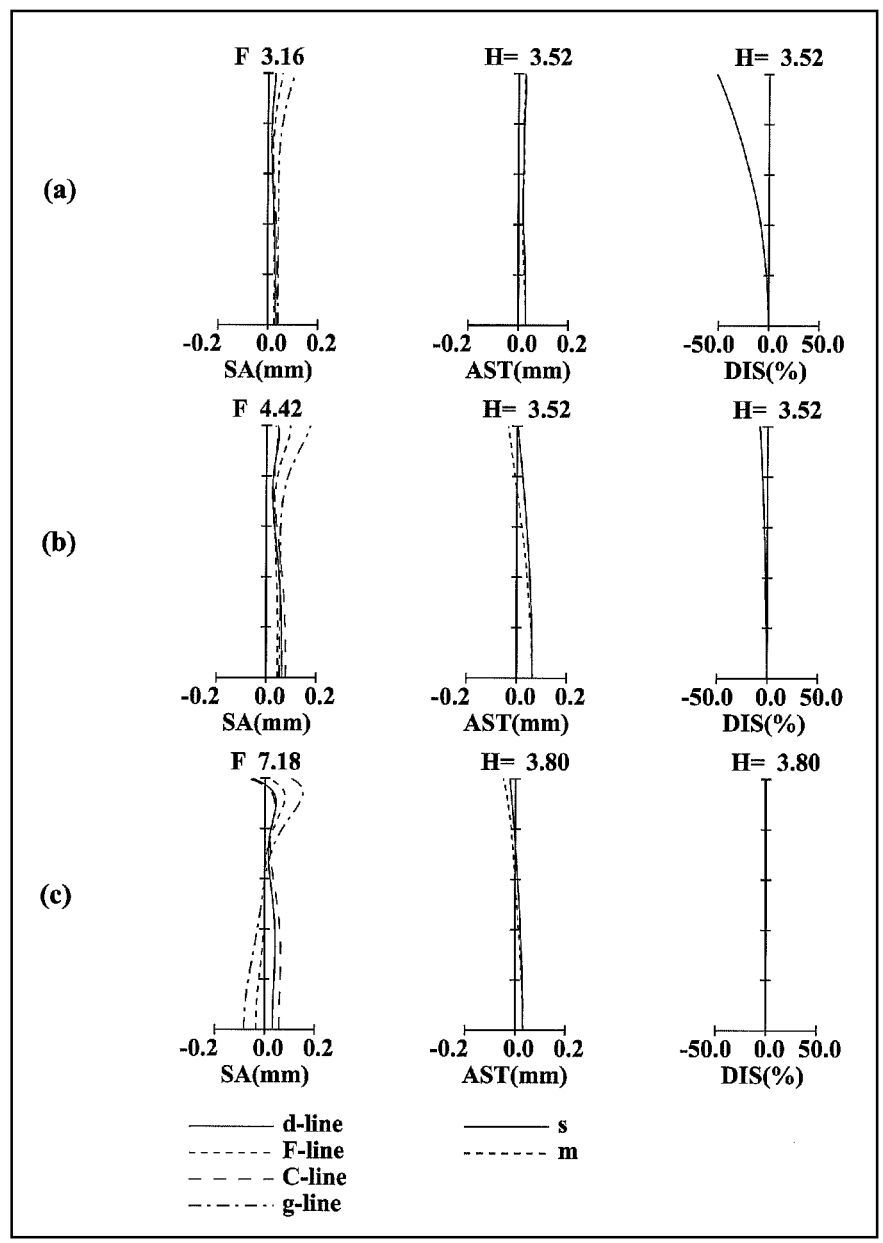
FIG. 17 is a longitudinal aberration diagram of an infinity in-focus condition of a zoom lens system according to Example 6.
Figure 18:
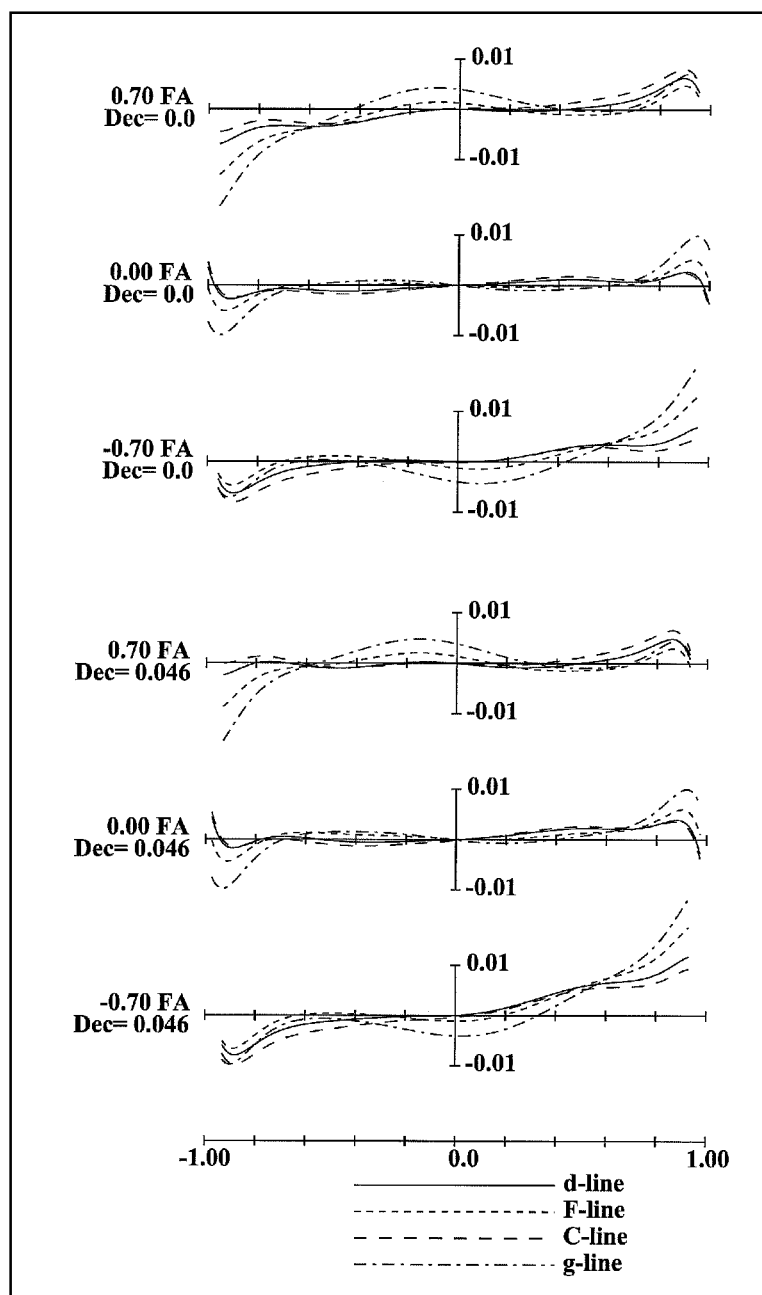
FIG. 18 is a lateral aberration diagram of a zoom lens system according to Example 6 at a telephoto limit in a basic state where image blur compensation is not performed and in an image blur compensation state.

As shown in FIG. 16, the zoom lens system according to Embodiment 6, in order from the object side to the image side, comprises: a first lens unit G1 having negative optical power; a second lens unit G2 having positive optical power; and a third lens unit G3 having negative optical power.

In the zoom lens system according to Embodiment 6, the first lens unit G1, in order from the object side to the image side, comprises: a negative meniscus first lens element L1 with the convex surface facing the object side; a negative meniscus second lens element L2 with the convex surface facing the object side; and a positive meniscus third lens element L3 with the convex surface facing the object side. Among these, the second lens element L2 has two aspheric surfaces, and the third lens element L3 has two aspheric surfaces.

In the zoom lens system according to Embodiment 6, the second lens unit G2, in order from the object side to the image side, comprises: a bi-convex fourth lens element L4; a bi-concave fifth lens element L5; and a positive meniscus sixth lens element L6 with the convex surface facing the image side. Among these, the fourth lens element L4 and the fifth lens element L5 are cemented with each other. Further, the sixth lens element L6 has two aspheric surfaces.

In the zoom lens system according to Embodiment 6, the third lens unit G3 comprises solely a negative meniscus seventh lens element L7 with the convex surface facing the image side. The seventh lens element L7 has two aspheric surfaces.

In the zoom lens system according to Embodiment 6, on the object side relative to the second lens unit G2 (i.e., between the third lens element L3 and the fourth lens element L4), an aperture diaphragm A is provided. On the object side relative to the image surface S (i.e., between the image surface S and the seventh lens element L7), a plane parallel plate P is provided.

In the zoom lens system according to Embodiment 6, in zooming from a wide-angle limit to a telephoto limit at the time of image taking, the first lens unit G1 moves to the object side with locus of a convex to the image side, the second lens unit G2 monotonically moves to the object side, and the third lens unit G3 monotonically moves to the object side. That is, in zooming, the first lens unit G1, the second lens unit G2, and the third lens unit G3 move individually along the optical axis such that the interval between the first lens unit G1 and the second lens unit G2 should decrease, and the interval between the second lens unit G2 and the third lens unit G3 should increase. Further, in zooming from a wide-angle limit to a telephoto limit at the time of image taking, the aperture diaphragm A moves together with the second lens unit G2 along the optical axis.

In the zoom lens system according to Embodiment 6, in focusing from an infinity in-focus condition to a close-object in-focus condition, the third lens unit G3 moves to the image side along the optical axis.

In the zoom lens system according to Embodiment 6, the second lens unit G2 corresponds to an escaping lens unit described later. Then, at the time of retracting, the second lens unit G2 escapes along an axis different from that at the time of image taking.

In the zoom lens system according to Embodiment 6, by moving the second lens unit G2 in a direction perpendicular to the optical axis, image point movement caused by vibration of the entire system is compensated. That is, image blur caused by hand blurring, vibration and the like can be compensated optically.

As shown in FIG. 19, the zoom lens system according to Embodiment 7, in order from the object side to the image side, comprises: a first lens unit G1 having negative optical power; a second lens unit G2 having positive optical power; a third lens unit G3 having positive optical power; and a fourth lens unit G4 having negative optical power.

In the zoom lens system according to Embodiment 7, the first lens unit G1, in order from the object side to the image side, comprises: a negative meniscus first lens element L1 with the convex surface facing the object side; a negative meniscus second lens element L2 with the convex surface facing the object side; and a positive meniscus third lens element L3 with the convex surface facing the object side.

Among these, the second lens element L2 has two aspheric surfaces, and the third lens element L3 has two aspheric surfaces.

In the zoom lens system according to Embodiment 7, the second lens unit G2, in order from the object side to the image side, comprises: a positive meniscus fourth lens element L4 with the convex surface facing the object side; a bi-convex fifth lens element L5; a bi-concave sixth lens element L6; and a bi-convex seventh lens element L7. Among these, the fifth lens element L5 and the sixth lens element L6 are cemented with each other. Further, the fifth lens element L5 has an aspheric object side surface.

In the zoom lens system according to Embodiment 7, the third lens unit G3 comprises solely a positive meniscus eighth lens element L8 with the convex surface facing the image side. The eighth lens element L8 has two aspheric surfaces.

In the zoom lens system according to Embodiment 7, the fourth lens unit G4 comprises solely a negative meniscus ninth lens element L9 with the convex surface facing the image side. The ninth lens element L9 has two aspheric surfaces.

In the zoom lens system according to Embodiment 7, between the fourth lens element L4 and the fifth lens element L5, an aperture diaphragm A is provided. On the object side relative to the image surface S (i.e., between the image surface S and the ninth lens element L9), a plane parallel plate P is provided.

In the zoom lens system according to Embodiment 7, in zooming from a wide-angle limit to a telephoto limit at the time of image taking, the first lens unit G1 moves to the object side with locus of a convex to the image side, the second lens unit G2 monotonically moves to the object side, the third lens unit G3 monotonically moves to the object side, and the fourth lens unit G4 is fixed relative to the image surface S. That is, in zooming, the first lens unit G1, the second lens unit G2, and the third lens unit G3 individually move along the optical axis such that the interval between the first lens unit G1 and the second lens unit G2 should decrease, the interval between the second lens unit G2 and the third lens unit G3 should temporarily decrease and then increase, and the interval between the third lens unit G3 and the fourth lens unit G4 should increase. Further, in zooming from a wide-angle limit to a telephoto limit at the time of image taking, the aperture diaphragm A moves along the optical axis together with the second lens unit G2.

In the zoom lens system according to Embodiment 7, in focusing from an infinity in-focus condition to a close-object in-focus condition, the third lens unit G3 moves to the object side along the optical axis.

In the zoom lens system according to Embodiment 7, the second lens unit G2 corresponds to an escaping lens unit described later. Then, at the time of retracting, the second lens unit G2 escapes along an axis different from that at the time of image taking.

In the zoom lens system according to Embodiment 7, by moving the second lens unit G2 in a direction perpendicular to the optical axis, image point movement caused by vibration of the entire system is compensated. That is, image blur caused by hand blurring, vibration and the like can be compensated optically.

Figure 22:
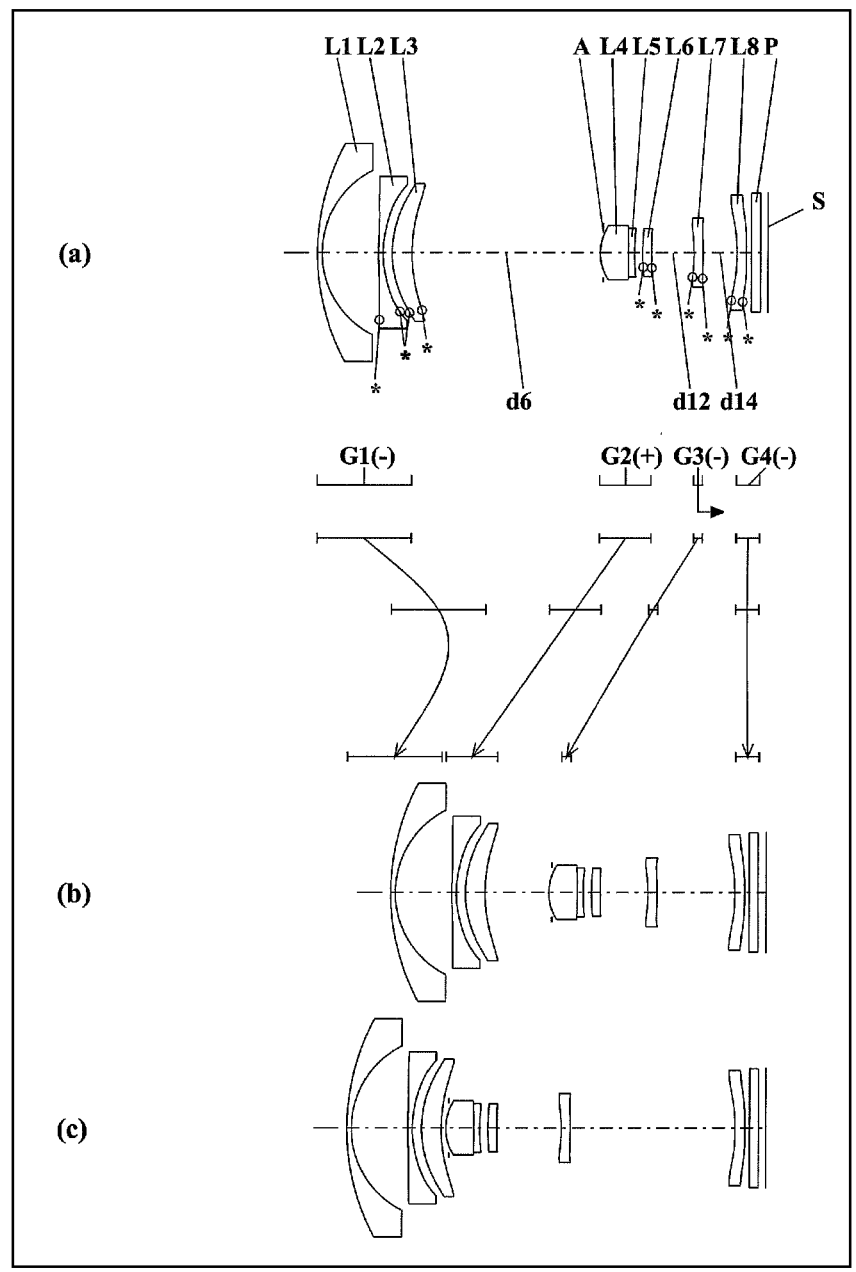
FIG. 22 is a lens arrangement diagram showing an infinity in-focus condition of a zoom lens system according to Embodiment 8 (Example 8)
Figure 23:
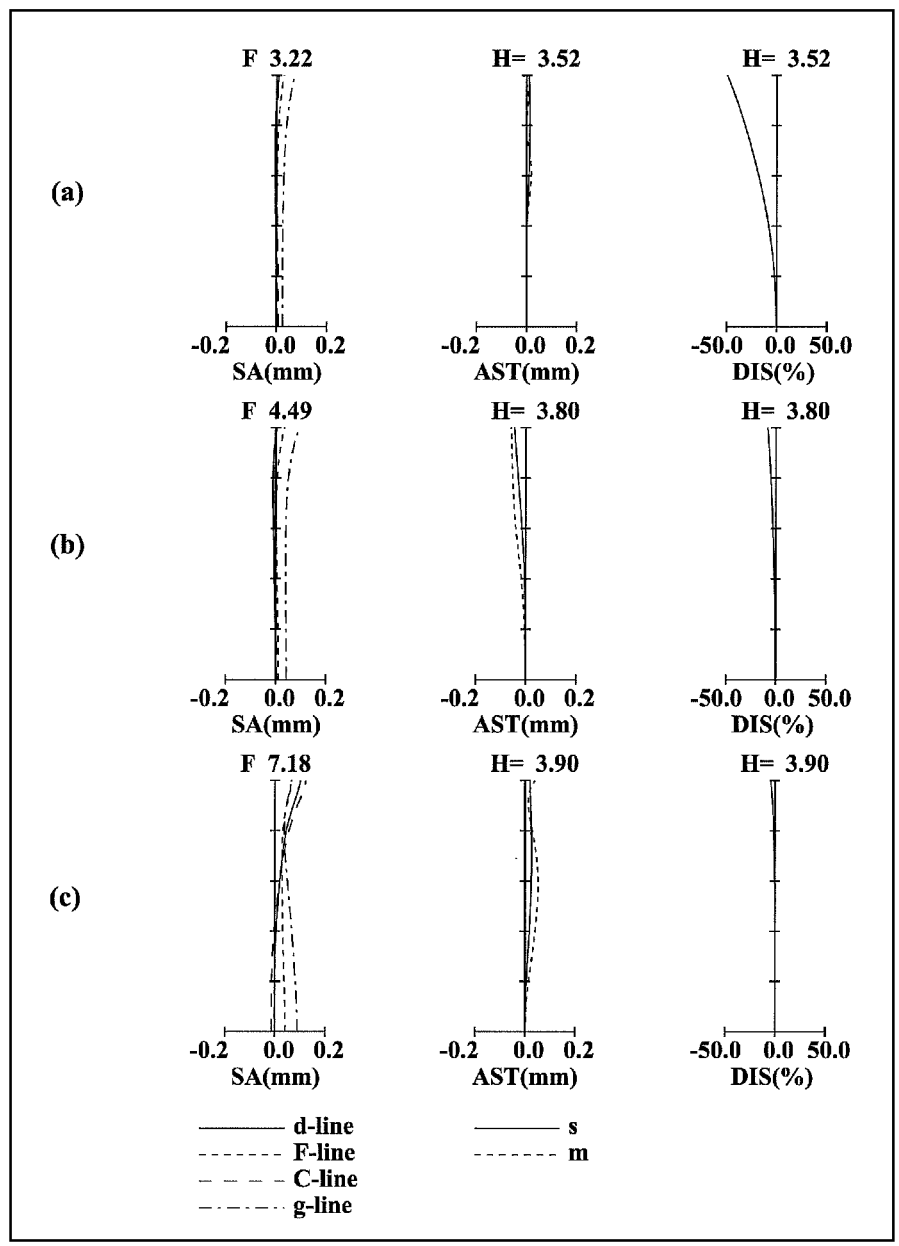
FIG. 23 is a longitudinal aberration diagram of an infinity in-focus condition of a zoom lens system according to Example 8.
Figure 24:
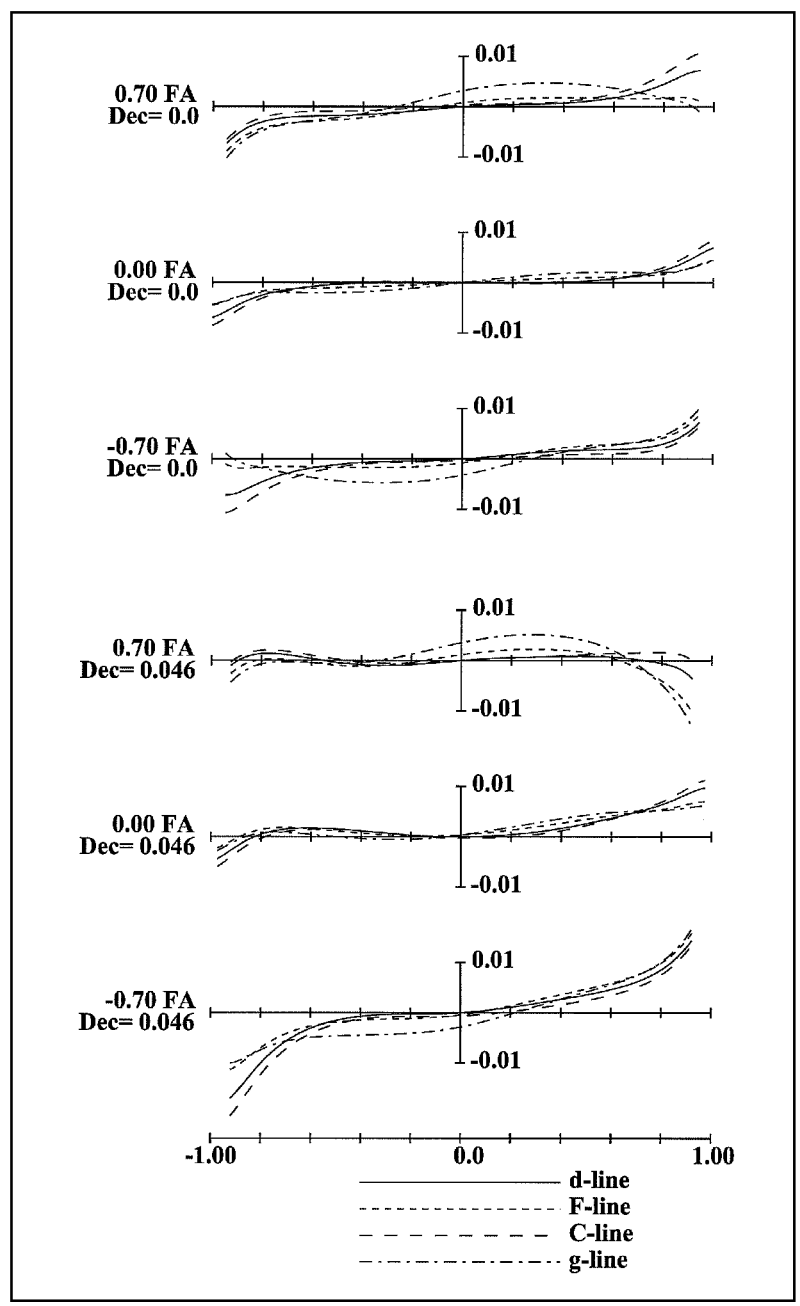
FIG. 24 is a lateral aberration diagram of a zoom lens system according to Example 8 at a telephoto limit in a basic state where image blur compensation is not performed and in an image blur compensation state.

As shown in FIG. 22, the zoom lens system according to Embodiment 8, in order from the object side to the image side, comprises: a first lens unit G1 having negative optical power; a second lens unit G2 having positive optical power; a third lens unit G3 having negative optical power; and a fourth lens unit G4 having negative optical power.

In the zoom lens system according to Embodiment 8, the first lens unit G1, in order from the object side to the image side, comprises: a negative meniscus first lens element L1 with the convex surface facing the object side; a negative meniscus second lens element L2 with the convex surface facing the object side; and a positive meniscus third lens element L3 with the convex surface facing the object side. Among these, the second lens element L2 has two aspheric surfaces, and the third lens element L3 has two aspheric surfaces.

In the zoom lens system according to Embodiment 8, the second lens unit G2, in order from the object side to the image side, comprises: a bi-convex fourth lens element L4; a bi-concave fifth lens element L5; and a bi-convex sixth lens element L6. Among these, the fourth lens element L4 and the fifth lens element L5 are cemented with each other. The sixth lens element L6 has two aspheric surfaces.

In the zoom lens system according to Embodiment 8, the third lens unit G3 comprises solely a negative meniscus seventh lens element L7 with the convex surface facing the image side. The seventh lens element L7 has two aspheric surfaces.

In the zoom lens system according to Embodiment 8, the fourth lens unit G4 comprises solely a negative meniscus eighth lens element L8 with the convex surface facing the image side. The eighth lens element L8 has two aspheric surfaces.

In the zoom lens system according to Embodiment 8, on the object side relative to the second lens unit G2 (i.e., between the third lens element L3 and the fourth lens element L4), an aperture diaphragm A is provided. On the object side relative to the image surface S (i.e., between the image surface S and the eighth lens element L8), a plane parallel plate P is provided.

In the zoom lens system according to Embodiment 8, in zooming from a wide-angle limit to a telephoto limit at the time of image taking, the first lens unit G1 moves to the object side with locus of a convex to the image side, the second lens unit G2 monotonically moves to the object side, the third lens unit G3 monotonically moves to the object side, and the fourth lens unit G4 is fixed relative to the image surface S. That is, in zooming, the first lens unit G1, the second lens unit G2, and the third lens unit G3 individually move along the optical axis such that the interval between the first lens unit G1 and the second lens unit G2 should decrease, the interval between the second lens unit G2 and the third lens unit G3 should increase, and the interval between the third lens unit G3 and the fourth lens unit G4 should increase. Further, in zooming from a wide-angle limit to a telephoto limit at the time of image taking, the aperture diaphragm A moves along the optical axis together with the second lens unit G2.

In the zoom lens system according to Embodiment 8, in focusing from an infinity in-focus condition to a close-object in-focus condition, the third lens unit G3 moves to the image side along the optical axis.

In the zoom lens system according to Embodiment 8, the second lens unit G2 corresponds to an escaping lens unit described later. Then, at the time of retracting, the second lens unit G2 escapes along an axis different from that at the time of image taking.

In the zoom lens system according to Embodiment 8, by moving the second lens unit G2 in a direction perpendicular to the optical axis, image point movement caused by vibration of the entire system is compensated. That is, image blur caused by hand blurring, vibration and the like can be compensated optically.

Figure 25:
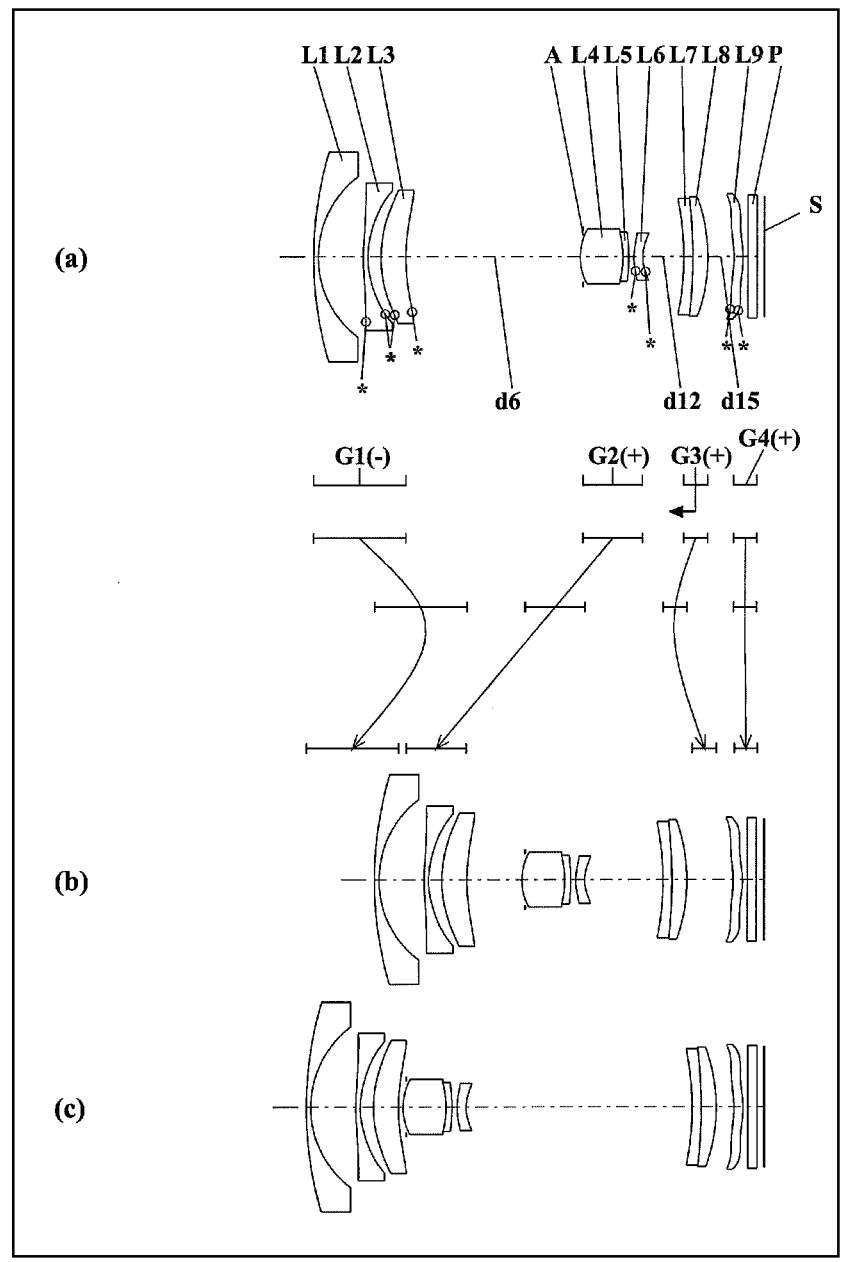
FIG. 25 is a lens arrangement diagram showing an infinity in-focus condition of a zoom lens system according to Embodiment 9 (Example 9)
Figure 26:
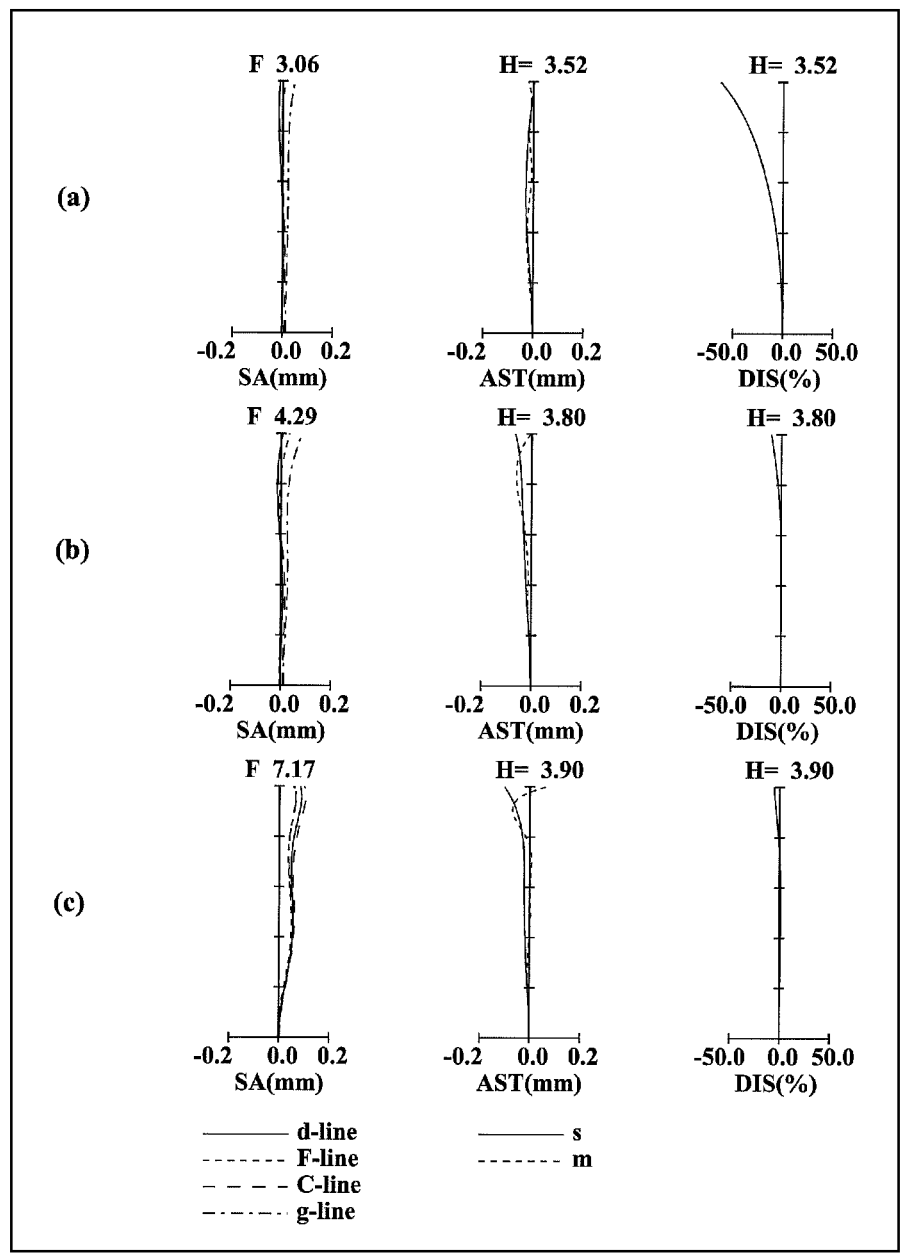
FIG. 26 is a longitudinal aberration diagram of an infinity in-focus condition of a zoom lens system according to Example 9.
Figure 27:
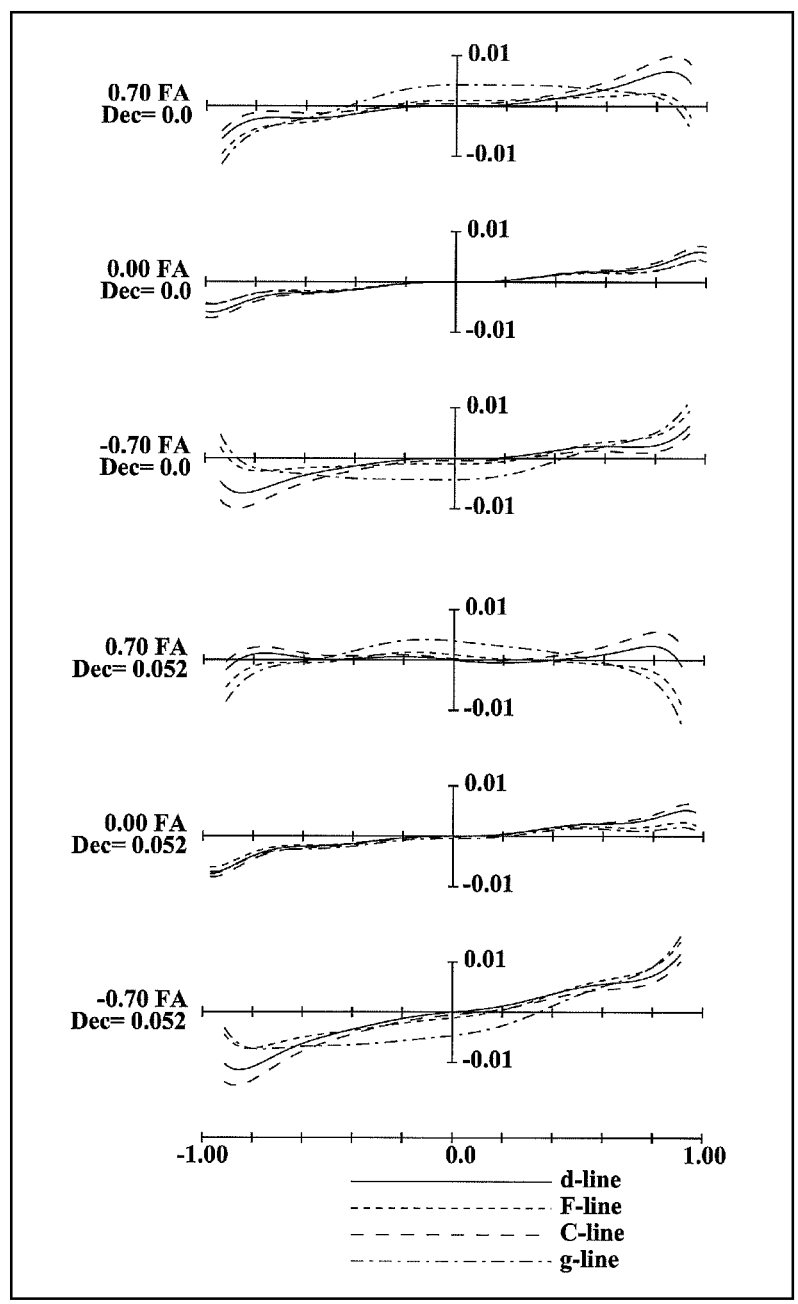
FIG. 27 is a lateral aberration diagram of a zoom lens system according to Example 9 at a telephoto limit in a basic state where image blur compensation is not performed and in an image blur compensation state.

As shown in FIG. 25, the zoom lens system according to Embodiment 9, in order from the object side to the image side, comprises: a first lens unit G1 having negative optical power; a second lens unit G2 having positive optical power; a third lens unit G3 having positive optical power; and a fourth lens unit G4 having positive optical power.

In the zoom lens system according to Embodiment 9, the first lens unit G1, in order from the object side to the image side, comprises: a negative meniscus first lens element L1 with the convex surface facing the object side; a negative meniscus second lens element L2 with the convex surface facing the object side; and a positive meniscus third lens element L3 with the convex surface facing the object side. Among these, the second lens element L2 has two aspheric surfaces, and the third lens element L3 has two aspheric surfaces.

In the zoom lens system according to Embodiment 9, the second lens unit G2, in order from the object side to the image side, comprises: a bi-convex fourth lens element L4; a negative meniscus fifth lens element L5 with the convex surface facing the image side; and a negative meniscus sixth lens element L6 with the convex surface facing the object side. Among these, the fourth lens element L4 and the fifth lens element L5 are cemented with each other. Further, the sixth lens element L6 has two aspheric surfaces.

In the zoom lens system according to Embodiment 9, the third lens unit G3, in order from the object side to the image side, comprises: a negative meniscus seventh lens element L7 with the convex surface facing the image side; and a positive meniscus eighth lens element L8 with the convex surface facing the image side. The seventh lens element L7 and the eighth lens element L8 are cemented with each other.

In the zoom lens system according to Embodiment 9, the fourth lens unit G4 comprises solely a positive meniscus ninth lens element L9 with the convex surface facing the image side. The ninth lens element L9 has two aspheric surfaces.

In the zoom lens system according to Embodiment 9, on the object side relative to the second lens unit G2 (i.e., between the third lens element L3 and the fourth lens element L4), an aperture diaphragm A is provided. On the object side relative to the image surface S (i.e., between the image surface S and the ninth lens element L9), a plane parallel plate P is provided.

In the zoom lens system according to Embodiment 9, in zooming from a wide-angle limit to a telephoto limit at the time of image taking, the first lens unit G1 moves to the object side with locus of a convex to the image side, the second lens unit G2 monotonically moves to the object side, the third lens unit G3 moves to the image side with locus of a convex to the object side, and the fourth lens unit G4 is fixed relative to the image surface S. That is, in zooming, the first lens unit G1, the second lens unit G2, and the third lens unit G3 individually move along the optical axis such that the interval between the first lens unit G1 and the second lens unit G2 should decrease, the interval between the second lens unit G2 and the third lens unit G3 should increase, and the interval between the third lens unit G3 and the fourth lens unit G4 should temporarily increase and then decrease. Further, in zooming from a wide-angle limit to a telephoto limit at the time of image taking, the aperture diaphragm A moves along the optical axis together with the second lens unit G2.

In the zoom lens system according to Embodiment 9, in focusing from an infinity in-focus condition to a close-object in-focus condition, the third lens unit G3 moves to the object side along the optical axis.

In the zoom lens system according to Embodiment 9, a part of the first lens unit G1 corresponds to an escaping lens unit described later. Then, at the time of retracting, the part of the first lens unit G1 escapes along an axis different from that at the time of image taking.

In the zoom lens system according to Embodiment 9, by moving the second lens unit G2 in a direction perpendicular to the optical axis, image point movement caused by vibration of the entire system is compensated. That is, image blur caused by hand blurring, vibration and the like can be compensated optically.

Figure 28:
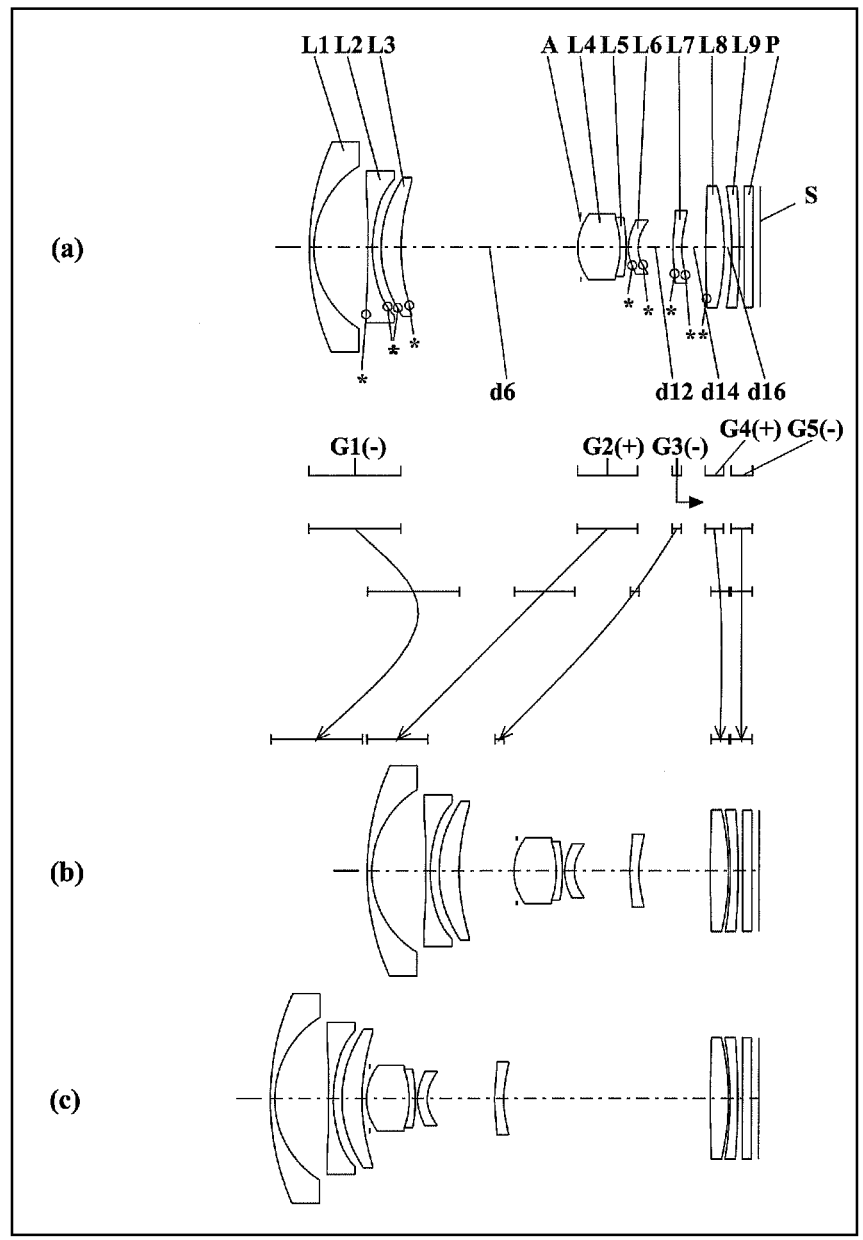
FIG. 28 is a lens arrangement diagram showing an infinity in-focus condition of a zoom lens system according to Embodiment 10 (Example 10)
Figure 29:
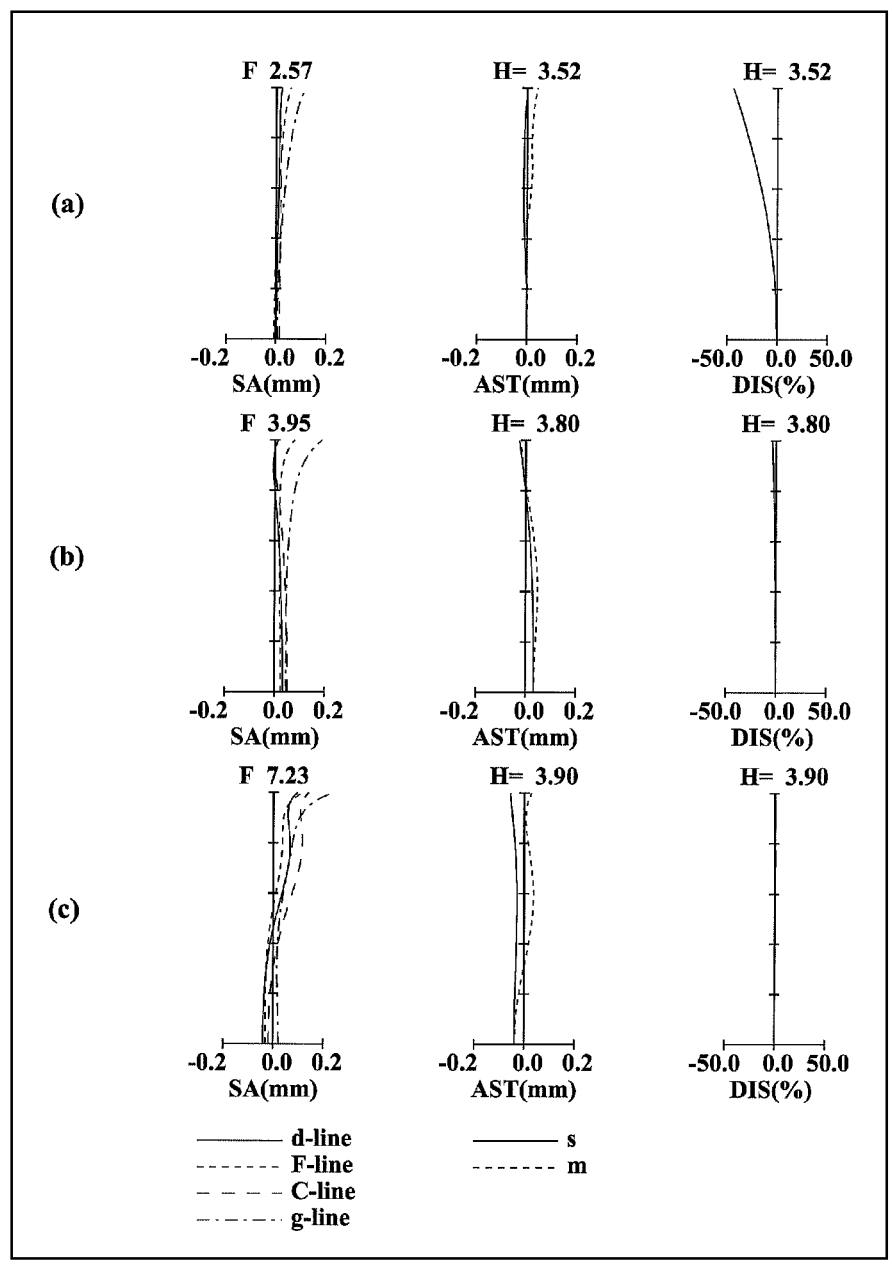
FIG. 29 is a longitudinal aberration diagram of an infinity in-focus condition of a zoom lens system according to Example 10.
Figure 30:
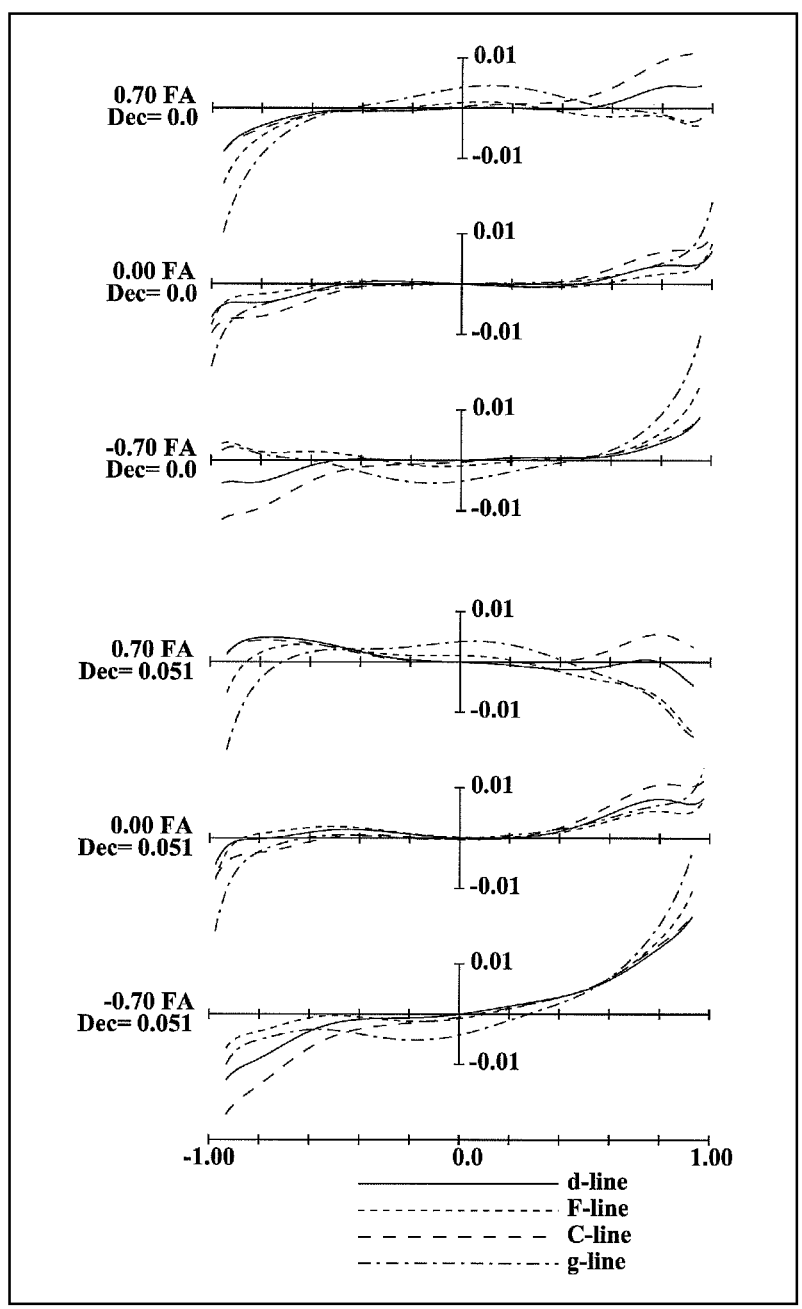
FIG. 30 is a lateral aberration diagram of a zoom lens system according to Example 10 at a telephoto limit in a basic state where image blur compensation is not performed and in an image blur compensation state.

As shown in FIG. 28, the zoom lens system according to Embodiment 10, in order from the object side to the image side, comprises: a first lens unit G1 having negative optical power; a second lens unit G2 having positive optical power; a third lens unit G3 having negative optical power; a fourth lens unit G4 having positive optical power; and a fifth lens unit G5 having negative optical power.

In the zoom lens system according to Embodiment 10, the first lens unit G1, in order from the object side to the image side, comprises: a negative meniscus first lens element L1 with the convex surface facing the object side; a negative meniscus second lens element L2 with the convex surface facing the object side; and a positive meniscus third lens element L3 with the convex surface facing the object side. Among these, the second lens element L2 has two aspheric surfaces, and the third lens element L3 has two aspheric surfaces.

In the zoom lens system according to Embodiment 10, the second lens unit G2, in order from the object side to the image side, comprises: a bi-convex fourth lens element L4; a negative meniscus fifth lens element L5 with the convex surface facing the image side; and a negative meniscus sixth lens element L6 with the convex surface facing the object side. Among these, the fourth lens element L4 and the fifth lens element L5 are cemented with each other. Further, the sixth lens element L6 has two aspheric surfaces.

In the zoom lens system according to Embodiment 10, the third lens unit G3 comprises solely a negative meniscus seventh lens element L7 with the convex surface facing the object side. The seventh lens element L7 has two aspheric surfaces.

In the zoom lens system according to Embodiment 10, the fourth lens unit G4 comprises solely a bi-convex eighth lens element L8. The eighth lens element L8 has an aspheric object side surface.

In the zoom lens system according to Embodiment 10, the fifth lens unit G5 comprises solely a negative meniscus ninth lens element L9 with the convex surface facing the image side.

In the zoom lens system according to Embodiment 10, on the object side relative to the second lens unit G2 (i.e., between the third lens element L3 and the fourth lens element L4), an aperture diaphragm A is provided. On the object side relative to the image surface S (i.e., between the image surface S and the ninth lens element L9), a plane parallel plate P is provided.

In the zoom lens system according to Embodiment 10, in zooming from a wide-angle limit to a telephoto limit at the time of image taking, the first lens unit G1 moves to the object side with locus of a convex to the image side, the second lens unit G2 monotonically moves to the object side, the third lens unit G3 monotonically moves to the object side, the fourth lens unit G4 monotonically moves to the image side, and the fifth lens unit G5 is fixed relative to the image surface S. That is, in zooming, the first lens unit G1, the second lens unit G2, the third lens unit G3, and the fourth lens unit G4 individually move along the optical axis such that the interval between the first lens unit G1 and the second lens unit G2 should decrease, the interval between the second lens unit G2 and the third lens unit G3 should increase, the interval between the third lens unit G3 and the fourth lens unit G4 should increase, and the interval between the fourth lens unit G4 and the fifth lens unit G5 should decrease. Further, in zooming from a wide-angle limit to a telephoto limit at the time of image taking, the aperture diaphragm A moves along the optical axis together with the second lens unit G2.

In the zoom lens system according to Embodiment 10, in focusing from an infinity in-focus condition to a close-object in-focus condition, the third lens unit G3 moves to the image side along the optical axis.

In the zoom lens system according to Embodiment 10, a part of the first lens unit G1 corresponds to an escaping lens unit described later. Then, at the time of retracting, the part of the first lens unit G1 escapes along an axis different from that at the time of image taking.

In the zoom lens system according to Embodiment 10, by moving the second lens unit G2 in a direction perpendicular to the optical axis, image point movement caused by vibration of the entire system is compensated. That is, image blur caused by hand blurring, vibration and the like can be compensated optically.

Figure 31:
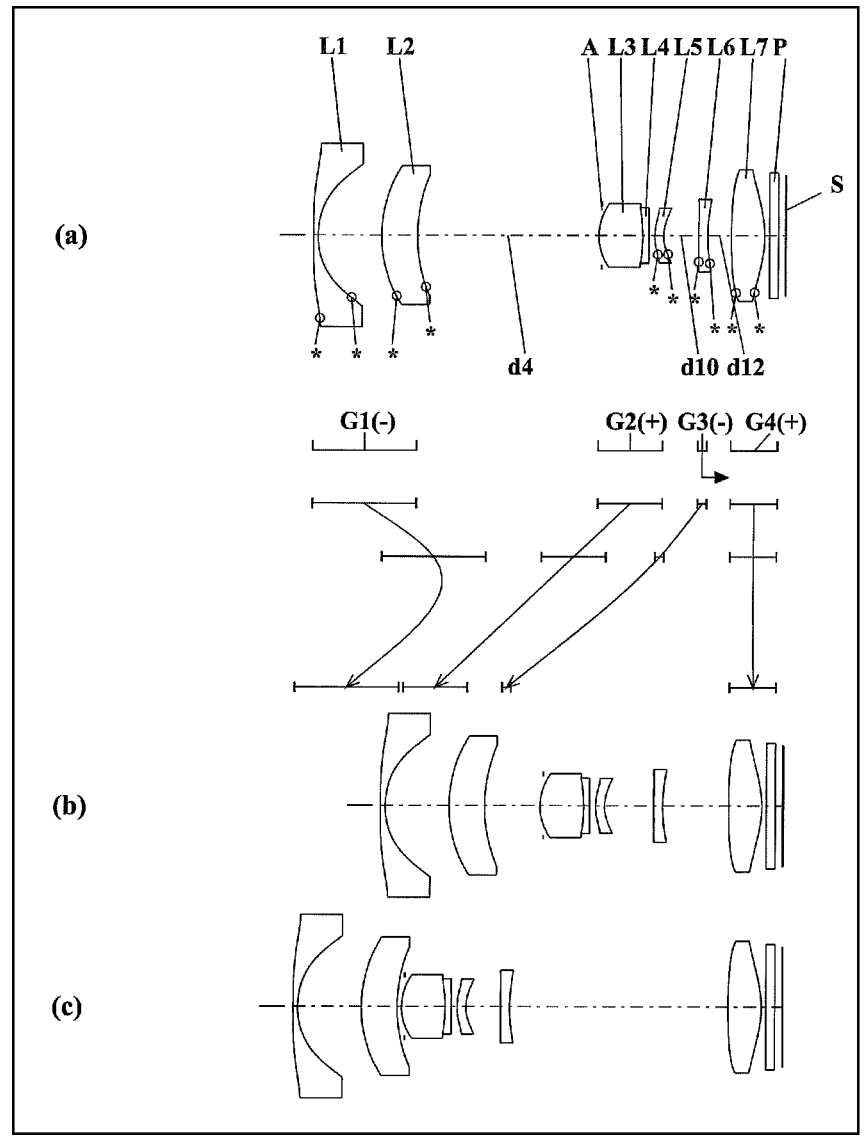
FIG. 31 is a lens arrangement diagram showing an infinity in-focus condition of a zoom lens system according to Embodiment 11 (Example 11)
Figure 32:
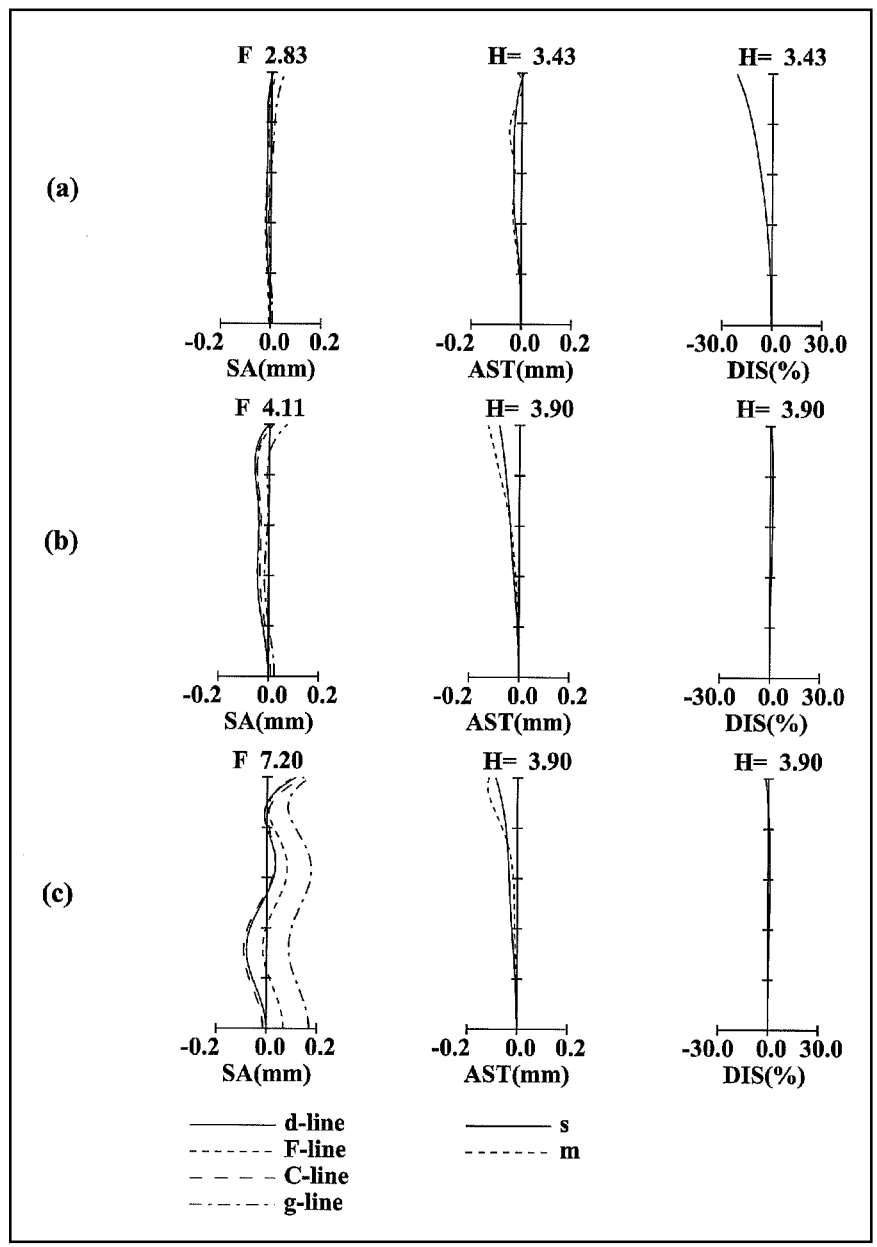
FIG. 32 is a longitudinal aberration diagram of an infinity in-focus condition of a zoom lens system according to Example 11.
Figure 33:
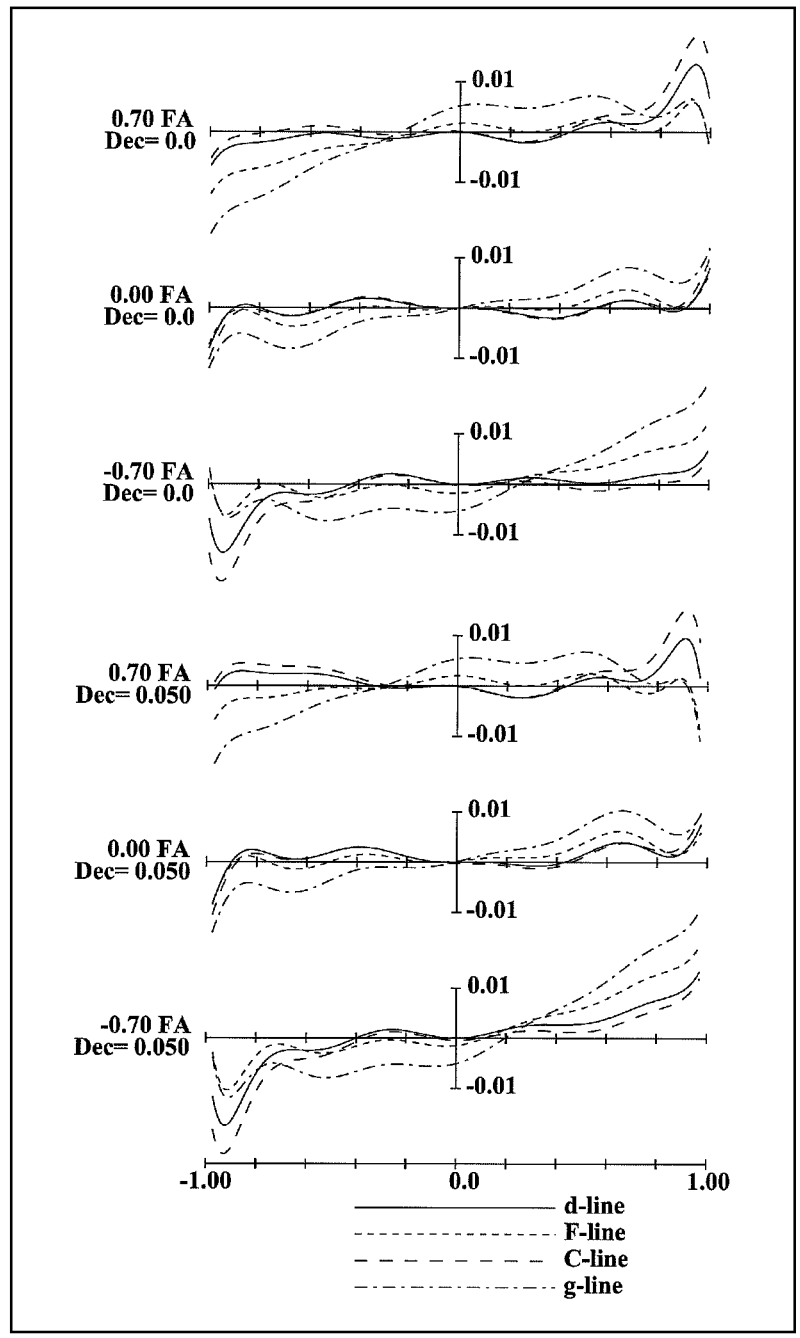
FIG. 33 is a lateral aberration diagram of a zoom lens system according to Example 11 at a telephoto limit in a basic state where image blur compensation is not performed and in an image blur compensation state.

As shown in FIG. 31, the zoom lens system according to Embodiment 11, in order from the object side to the image side, comprises: a first lens unit G1 having negative optical power; a second lens unit G2 having positive optical power; a third lens unit G3 having negative optical power; and a fourth lens unit G4 having positive optical power.

In the zoom lens system according to Embodiment 11, the first lens unit G1, in order from the object side to the image side, comprises: a negative meniscus first lens element L1 with the convex surface facing the object side; and a positive meniscus second lens element L2 with the convex surface facing the object side. The first lens element L1 has two aspheric surfaces, and the second lens element L2 has two aspheric surfaces.

In the zoom lens system according to Embodiment 11, the second lens unit G2, in order from the object side to the image side, comprises: a bi-convex third lens element L3; a negative meniscus fourth lens element L4 with the convex surface facing the image side; and a negative meniscus fifth lens element L5 with the convex surface facing the object side. Among these, the third lens element L3 and the fourth lens element L4 are cemented with each other. Further, the fifth lens element L5 has two aspheric surfaces.

In the zoom lens system according to Embodiment 11, the third lens unit G3 comprises solely a negative meniscus sixth lens element L6 with the convex surface facing the object side. The sixth lens element L6 has two aspheric surfaces.

In the zoom lens system according to Embodiment 11, the fourth lens unit G4 comprises solely a bi-convex seventh lens element L7. The seventh lens element L7 has an aspheric object side surface.

In the zoom lens system according to Embodiment 11, on the object side relative to the second lens unit G2 (i.e., between the second lens element L2 and the third lens element L3), an aperture diaphragm A is provided. On the object side relative to the image surface S (i.e., between the image surface S and the seventh lens element L7), a plane parallel plate P is provided.

In the zoom lens system according to Embodiment 11, in zooming from a wide-angle limit to a telephoto limit at the time of image taking, the first lens unit G1 moves to the object side with locus of a convex to the image side, the second lens unit G2 monotonically moves to the object side, the third lens unit G3 monotonically moves to the object side, and the fourth lens unit G4 is fixed relative to the image surface S. That is, in zooming, the first lens unit G1, the second lens unit G2, and the third lens unit G3 individually move along the optical axis such that the interval between the first lens unit G1 and the second lens unit G2 should decrease, the interval between the second lens unit G2 and the third lens unit G3 should increase, and the interval between the third lens unit G3 and the fourth lens unit G4 should increase. Further, in zooming from a wide-angle limit to a telephoto limit at the time of image taking, the aperture diaphragm A moves along the optical axis together with the second lens unit G2.

In the zoom lens system according to Embodiment 11, in focusing from an infinity in-focus condition to a close-object in-focus condition, the third lens unit G3 moves to the image side along the optical axis.

In the zoom lens system according to Embodiment 11, the second lens unit G2 corresponds to an escaping lens unit described later. Then, at the time of retracting, the second lens unit G2 escapes along an axis different from that at the time of image taking.

In the zoom lens system according to Embodiment 11, by moving the second lens unit G2 in a direction perpendicular to the optical axis, image point movement caused by vibration of the entire system is compensated. That is, image blur caused by hand blurring, vibration and the like can be compensated optically.

In the zoom lens systems according to Embodiments 1 to 11, the first lens unit G1, in order from the object side to the image side, comprises: a lens element having negative optical power; and a lens element having positive optical power and having a meniscus shape with the convex surface facing the object side. Thus, in a state that various kinds of aberrations, especially, distortion at a wide-angle limit, are compensated satisfactorily, a reduced overall length of lens system can be realized.

In the zoom lens systems according to Embodiments 1 to 11, the first lens unit G1 includes at least one lens element having an aspheric surface. Thus, distortion can be compensated more satisfactorily. Further, the first lens unit G1 is composed of three or less lens elements. Thus, the total number of lens elements is reduced and hence the overall length of lens system is reduced.

In the zoom lens systems according to Embodiments 1 to 11, the second lens unit G2 includes at least one lens element having an aspheric surface. Thus, various kinds of aberrations, especially, spherical aberration, can be compensated more satisfactorily.

In the zoom lens systems according to Embodiments 1 to 11, the third lens unit G3 is composed of two or less lens elements. Thus, the total number of lens elements is reduced and hence the overall length of lens system is reduced. Further, in focusing from an infinity in-focus condition to a close-object in-focus condition, the third lens unit G3 located on the image side relative to the aperture diaphragm A and composed of two or less lens elements moves along the optical axis. Thus, quick focusing is easily achieved. In particular, high optical performance is obtained even in a close-object in-focus condition.

In the zoom lens systems according to Embodiments 1 to 11, the lens unit located on the most image side is composed of two or less lens elements. Thus, the total number of lens elements is reduced and hence the overall length of lens system is reduced.

In the zoom lens systems according to Embodiments 1 to 11, in zooming from a wide-angle limit to a telephoto limit at the time of image taking, zooming is achieved by individually moving, along the optical axis, at least three lens units among the lens units constituting the zoom lens system. Then, any one lens unit among these lens units constituting the zoom lens system or alternatively a sub lens unit composed of a part of any lens unit is moved in a direction perpendicular to the optical axis so that image point movement caused by vibration of the entire system can be compensated, that is, image blur caused by hand blurring, vibration and the like can be compensated optically. When compensating image point movement caused by vibration of the entire system, for example, the second lens unit G2 or the third lens unit G3 moves in the direction perpendicular to the optical axis, so that image blur is compensated in a state that size increase in the entire zoom lens system is suppressed to realize a compact construction and that excellent imaging characteristics such as small decentering coma aberration and small decentering astigmatism are satisfied.

Here, the term "a sub lens unit composed of a part of any lens unit" indicates, in a case that a single lens unit is composed of a plurality of lens elements, any one lens element or a plurality of adjacent lens elements among the plurality of lens elements.

The following description is given for conditions preferred to be satisfied by a zoom lens system like the zoom lens systems according to Embodiments 1 to 11. Here, a plurality of preferable conditions are set forth for the zoom lens system according to each embodiment. A construction that satisfies all the plural conditions is most desirable for the zoom lens system. However, when an individual condition is satisfied, a zoom lens system having the corresponding effect is obtained.

For example, in a zoom lens system like the zoom lens systems according to Embodiments 1 to 4, 7 to 9, and 11 which has a plurality of lens units, each lens unit being composed of at least one lens element, and which comprises, in order from the object side to the image side: a first lens unit having negative optical power; a second lens unit having positive optical power; a third lens unit having negative optical power; and a fourth lens unit having positive optical power, wherein the third lens unit is composed of two or less lens elements, wherein the fourth lens unit is composed of two or less lens elements, and wherein the first lens unit has at least one air space between lens elements constituting the first lens unit (this lens configuration is referred to as basic configuration I of the embodiment, hereinafter), the following condition (1) is satisfied. Further, in a zoom lens system like the zoom lens systems according to Embodiments 1 to 11 which has a plurality of lens units, each lens unit being composed of at least one lens element, and which comprises, in order from the object side to the image side: a first lens unit having negative optical power; a second lens unit having positive optical power; and at least one subsequent lens unit, wherein in zooming from a wide-angle limit to a telephoto limit at the time of image taking, at least three lens units among the lens units individually move along the optical axis so that magnification change is achieved, wherein a lens unit located on the most image side among the lens units belonging to the subsequent lens units is composed of two or less lens elements, and wherein the first lens unit is composed of three or less lens elements including a lens element having positive optical power and a lens element having negative optical power, and has at least one air space between lens elements constituting the first lens unit (this lens configuration is referred to as basic configuration II of the embodiment, hereinafter), the following conditions (1), (2), and (3) are satisfied.

$$D_{air}/f_W > 0.75 \tag{1}$$

$$D_{air} \times \tan(\omega_W/2)/f_{G1} < -0.23 \tag{2}$$

$$D_{back}/f_W < 1.50 \tag{3}$$

where, $D_{air}$ is an air space located on the most object side in the first lens unit, $f_W$ is a focal length of the entire system at a wide-angle limit, $\omega_W$ is a half value of a maximum view angle)(°) at a wide-angle limit, $f_{G1}$ is a focal length of the first lens unit, and $D_{back}$ is a distance from an image side surface of a lens element located on the most image side in the entire system to an image surface.

The condition (1) relates to the air space between the lens elements in the first lens unit. When the value goes below the lower limit of the condition (1), compensation of magnification chromatic aberration at a wide-angle limit becomes difficult.

The condition (2) relates to the air space between the lens elements in the first lens unit. When the value exceeds the upper limit of the condition (2), compensation of magnification chromatic aberration at a wide-angle limit becomes difficult.

The condition (3) relates to the back focal distance of the zoom lens system. When the value exceeds the upper limit of the condition (3), the back focal distance becomes excessively long and hence the overall length of lens system becomes long.

When at least one of the following conditions (1)' and (3)' is satisfied, the above-mentioned effect is achieved more successfully.

$$D_{air}/f_W > 0.85 \tag{1}'$$

$$D_{back}/f_W < 1.00 \tag{3}'$$

In a zoom lens system like the zoom lens systems according to Embodiments 1 to 4, 7 to 9, and 11, which has the basic configuration I and in which the first lens unit includes at least one lens element having negative optical power and at least one lens element having positive optical power, or alternatively in a zoom lens system like the zoom lens systems according to Embodiments 1 to 11, which has the basic configuration II, it is preferable that the following condition (4) is satisfied.

$$15 < v_{1n} - V_{1P} < 40 \tag{4}$$

where, $v_{1n}$ is an average of Abbe numbers to the d-line of the lens elements having negative optical power contained in the first lens unit, and $v_{1p}$ is an average of Abbe numbers to the d-line of the lens elements having positive optical power contained in the first lens unit.

The condition (4) sets forth the relationship between the Abbe number of the lens element having negative optical power and the Abbe number of the lens element having positive optical power, these lens elements are contained in the first lens unit. When the value goes below the lower limit of the condition (4), compensation of magnification chromatic aberration generated at a wide-angle limit becomes difficult. On the other hand, when the value exceeds the upper limit of the condition (4), a refractive index of the lens element having negative optical power becomes lower and hence achievement in size reduction becomes difficult.

When at least one of the following conditions (4)' and (4)" is satisfied, the above-mentioned effect is achieved more successfully.

$$20 < v_{1n} - v_{1p} \tag{4}'$$

$$v_{1n} - v_{1p} < 35 \tag{4}''$$

In a zoom lens system having the basic configuration I like the zoom lens systems according to Embodiments 1 to 4, 7 to 9, and 11, or alternatively in a zoom lens system having the basic configuration II like the zoom lens systems according to Embodiments 1 to 11, it is preferable that the following condition (5) is satisfied.

$$1.4 < \sqrt{(-f_{G1} \times f_{G2})}/Ir < 2.0 \quad (5)$$

where, $f_{G1}$ is a focal length of the first lens unit,
$f_{G2}$ is a focal length of the second lens unit,
Ir is a maximum image height ($Ir = f_T \times \tan(\omega_T)$),
$f_T$ is a focal length of the entire system at a telephoto limit, and
$\omega_T$ is a half value of a maximum view angle)(°) at a telephoto limit.

The condition (5) sets forth the relationship between the focal length of the first lens unit and the focal length of the second lens unit. When the value goes below the lower limit of the condition (5), the optical power of the second lens unit becomes excessively strong and hence compensation of curvature of field associated with zooming becomes difficult. On the other hand, when the value exceeds the upper limit of the condition (5), the optical power of the first lens unit becomes weak and hence it becomes difficult to achieve satisfactory wide-angle performance.

In a zoom lens system having the basic configuration I like the zoom lens systems according to Embodiments 1 to 4, 7 to 9, and 11, or alternatively in a zoom lens system having the basic configuration II like the zoom lens systems according to Embodiments 1 to 11, it is preferable that the following condition (6) is satisfied.

$$n_{L1} > 1.70 \quad (6)$$

where, $n_{L1}$ is a refractive index to the d-line of a lens element located on the most object side in the first lens unit.

The condition (6) sets forth the refractive index to d-line of the lens element located on the most object side in the first lens unit, that is, of the first lens element. When the value goes below the lower limit of the condition (6), thickness reduction in the first lens element becomes difficult. Thus, a compact construction of a lens barrel becomes difficult.

When the following condition (6)' is satisfied, the above-mentioned effect is achieved more successfully.

$$n_{L1} > 1.85 \quad (6)'$$

In a zoom lens system having the basic configuration I like the zoom lens systems according to Embodiments 1 to 4, 7 to 9, and 11, or alternatively in a zoom lens system having the basic configuration II like the zoom lens systems according to Embodiments 1 to 11, it is preferable that the following condition (7) is satisfied.

$$0.85 < L_W/L_T < 1.15 \quad (7)$$

where, $L_W$ is an overall length of lens system at a wide-angle limit (a distance from a lens surface on the most object side in the first lens unit to an image surface at a wide-angle limit), and $L_T$ is an overall length of lens system at a telephoto limit (a distance from a lens surface on the most object side in the first lens unit to the image surface at a telephoto limit).

The condition (7) sets forth the ratio between the overall length of lens system at a wide-angle limit and the overall length of lens system at a telephoto limit. When the value goes below the lower limit of the condition (7), the amount of movement of the second lens unit becomes large and hence the overall length of lens system becomes long. Thus, it becomes difficult to provide compact lens barrel, imaging device, and camera. On the other hand, when the value exceeds the upper limit of the condition (7), the amount of movement of the second lens unit becomes small and hence compensation of curvature of field associated with zooming becomes difficult.

In a zoom lens system like the zoom lens systems according to Embodiments 1 to 4, 7 to 9, and 11, which has the basic configuration I and in which the first lens unit includes at least one lens element having negative optical power, or alternatively in a zoom lens system like the zoom lens systems according to Embodiments 1 to 11, which has the basic configuration II, it is preferable that the following condition (8) is satisfied.

$$D_n/\sqrt{(f_W \times f_T)} < 0.070 \quad (8)$$

where, $D_n$ is a center thickness of a lens element having negative optical power and being located on the most image side in the first lens unit,
$f_W$ is a focal length of the entire system at a wide-angle limit, and
$f_T$ is a focal length of the entire system at a telephoto limit.

The condition (8) relates to the center thickness of the lens element having negative optical power located on the most image side in the first lens unit. When the value exceeds the upper limit of the condition (8), the center thickness of the first lens unit becomes large and hence the overall length of zoom lens system becomes long. Thus, it becomes difficult to provide compact lens barrel, imaging device, and camera.

When the following condition (8)' is satisfied, the above-mentioned effect is achieved more successfully.

$$D_n/\sqrt{(f_W \times f_T)} < 0.055 \quad (8)'$$

In a zoom lens system having the basic configuration I like the zoom lens systems according to Embodiments 1 to 4, 7 to 9, and 11, or alternatively in a zoom lens system having the basic configuration II like the zoom lens systems according to Embodiments 1 to 11, it is preferable that the following condition (9) is satisfied.

$$n_{G1ave} > 1.8 \quad (9)$$

where, $n_{G1ave}$ is an average of refractive indices to the d-line of the lens elements constituting the first lens unit.

The condition (9) relates to the refractive index to the d-line of the lens element constituting the first lens unit. When the value goes below the lower limit of the condition (9), thickness reduction in the first lens unit becomes difficult. Thus, a compact construction of a lens barrel becomes difficult.

In a zoom lens system having the basic configuration I like the zoom lens systems according to Embodiments 1 to 4, 7 to 9, and 11, or alternatively in a zoom lens system having the basic configuration II like the zoom lens systems according to Embodiments 1 to 11, it is preferable that the following condition (10) is satisfied.

$$v_{G2} > 60 \quad (10)$$

where, $v_{G2}$ is a maximum of Abbe numbers to the d-line of the lens elements constituting the second lens unit.

The condition (10) relates to the Abbe number to the d-line of the lens element constituting the second lens unit. When the value goes below the lower limit of the condition (10), control of fluctuation of axial chromatic aberration associated with zooming becomes difficult.

In a zoom lens system having the basic configuration I like the zoom lens systems according to Embodiments 1 to 4, 7 to 9, and 11, or alternatively in a zoom lens system having the basic configuration II like the zoom lens systems according to Embodiments 1 to 11, it is preferable that either a part of the lens elements constituting the first lens unit or the second lens unit is an escaping lens unit which, at the time of retracting, escapes along an axis different from that at the time of image taking.

When either a part of the lens elements constituting the first lens unit or the second lens unit serves as an escaping lens unit and, at the time of retracting, the escaping lens unit escapes along an axis different from that at the time of image taking, thickness reduction is achieved in a retracting type imaging device in which a lens barrel is extensible. Here, in a case that the escaping lens unit is a part of the lens elements constituting the first lens unit, the escaping lens unit may be any one lens element or a plurality of adjacent lens elements among all the lens elements constituting the first lens unit.

In a zoom lens system having the basic configuration I like the zoom lens systems according to Embodiments 1 to 4, 7 to 9, and 11, or alternatively in a zoom lens system having the basic configuration II like the zoom lens systems according to Embodiments 1 to 11, it is preferable that the lens element located on the most object side in the first lens unit, that is, the first lens element, has a shape convex to the object side.

When the first lens element has a shape convex to the object side, compensation of astigmatism at a wide-angle limit becomes easier.

Here, in a zoom lens system having the basic configuration II like the zoom lens systems according to Embodiments 1 to 11, the number of lens units constituting the subsequent lens units is not limited in particular. Further, the optical power of each lens unit is not limited to a particular kind.

Each of the lens units constituting the zoom lens system according to any of Embodiments 1 to 11 is composed exclusively of refractive type lens elements that deflect the incident light by refraction (that is, lens elements of a type in which deflection is achieved at the interface between media each having a distinct refractive index). However, the present invention is not limited to this. For example, the lens units may employ diffractive type lens elements that deflect the incident light by diffraction; refractive-diffractive hybrid type lens elements that deflect the incident light by a combination of diffraction and refraction; or gradient index type lens elements that deflect the incident light by distribution of refractive index in the medium. In particular, in refractive-diffractive hybrid type lens elements, when a diffraction structure is formed in the interface between media having mutually different refractive indices, wavelength dependence in the diffraction efficiency is improved. Thus, such a configuration is preferable.

Moreover, in each embodiment, a configuration has been described that on the object side relative to the image surface S (that is, between the image surface S and the most image side lens surface of the lens unit located on the most image side), a plane parallel plate P such as an optical low-pass filter and a face plate of an image sensor is provided. This low-pass filter may be: a birefringent type low-pass filter made of, for example, a crystal whose predetermined crystal orientation is adjusted; or a phase type low-pass filter that achieves required characteristics of optical cut-off frequency by diffraction.

Embodiment 12

Figure 34:
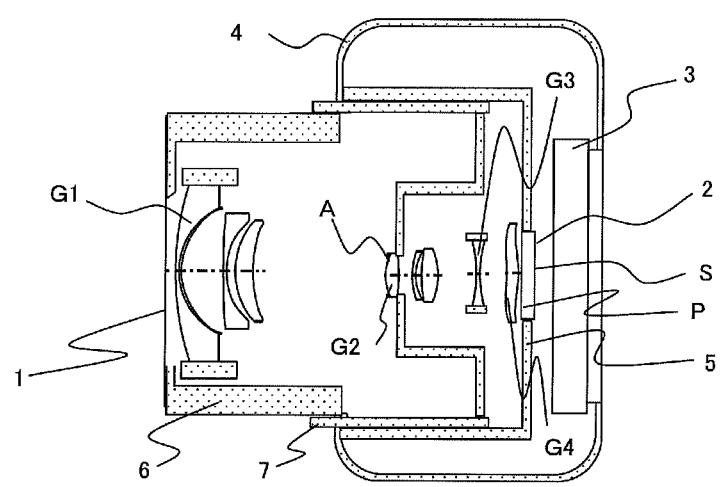
FIG. 34 is a schematic construction diagram of a digital still camera according to Embodiment 12.

FIG. 34 is a schematic construction diagram of a digital still camera according to Embodiment 12. In FIG. 34, the digital still camera comprises: an imaging device having a zoom lens system 1 and an image sensor 2 composed of a CCD; a liquid crystal display monitor 3; and a body 4. The employed zoom lens system 1 is a zoom lens system according to Embodiment 1. In FIG. 34, the zoom lens system 1, in order from the object side to the image side, comprises a first lens unit G1, an aperture diaphragm A, a second lens unit G2, a third lens unit G3, and a fourth lens unit G4. In the body 4, the zoom lens system 1 is arranged on the front side, while the image sensor 2 is arranged on the rear side of the zoom lens system 1. On the rear side of the body 4, the liquid crystal display monitor 3 is arranged, while an optical image of a photographic object generated by the zoom lens system 1 is formed on an image surface S.

The lens barrel comprises a main barrel 5, a moving barrel 6 and a cylindrical cam 7. When the cylindrical cam 7 is rotated, the first lens unit G1, the aperture diaphragm A and the second lens unit G2, the third lens unit G3, and the fourth lens unit G4 move to predetermined positions relative to the image sensor 2, so that zooming from a wide-angle limit to a telephoto limit is achieved. The third lens unit G3 is movable in an optical axis direction by a motor for focus adjustment.

As such, when the zoom lens system according to Embodiment 1 is employed in a digital still camera, a small digital still camera is obtained that has a high resolution and high capability of compensating the curvature of field and that has a short overall length of lens system at the time of non-use. Here, in the digital still camera shown in FIG. 34, any one of the zoom lens systems according to Embodiments 2 to 11 may be employed in place of the zoom lens system according to Embodiment 1. Further, the optical system of the digital still camera shown in FIG. 34 is applicable also to a digital video camera for moving images. In this case, moving images with high resolution can be acquired in addition to still images.

Here, the digital still camera according to the present Embodiment 12 has been described for a case that the employed zoom lens system 1 is a zoom lens system according to Embodiments 1 to 11. However, in these zoom lens systems, the entire zooming range need not be used. That is, in accordance with a desired zooming range, a range where satisfactory optical performance is obtained may exclusively be used. Then, the zoom lens system may be used as one having a lower magnification than the zoom lens system described in Embodiments 1 to 11.

Further, Embodiment 12 has been described for a case that the zoom lens system is applied to a lens barrel of so-called barrel retraction construction. However, the present invention is not limited to this. For example, the zoom lens system may be applied to a lens barrel of so-called bending configuration where a prism having an internal reflective surface or a front surface reflective mirror is arranged at an arbitrary position within the first lens unit G1 or the like. Further, in Embodiment 12, the zoom lens system may be applied to a so-called sliding lens barrel in which a part of the lens units constituting the zoom lens system like the entirety of the second lens unit G2, the entirety of the third lens unit G3, the entirety of the fourth lens unit G4, a part of the first lens unit G1, a part of the second lens unit G2, or a part of the third lens unit G3 is caused to escape from the optical axis at the time of barrel retraction.

An imaging device comprising a zoom lens system according to Embodiments 1 to 11, and an image sensor such as a CCD or a CMOS may be applied to a mobile terminal device such as a smart-phone, a surveillance camera in a surveillance system, a Web camera, a vehicle-mounted camera or the like.

The following description is given for numerical examples in which the zoom lens system according to Embodiments 1 to 11 are implemented practically. In the numerical examples, the units of the length in the tables are all "mm", while the units of the view angle are all "°". Moreover, in the numerical examples, r is the radius of curvature, d is the axial distance, nd is the refractive index to the d-line, and vd is the Abbe number to the d-line. In the numerical examples, the surfaces marked with * are aspheric surfaces, and the aspheric surface configuration is defined by the following expression.

$$Z = \frac{h^2/r}{1 + \sqrt{1-(1+\kappa)(h/r)^2}} + \sum A_n h^n$$

Here, the symbols in the formula indicate the following quantities.

Z is a distance from a point on an aspherical surface at a height h relative to the optical axis to a tangential plane at the vertex of the aspherical surface, h is a height relative to the optical axis, r is a radius of curvature at the top, κ is a conic constant, and $A_n$ is a n-th order aspherical coefficient.

FIGS. 2, 5, 8, 11, 14, 17, 20, 23, 26, 29, and 32 are longitudinal aberration diagrams of an infinity in-focus condition of the zoom lens systems according to Numerical Examples 1 to 11, respectively.

In each longitudinal aberration diagram, part (a) shows the aberration at a wide-angle limit, part (b) shows the aberration at a middle position, and part (c) shows the aberration at a telephoto limit. Each longitudinal aberration diagram, in order from the left-hand side, shows the spherical aberration (SA (mm)), the astigmatism (AST (mm)) and the distortion (DIS (%)). In each spherical aberration diagram, the vertical axis indicates the F-number (in each FIG., indicated as F), and the solid line, the short dash line, the long dash line and the one-dot dash line indicate the characteristics to the d-line, the F-line, the C-line and the g-line, respectively. In each astigmatism diagram, the vertical axis indicates the image height (in each FIG., indicated as H), and the solid line and the dash line indicate the characteristics to the sagittal plane (in each FIG., indicated as "s") and the meridional plane (in each FIG., indicated as "m"), respectively. In each distortion diagram, the vertical axis indicates the image height (in each FIG., indicated as H).

FIGS. 3, 6, 9, 12, 15, 18, 21, 24, 27, 30, and 33 are lateral aberration diagrams of the zoom lens systems at a telephoto limit according to Numerical Examples 1 to 11, respectively.

Figure 3:
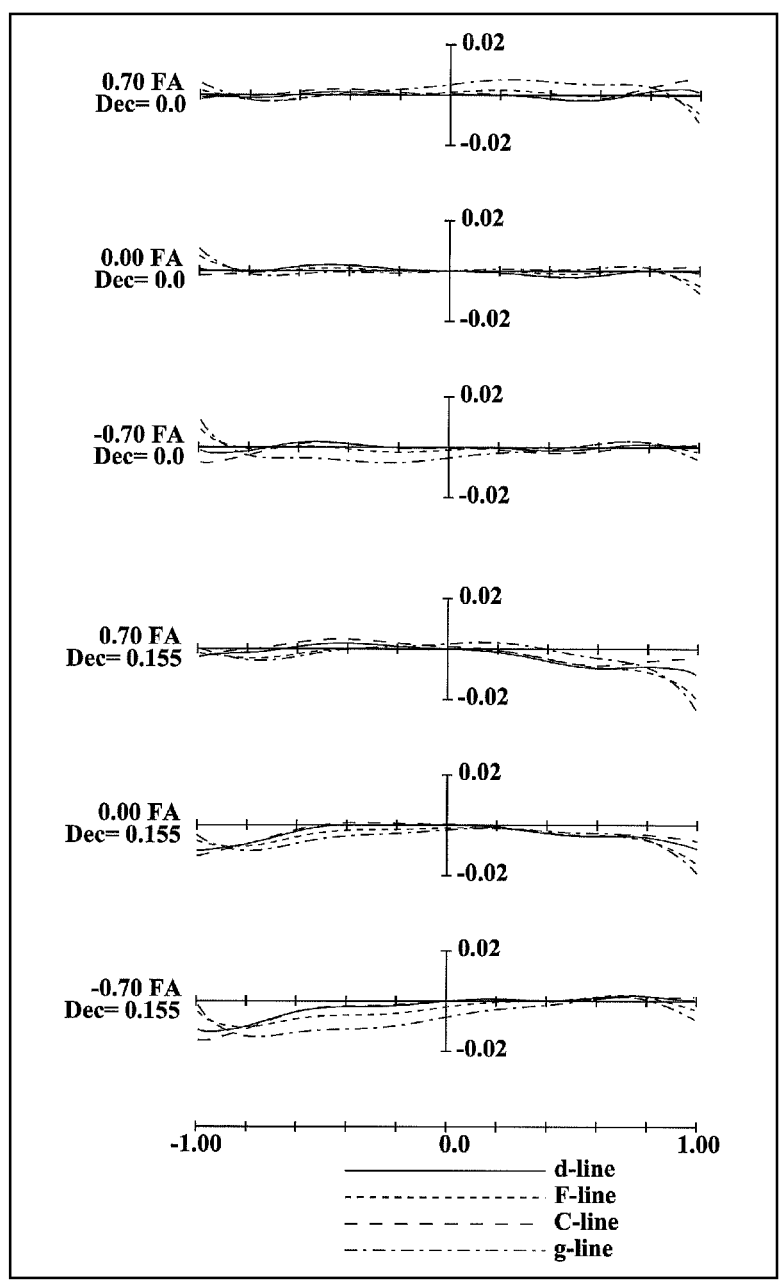
FIG. 3 is a lateral aberration diagram of a zoom lens system according to Example 1 at a telephoto limit in a basic state where image blur compensation is not performed and in an image blur compensation state.

In each lateral aberration diagram, the aberration diagrams in the upper three parts correspond to a basic state where image blur compensation is not performed at a telephoto limit, while the aberration diagrams in the lower three parts correspond to an image blur compensation state where the entirety of the second lens unit G2 (FIGS. 6, 9, 12, 15, 18, 21, 24, 27, 30, and 33) or the entirety of the third lens unit G3 (FIG. 3) is moved by a predetermined amount in a direction perpendicular to the optical axis at a telephoto limit. Among the lateral aberration diagrams of a basic state, the upper part shows the lateral aberration at an image point of 70% of the maximum image height, the middle part shows the lateral aberration at the axial image point, and the lower part shows the lateral aberration at an image point of −70% of the maximum image height. Among the lateral aberration diagrams of an image blur compensation state, the upper part shows the lateral aberration at an image point of 70% of the maximum image height, the middle part shows the lateral aberration at the axial image point, and the lower part shows the lateral aberration at an image point of −70% of the maximum image height. In each lateral aberration diagram, the horizontal axis indicates the distance from the principal ray on the pupil surface, and the solid line, the short dash line, the long dash line and the one-dot dash line indicate the characteristics to the d-line, the F-line, the C-line and the g-line, respectively. In each lateral aberration diagram, the meridional plane is adopted as the plane containing the optical axis of the first lens unit G1 and the optical axis of the second lens unit G2 (FIGS. 6, 9, 12, 15, 18, 21, 24, 27, 30, and 33) or the plane containing the optical axis of the first lens unit G1 and the optical axis of the third lens unit G3 (FIG. 3).

Here, in the zoom lens system according to each numerical example, the amount of movement of the second lens unit G2 or the third lens unit G3 in a direction perpendicular to the optical axis in an image blur compensation state at a telephoto limit is as follows.

Numerical Example 1G3: 0.155 mm

Numerical Example 2G2: 0.045 mm

Numerical Example 3G2: 0.051 mm

Numerical Example 4G2: 0.047 mm

Numerical Example 5G2: 0.055 mm

Numerical Example 6G2: 0.046 mm

Numerical Example 7G2: 0.050 mm

Numerical Example 8G2: 0.046 mm

Numerical Example 9G2: 0.052 mm

Numerical Example 10G2: 0.051 mm

Numerical Example 11G2: 0.050 mm

Here, when the shooting distance is infinity, at a telephoto limit, the amount of image decentering in a case that the zoom lens system inclines by 0.6° is equal to the amount of image decentering in a case that the entirety of the second lens unit G2 or the entirety of the third lens unit G3 displaces in parallel by each of the above-mentioned values in a direction perpendicular to the optical axis.

As seen from the lateral aberration diagrams, satisfactory symmetry is obtained in the lateral aberration at the axial image point. Further, when the lateral aberration at the +70% image point and the lateral aberration at the −70% image point are compared with each other in the basic state, all have a small degree of curvature and almost the same inclination in the aberration curve. Thus, decentering coma aberration and decentering astigmatism are small. This indicates that sufficient imaging performance is obtained even in the image blur compensation state. Further, when the image blur compensation angle of a zoom lens system is the same, the amount of parallel translation required for image blur compensation decreases with decreasing focal length of the entire zoom lens system. Thus, at arbitrary zoom positions, sufficient image blur compensation can be performed for image blur compensation angles up to 0.6° without degrading the imaging characteristics.

NUMERICAL EXAMPLE 1

The zoom lens system of Numerical Example 1 corresponds to Embodiment 1 shown in FIG. 1. Table 1 shows the surface data of the zoom lens system of Numerical Example 1. Table 2 shows the aspherical data. Table 3 shows the various data.

TABLE 1

(Surface data)

| Surface number | r | d | nd | vd |
|---|---|---|---|---|
| Object surface | ∞ | | | |
| 1 | 24.95170 | 0.30000 | 1.88300 | 40.8 |
| 2 | 5.97120 | 0.19790 | 1.51358 | 51.6 |
| 3* | 5.38700 | 3.56040 | | |
| 4* | 59.29000 | 0.30000 | 1.80470 | 41.0 |
| 5* | 7.01370 | 0.75080 | | |
| 6* | 6.67500 | 1.49080 | 2.10200 | 16.8 |
| 7* | 9.91070 | Variable | | |
| 8(Diaphragm) | ∞ | −0.20000 | | |
| 9* | 4.26530 | 1.12310 | 1.51845 | 70.0 |
| 10* | −17.07830 | 1.17920 | | |
| 11 | 6.02700 | 0.30000 | 2.00272 | 19.3 |
| 12 | 3.90690 | 0.50390 | | |
| 13 | 11.83620 | 1.41390 | 1.49700 | 81.6 |
| 14 | −5.96210 | Variable | | |
| 15* | −29.00760 | 0.30000 | 1.51845 | 70.0 |
| 16* | 8.02080 | Variable | | |
| 17* | −14.96380 | 1.00170 | 1.63550 | 23.9 |
| 18* | −5.98480 | 0.31000 | | |
| 19 | ∞ | 0.60000 | 1.51680 | 64.2 |
| 20 | ∞ | (BF) | | |
| Image surface | ∞ | | | |

TABLE 2

(Aspherical data)

Surface No. 3

K = 0.00000E+00, A4 = −7.86733E−04, A6 = 7.82599E−06,
A8 = −1.84746E−06 A10 = 5.79516E−08, A12 = −1.03121E−09,
A14 = 0.00000E+00

Surface No. 4

K = 0.00000E+00, A4 = −4.94021E−04, A6 = 5.31701E−05,
A8 = −2.00273E−06 A10 = 3.38548E−08, A12 = −3.13398E−10,
A14 = 0.00000E+00

Surface No. 5

K = 0.00000E+00, A4 = 1.27038E−04, A6 = 1.48811E−04,
A8 = 6.14678E−06 A10 = −9.91045E−07, A12 = 2.57315E−08,
A14 = −2.43944E−10

Surface No. 6

K = 0.00000E+00, A4 = −1.08448E−03, A6 = 1.82487E−04,
A8 = −1.15643E−05 A10 = 2.21533E−08, A12 = 2.58121E−08,
A14 = −6.00630E−10

Surface No. 7

K = 0.00000E+00, A4 = −1.23095E−03, A6 = 2.16235E−04,
A8 = −3.59700E−05 A10 = 3.26910E−06, A12 = −1.47410E−07,
A14 = 3.13837E−09

Surface No. 9

K = 2.25834E+00, A4 = −4.34026E−03, A6 = −9.18776E−04,
A8 = 1.48894E−04 A10 = −4.11546E−05, A12 = 0.00000E+00,
A14 = 0.00000E+00

Surface No. 10

K = 0.00000E+00, A4 = 1.76847E−03, A6 = −1.68468E−04,
A8 = 5.83587E−05 A10 = −5.32039E−06, A12 = 0.00000E+00,
A14 = 0.00000E+00

Surface No. 15

K = 0.00000E+00, A4 = −6.45503E−03, A6 = 8.85654E−04,
A8 = −9.70663E−05 A10 = 6.65580E−06, A12 = 0.00000E+00,
A14 = 0.00000E+00

Surface No. 16

K = 0.00000E+00, A4 = −5.73196E−03, A6 = 8.40853E−04,
A8 = −9.10932E−05 A10 = 5.19715E−06, A12 = 0.00000E+00,
A14 = 0.00000E+00

TABLE 2-continued (Aspherical data)

Surface No. 17

K = 0.00000E+00, A4 = 7.12216E−03, A6 = −7.52511E−04,
A8 = 4.63397E−05 A10 = −9.81215E−07, A12 = 0.00000E+00,
A14 = 0.00000E+00

Surface No. 18

K = 0.00000E+00, A4 = 1.44194E−02, A6 = −1.53053E−03,
A8 = 8.93429E−05 A10 = −1.84212E−06, A12 = 0.00000E+00,
A14 = 0.00000E+00

TABLE 3

(Various data)

Zooming ratio 4.61717

| | Wide-angle limit | Middle position | Telephoto limit |
|---|---|---|---|
| Focal length | 2.8500 | 5.9056 | 13.1588 |
| F-number | 3.03406 | 4.49182 | 7.17697 |
| View angle | 90.0000 | 36.0000 | 16.3000 |
| Image height | 3.9352 | 3.9443 | 3.8988 |
| Overall length of lens system | 28.0658 | 26.2939 | 28.8187 |
| BF | 0.55607 | 0.53492 | 0.46556 |
| d7 | 9.9567 | 4.4226 | 0.5000 |
| d14 | 3.0353 | 2.6460 | 4.6500 |
| d16 | 1.3860 | 5.5587 | 10.0714 |

Zoom lens unit data

| Lens unit | Initial surface No. | Focal length |
|---|---|---|
| 1 | 1 | −5.59677 |
| 2 | 8 | 6.06499 |
| 3 | 15 | −12.08615 |
| 4 | 17 | 15.04245 |

NUMERICAL EXAMPLE 2

The zoom lens system of Numerical Example 2 corresponds to Embodiment 2 shown in FIG. 4. Table 4 shows the surface data of the zoom lens system of Numerical Example 2. Table 5 shows the aspherical data. Table 6 shows the various data.

TABLE 4

(Surface data)

| Surface number | r | d | nd | vd |
|---|---|---|---|---|
| Object surface | ∞ | | | |
| 1 | 16.96880 | 0.30000 | 1.88300 | 40.8 |
| 2 | 5.55010 | 3.08350 | | |
| 3* | 14.29260 | 0.30000 | 1.80470 | 41.0 |
| 4* | 4.98950 | 0.71300 | | |
| 5* | 6.71340 | 1.21390 | 2.10200 | 16.8 |
| 6* | 10.36480 | Variable | | |
| 7(Diaphragm) | ∞ | −0.20000 | | |
| 8 | 3.49180 | 2.28640 | 1.59282 | 68.6 |
| 9 | −31.73070 | 0.30000 | 1.92286 | 20.9 |
| 10 | 12.55860 | 0.63490 | | |
| 11* | 3.66220 | 1.38520 | 1.52996 | 55.8 |
| 12* | 5.74240 | Variable | | |
| 13* | 155.49560 | 0.60000 | 1.52996 | 55.8 |
| 14* | 9.21920 | Variable | | |
| 15* | 14.29040 | 1.49810 | 1.52996 | 55.8 |

TABLE 4-continued (Surface data)

| Surface number | r | d | nd | vd |
|---|---|---|---|---|
| 16* | −102.11730 | 0.31000 | | |
| 17 | ∞ | 0.60000 | 1.51680 | 64.2 |
| 18 | ∞ | (BF) | | |
| Image surface | ∞ | | | |

TABLE 5

(Aspherical data)

Surface No. 3

K = 0.00000E+00, A4 = −5.91053E−03, A6 = 4.63798E−04,
A8 = −1.74940E−05 A10 = 2.80931E−07, A12 = −1.12497E−09,
A14 = 0.00000E+00, A16 = 0.00000E+00
Surface No. 4

K = 0.00000E+00, A4 = −6.35440E−03, A6 = 4.88135E−04,
A8 = −1.43335E−05 A10 = 2.88384E−08, A12 = 0.00000E+00,
A14 = 0.00000E+00, A16 = 0.00000E+00
Surface No. 5

K = 0.00000E+00, A4 = −9.12399E−04, A6 = 1.35279E−04,
A8 = −9.31433E−06 A10 = 3.43006E−07, A12 = −2.70180E−08,
A14 = 1.45751E−09, A16 = −2.37096E−11
Surface No. 6

K = 0.00000E+00, A4 = −1.20200E−03, A6 = 1.87008E−04,
A8 = −1.66621E−05 A10 = 4.91911E−07, A12 = −1.88264E−09,
A14 = 0.00000E+00, A16 = 0.00000E+00
Surface No. 11

K = 0.00000E+00, A4 = −2.66376E−03, A6 = −1.25721E−03,
A8 = 1.04137E−04 A10 = −6.08179E−05, A12 = 9.47513E−07,
A14 = 0.00000E+00, A16 = 0.00000E+00
Surface No. 12

K = 0.00000E+00, A4 = 8.50004E−03, A6 = −4.77807E−04,
A8 = −1.92535E−04 A10 = −6.07938E−07, A12 = −7.59309E−20,
A14 = 0.00000E+00, A16 = 0.00000E+00
Surface No. 13

K = 0.00000E+00, A4 = −1.18707E−02, A6 = 1.92585E−03,
A8 = −1.29997E−04 A10 = 3.70505E−06, A12 = 3.42510E−17,
A14 = 0.00000E+00, A16 = 0.00000E+00
Surface No. 14

K = 0.00000E+00, A4 = −1.36776E−02, A6 = 1.99858E−03,
A8 = −1.25367E−04 A10 = 3.31774E−06, A12 = −3.97699E−17,
A14 = 0.00000E+00, A16 = 0.00000E+00
Surface No. 15

K = 0.00000E+00, A4 = −3.50205E−03, A6 = 2.12501E−04,
A8 = 2.63673E−06 A10 = −2.15279E−07, A12 = 0.00000E+00,
A14 = 0.00000E+00, A16 = 0.00000E+00
Surface No. 16

K = 0.00000E+00, A4 = −1.48131E−03, A6 = −1.18044E−04,
A8 = 2.00534E−05 A10 = −5.58704E−07, A12 = 0.00000E+00,
A14 = 0.00000E+00, A16 = 0.00000E+00

TABLE 6

(Various data)

Zooming ratio 4.67132

| | Wide-angle limit | Middle position | Telephoto limit |
|---|---|---|---|
| Focal length | 3.3420 | 7.2113 | 15.6116 |
| F-number | 3.05834 | 4.37173 | 7.19304 |
| View angle | 67.8414 | 30.7707 | 14.6885 |
| Image height | 3.5200 | 3.8000 | 3.9020 |
| Overall length of lens system | 27.5039 | 24.1234 | 28.0039 |
| BF | 0.48794 | 0.53890 | 0.50413 |
| d6 | 10.5789 | 3.7407 | 0.5000 |
| d12 | 2.2918 | 5.0442 | 11.1166 |
| d14 | 1.6082 | 2.3135 | 3.3623 |

Zoom lens unit data

| Lens unit | Initial surface No. | Focal length |
|---|---|---|
| 1 | 1 | −6.31874 |
| 2 | 7 | 6.25155 |
| 3 | 13 | −18.51874 |
| 4 | 15 | 23.76070 |

NUMERICAL EXAMPLE 3

The zoom lens system of Numerical Example 3 corresponds to Embodiment 3 shown in FIG. 7. Table 7 shows the surface data of the zoom lens system of Numerical Example 3. Table 8 shows the aspherical data. Table 9 shows the various data.

TABLE 7

(Surface data)

| Surface number | r | d | nd | vd |
|---|---|---|---|---|
| Object surface | ∞ | | | |
| 1 | 15.92990 | 0.30000 | 1.88300 | 40.8 |
| 2 | 6.16090 | 3.66520 | | |
| 3* | 33.52420 | 0.30000 | 1.80470 | 41.0 |
| 4* | 6.99910 | 0.63410 | | |
| 5* | 7.87720 | 1.29430 | 2.10200 | 16.8 |
| 6* | 12.47920 | Variable | | |
| 7(Diaphragm) | ∞ | −0.20000 | | |
| 8 | 3.56740 | 2.90590 | 1.51680 | 64.2 |
| 9 | −6.08160 | 0.40000 | 2.00272 | 19.3 |
| 10 | −12.15830 | 0.15000 | | |
| 11* | 2.85300 | 0.75420 | 1.52996 | 55.8 |
| 12* | 2.34350 | Variable | | |
| 13* | 5.24350 | 0.60000 | 1.52996 | 55.8 |
| 14* | 3.83940 | Variable | | |
| 15* | 25.96540 | 1.42740 | 1.75501 | 51.2 |
| 16 | −24.14760 | 0.50000 | 1.49700 | 81.6 |
| 17 | −50.00000 | 0.31000 | | |
| 18 | ∞ | 0.60000 | 1.51680 | 64.2 |
| 19 | ∞ | (BF) | | |
| Image surface | ∞ | | | |

TABLE 8

(Aspherical data)

Surface No. 3

K = 0.00000E+00, A4 = −3.20238E−03, A6 = 2.17658E−04,
A8 = −6.31363E−06 A10 = 6.74808E−08, A12 = 0.00000E+00,
A14 = 0.00000E+00, A16 = 0.00000E+00
Surface No. 4

K = 0.00000E+00, A4 = −2.86474E−03, A6 = 2.03332E−04,
A8 = −3.97350E−06 A10 = 4.16378E−09, A12 = 0.00000E+00,
A14 = 0.00000E+00, A16 = 0.00000E+00

TABLE 8-continued (Aspherical data)

Surface No. 5

K = 0.00000E+00, A4 = −3.16879E−04, A6 = 6.75792E−05,
A8 = −6.36942E−06 A10 = 4.58581E−07, A12 = −3.11896E−08,
A14 = 1.16039E−09, A16 = −1.56980E−11

Surface No. 6

K = 0.00000E+00, A4 = −6.39966E−04, A6 = 1.03040E−04,
A8 = −7.80486E−06 A10 = 1.78116E−07, A12 = −1.32873E−10,
A14 = 0.00000E+00, A16 = 0.00000E+00

Surface No. 11

K = 0.00000E+00, A4 = −6.83493E−03, A6 = −1.67841E−03,
A8 = −3.04730E−04 A10 = −2.98412E−06, A12 = 9.47513E−07,
A14 = 0.00000E+00, A16 = 0.00000E+00

Surface No. 12

K = 0.00000E+00, A4 = −3.62109E−03, A6 = −1.97182E−03,
A8 = −7.75409E−04 A10 = 5.84871E−05, A12 = 0.00000E+00,
A14 = 0.00000E+00, A16 = 0.00000E+00

Surface No. 13

K = 0.00000E+00, A4 = −1.48948E−02, A6 = 1.54731E−03,
A8 = −1.52913E−04 A10 = 1.01043E−05, A12 = 0.00000E+00,
A14 = 0.00000E+00, A16 = 0.00000E+00

Surface No. 14

K = 0.00000E+00, A4 = −1.79860E−02, A6 = 1.79049E−03,
A8 = −1.86020E−04 A10 = 1.01395E−05, A12 = 0.00000E+00,
A14 = 0.00000E+00, A16 = 0.00000E+00

Surface No. 15

K = 0.00000E+00, A4 = −3.52868E−04, A6 = 4.73256E−05,
A8 = −1.50508E−06 A10 = 1.41800E−08, A12 = 0.00000E+00,
A14 = 0.00000E+00, A16 = 0.00000E+00

TABLE 9

(Various data)

Zooming ratio 5.53872

|  | Wide-angle limit | Middle position | Telephoto limit |
|---|---|---|---|
| Focal length | 3.3499 | 7.8785 | 18.5539 |
| F-number | 2.47058 | 3.77635 | 7.02377 |
| View angle | 65.6913 | 27.6256 | 11.9865 |
| Image height | 3.5200 | 3.8000 | 3.9020 |
| Overall length of lens system | 29.5039 | 25.5863 | 32.0039 |
| BF | 0.49765 | 0.52454 | 0.44171 |
| d6 | 11.9088 | 3.8006 | 0.5000 |
| d12 | 2.3540 | 3.5680 | 4.5000 |
| d14 | 1.6000 | 4.5766 | 13.3628 |

Zoom lens unit data

| Lens unit | Initial surface No. | Focal length |
|---|---|---|
| 1 | 1 | −7.56442 |
| 2 | 7 | 6.75490 |
| 3 | 13 | −31.75509 |
| 4 | 15 | 20.37337 |

NUMERICAL EXAMPLE 4

The zoom lens system of Numerical Example 4 corresponds to Embodiment 4 shown in FIG. 10. Table 10 shows the surface data of the zoom lens system of Numerical Example 4. Table 11 shows the aspherical data. Table 12 shows the various data.

TABLE 10

(Surface data)

| Surface number | r | d | nd | vd |
|---|---|---|---|---|
| Object surface | ∞ | | | |
| 1 | 13.06580 | 0.30000 | 1.72916 | 54.7 |
| 2 | 6.60210 | 4.02080 | | |
| 3* | 23.67100 | 0.30000 | 1.80470 | 41.0 |
| 4* | 5.23110 | 1.56360 | | |
| 5* | 7.19190 | 1.25730 | 2.10200 | 16.8 |
| 6* | 9.75180 | Variable | | |
| 7(Diaphragm) | ∞ | −0.20000 | | |
| 8 | 3.65290 | 2.18740 | 1.59282 | 68.6 |
| 9 | −10.93020 | 0.40000 | 2.00272 | 19.3 |
| 10 | −51.35420 | 0.59210 | | |
| 11* | 2.91790 | 0.60000 | 1.52996 | 55.8 |
| 12* | 2.61970 | Variable | | |
| 13* | 11.99750 | 0.60000 | 1.52996 | 55.8 |
| 14* | 5.16180 | Variable | | |
| 15* | 22.10420 | 2.00750 | 1.52996 | 55.8 |
| 16* | −11.51170 | 0.31000 | | |
| 17 | ∞ | 0.60000 | 1.51680 | 64.2 |
| 18 | ∞ | (BF) | | |
| Image surface | ∞ | | | |

TABLE 11

(Aspherical data)

Surface No. 3

K = 0.00000E+00, A4 = 2.79856E−03, A6 = −1.98888E−04,
A8 = 5.63360E−06 A10 = −6.21223E−08, A12 = 0.00000E+00,
A14 = 0.00000E+00, A16 = 0.00000E+00

Surface No. 4

K = 0.00000E+00, A4 = 2.22228E−03, A6 = −1.11329E−05,
A8 = −8.09093E−06 A10 = 1.70162E−07, A12 = 0.00000E+00,
A14 = 0.00000E+00, A16 = 0.00000E+00

Surface No. 5

K = 0.00000E+00, A4 = −1.68045E−03, A6 = 1.46077E−04,
A8 = −8.56592E−06 A10 = 4.90128E−07, A12 = −3.07393E−08,
A14 = 9.71477E−10, A16 = −1.15641E−11

Surface No. 6

K = 0.00000E+00, A4 = −1.78520E−03, A6 = 1.20333E−04,
A8 = −5.89848E−06 A10 = 1.13054E−07, A12 = −1.81665E−09,
A14 = 0.00000E+00, A16 = 0.00000E+00

Surface No. 11

K = 0.00000E+00, A4 = −4.48727E−03, A6 = −1.10044E−03,
A8 = −4.86559E−04 A10 = 7.62243E−06, A12 = 9.47513E−07,
A14 = 0.00000E+00, A16 = 0.00000E+00

Surface No. 12

K = 0.00000E+00, A4 = 2.05677E−03, A6 = −7.60393E−05,
A8 = −1.02036E−03 A10 = 1.05782E−04, A12 = 0.00000E+00,
A14 = 0.00000E+00, A16 = 0.00000E+00

Surface No. 13

K = 0.00000E+00, A4 = −1.72924E−02, A6 = 3.53661E−03,
A8 = −2.40979E−04 A10 = 9.59981E−06, A12 = 0.00000E+00,
A14 = 0.00000E+00, A16 = 0.00000E+00

Surface No. 14

K = 0.00000E+00, A4 = −1.77426E−02, A6 = 3.72318E−03,
A8 = −3.31950E−04 A10 = 1.60010E−05, A12 = 0.00000E+00,
A14 = 0.00000E+00, A16 = 0.00000E+00

Surface No. 15

K = 0.00000E+00, A4 = −3.36741E−03, A6 = 3.91024E−04,
A8 = −1.46777E−05 A10 = 2.12339E−07, A12 = 0.00000E+00,
A14 = 0.00000E+00, A16 = 0.00000E+00

TABLE 11-continued (Aspherical data)

Surface No. 16

K = 0.00000E+00, A4 = −5.18975E−03, A6 = 7.71201E−04,
A8 = −3.63196E−05 A10 = 5.98712E−07, A12 = 0.00000E+00,
A14 = 0.00000E+00, A16 = 0.00000E+00

TABLE 12

(Various data)

Zooming ratio 5.53457

|  | Wide-angle limit | Middle position | Telephoto limit |
|---|---|---|---|
| Focal length | 3.4000 | 7.9307 | 18.8178 |
| F-number | 2.48054 | 3.84164 | 7.16168 |
| View angle | 51.0699 | 26.3652 | 11.7549 |
| Image height | 3.4200 | 3.9020 | 3.9020 |
| Overall length of lens system | 30.0040 | 26.4244 | 32.5040 |
| BF | 0.49431 | 0.52508 | 0.45673 |
| d6 | 11.5653 | 3.8226 | 0.5000 |
| d12 | 2.3000 | 3.1791 | 4.5000 |
| d14 | 1.6000 | 4.8840 | 12.9653 |

Zoom lens unit data

| Lens unit | Initial surface No. | Focal length |
|---|---|---|
| 1 | 1 | −7.40721 |
| 2 | 7 | 6.43619 |
| 3 | 13 | −17.63092 |
| 4 | 15 | 14.58493 |

NUMERICAL EXAMPLE 5

The zoom lens system of Numerical Example 5 corresponds to Embodiment 5 shown in FIG. 13. Table 13 shows the surface data of the zoom lens system of Numerical Example 5. Table 14 shows the aspherical data. Table 15 shows the various data.

TABLE 13

(Surface data)

| Surface number | r | d | nd | vd |
|---|---|---|---|---|
| Object surface | ∞ | | | |
| 1 | 36.33560 | 0.30000 | 1.72916 | 54.7 |
| 2 | 6.67200 | 3.43650 | | |
| 3* | 2000.00000 | 0.30000 | 1.80470 | 41.0 |
| 4* | 9.11690 | 0.91000 | | |
| 5* | 7.77020 | 1.33740 | 2.10200 | 16.8 |
| 6* | 11.54640 | Variable | | |
| 7(Diaphragm) | ∞ | −0.20000 | | |
| 8 | 4.09230 | 2.45320 | 1.59282 | 68.6 |
| 9 | −8.67900 | 0.40000 | 2.00272 | 19.3 |
| 10 | −14.18120 | 0.15000 | | |
| 11* | 3.94410 | 0.60000 | 1.60690 | 27.0 |
| 12* | 2.75130 | Variable | | |
| 13* | −319.34020 | 1.10090 | 1.52996 | 55.8 |
| 14* | −14.47350 | Variable | | |
| 15 | ∞ | 0.60000 | 1.51680 | 64.2 |
| 16 | ∞ | (BF) | | |
| Image surface | ∞ | | | |

TABLE 14

(Aspherical data)

Surface No. 3

K = 0.00000E+00, A4 = −6.56376E−04, A6 = 1.17944E−04,
A8 = −4.41215E−06 A10 = 4.97553E−08, A12 = 0.00000E+00,
A14 = 0.00000E+00, A16 = 0.00000E+00
Surface No. 4

K = 0.00000E+00, A4 = −1.68637E−03, A6 = 3.01662E−04,
A8 = −1.17333E−05 A10 = 1.54893E−07, A12 = 0.00000E+00,
A14 = 0.00000E+00, A16 = 0.00000E+00
Surface No. 5

K = 0.00000E+00, A4 = −1.62689E−03, A6 = 1.96202E−04,
A8 = −1.42366E−05 A10 = 5.41392E−07, A12 = −2.55425E−08,
A14 = 1.15348E−09, A16 = −1.90440E−11
Surface No. 6

K = 0.00000E+00, A4 = −1.14278E−03, A6 = 1.38776E−04,
A8 = −1.35566E−05 A10 = 4.65604E−07, A12 = −4.13472E−09,
A14 = 0.00000E+00, A16 = 0.00000E+00
Surface No. 11

K = 0.00000E+00, A4 = −8.66551E−03, A6 = −9.32939E−04,
A8 = 8.25287E−06 A10 = −5.43877E−06, A12 = 9.47513E−07,
A14 = 0.00000E+00, A16 = 0.00000E+00
Surface No. 12

K = 0.00000E+00, A4 = −7.81908E−03, A6 = −1.34816E−03,
A8 = 4.93491E−05 A10 = −5.10200E−06, A12 = 0.00000E+00,
A14 = 0.00000E+00, A16 = 0.00000E+00
Surface No. 13

K = 0.00000E+00, A4 = 1.93926E−03, A6 = −3.03323E−04,
A8 = 1.72439E−05 A10 = −2.97228E−07, A12 = 0.00000E+00,
A14 = 0.00000E+00, A16 = 0.00000E+00
Surface No. 14

K = 0.00000E+00, A4 = 2.76253E−03, A6 = −3.67896E−04,
A8 = 1.81351E−05 A10 = −2.60658E−07, A12 = 0.00000E+00,
A14 = 0.00000E+00, A16 = 0.00000E+00

TABLE 15

(Various data)

Zooming ratio 4.65926

|  | Wide-angle limit | Middle position | Telephoto limit |
|---|---|---|---|
| Focal length | 3.3398 | 7.2019 | 15.5612 |
| F-number | 3.01623 | 4.26483 | 7.17231 |
| View angle | 70.1983 | 30.4911 | 14.3140 |
| Image height | 3.5200 | 3.8000 | 3.9020 |
| Overall length of lens system | 29.5438 | 25.9238 | 32.0040 |
| BF | 0.51963 | 0.52782 | 0.50225 |
| d6 | 11.8558 | 3.8851 | 0.5000 |
| d12 | 3.7000 | 7.2529 | 17.5160 |
| d14 | 2.6000 | 3.3978 | 2.6000 |

Zoom lens unit data

| Lens unit | Initial surface No. | Focal length |
|---|---|---|
| 1 | 1 | −7.44612 |
| 2 | 7 | 7.38658 |
| 3 | 13 | 28.57138 |

NUMERICAL EXAMPLE 6

The zoom lens system of Numerical Example 6 corresponds to Embodiment 6 shown in FIG. 16. Table 16 shows the surface data of the zoom lens system of Numerical Example 6. Table 17 shows the aspherical data. Table 18 shows the various data.

TABLE 16

(Surface data)

| Surface number | r | d | nd | vd |
|---|---|---|---|---|
| Object surface | ∞ | | | |
| 1 | 17.07440 | 0.30000 | 1.77250 | 49.6 |
| 2 | 6.51520 | 4.00620 | | |
| 3* | 585.74590 | 0.30000 | 1.80470 | 41.0 |
| 4* | 8.09650 | 0.77690 | | |
| 5* | 6.48480 | 1.28600 | 2.10200 | 16.8 |
| 6* | 8.71100 | Variable | | |
| 7(Diaphragm) | ∞ | −0.20000 | | |
| 8 | 3.33860 | 1.43640 | 1.59282 | 68.6 |
| 9 | −20.17590 | 0.40000 | 2.00272 | 19.3 |
| 10 | 51.04960 | 0.78530 | | |
| 11* | −5.33630 | 0.60000 | 1.52996 | 55.8 |
| 12* | −4.64510 | Variable | | |
| 13* | −5.72090 | 0.80000 | 1.52996 | 55.8 |
| 14* | −9.64030 | Variable | | |
| 15 | ∞ | 0.60000 | 1.51680 | 64.2 |
| 16 | ∞ | (BF) | | |
| Image surface | ∞ | | | |

TABLE 17

(Aspherical data)

Surface No. 3

K = 0.00000E+00, A4 = −7.60374E−04, A6 = 9.13481E−05, A8 = −3.04337E−06 A10 = 3.20084E−08, A12 = 0.00000E+00, A14 = 0.00000E+00, A16 = 0.00000E+00

Surface No. 4

K = 0.00000E+00, A4 = −1.68637E−03, A6 = 3.01662E−04, A8 = −1.17333E−05 A10 = 1.54893E−07, A12 = 0.00000E+00, A14 = 0.00000E+00, A16 = 0.00000E+00

Surface No. 5

K = 0.00000E+00, A4 = −1.80145E−03, A6 = 2.42995E−04, A8 = −1.73219E−05 A10 = 7.81719E−07, A12 = −3.98036E−08, A14 = 1.39848E−09, A16 = −1.86240E−11

Surface No. 6

K = 0.00000E+00, A4 = −1.27860E−03, A6 = 1.66886E−04, A8 = −1.32463E−05 A10 = 3.46614E−07, A12 = −2.02568E−09, A14 = 0.00000E+00, A16 = 0.00000E+00

Surface No. 11

K = 0.00000E+00, A4 = −4.67985E−03, A6 = 3.65903E−03, A8 = −2.24944E−04 A10 = 3.51473E−05, A12 = 9.47513E−07, A14 = 0.00000E+00, A16 = 0.00000E+00

Surface No. 12

K = 0.00000E+00, A4 = 3.28257E−03, A6 = 3.43065E−03, A8 = −8.45437E−05 A10 = 5.59021E−05, A12 = 0.00000E+00, A14 = 0.00000E+00, A16 = 0.00000E+00

Surface No. 13

K = 0.00000E+00, A4 = 1.93926E−03, A6 = −3.03323E−04, A8 = 1.72439E−05 A10 = −2.97228E−07, A12 = 0.00000E+00, A14 = 0.00000E+00, A16 = 0.00000E+00

Surface No. 14

K = 0.00000E+00, A4 = 1.34194E−03, A6 = −2.00903E−04, A8 = 3.99287E−06 A10 = 2.59728E−07, A12 = 0.00000E+00, A14 = 0.00000E+00, A16 = 0.00000E+00

TABLE 18

(Various data)

Zooming ratio 4.66108

| | Wide-angle limit | Middle position | Telephoto limit |
|---|---|---|---|
| Focal length | 3.3418 | 7.2098 | 15.5763 |
| F-number | 3.15570 | 4.42121 | 7.17692 |
| View angle | 65.0872 | 29.9090 | 14.1830 |
| Image height | 3.5200 | 3.8000 | 3.9020 |
| Overall length of lens system | 29.8947 | 25.1171 | 28.5794 |
| BF | 0.51691 | 0.54984 | 0.51778 |
| d6 | 12.4104 | 4.2618 | 0.5000 |
| d12 | 4.8766 | 5.1148 | 5.3871 |
| d14 | 1.0000 | 4.0999 | 11.0837 |

Zoom lens unit data

| Lens unit | Initial surface No. | Focal length |
|---|---|---|
| 1 | 1 | −7.53461 |
| 2 | 7 | 6.60027 |
| 3 | 13 | −28.57178 |

NUMERICAL EXAMPLE 7

The zoom lens system of Numerical Example 7 corresponds to Embodiment 7 shown in FIG. 19. Table 19 shows the surface data of the zoom lens system of Numerical Example 7. Table 20 shows the aspherical data. Table 21 shows the various data.

TABLE 19

(Surface data)

| Surface number | r | d | nd | vd |
|---|---|---|---|---|
| Object surface | ∞ | | | |
| 1 | 27.60700 | 0.30000 | 1.88300 | 40.8 |
| 2 | 6.90930 | 4.43790 | | |
| 3* | 37.09510 | 0.30000 | 1.80470 | 41.0 |
| 4* | 5.68390 | 0.85890 | | |
| 5* | 6.05070 | 1.71340 | 2.00272 | 19.3 |
| 6* | 8.92920 | Variable | | |
| 7 | 4.72840 | 1.07750 | 1.88300 | 40.8 |
| 8 | 20.65800 | 0.45000 | | |
| 9(Diaphragm) | ∞ | 0.45000 | | |
| 10* | 6.20390 | 1.17170 | 1.68400 | 31.3 |
| 11 | −7.80170 | 0.30000 | 2.00069 | 25.5 |
| 12 | 3.42760 | 0.10200 | | |
| 13 | 3.74310 | 1.31580 | 1.49700 | 81.6 |
| 14 | −11.75630 | Variable | | |
| 15* | −53.08990 | 0.98620 | 2.00272 | 19.3 |
| 16* | −17.94450 | Variable | | |
| 17* | −12.85380 | 0.30000 | 2.00272 | 19.3 |
| 18* | −40.46120 | 0.50000 | | |
| 19 | ∞ | 0.58000 | 1.51680 | 64.2 |
| 20 | ∞ | (BF) | | |
| Image surface | ∞ | | | |

TABLE 20

(Aspherical data)

Surface No. 3

K = 0.00000E+00, A4 = −1.49894E−04, A6 = 1.23235E−05, A8 = −5.78567E−07 A10 = 4.07779E−09, A12 = 0.00000E+00

TABLE 20-continued (Aspherical data)

Surface No. 4

K = 0.00000E+00, A4 = −1.42362E−03, A6 = 1.49001E−04,
A8 = −5.61791E−06 A10 = 1.73032E−08, A12 = 0.00000E+00
Surface No. 5

K = 0.00000E+00, A4 = −1.58370E−03, A6 = 1.21149E−04,
A8 = −4.98031E−06 A10 = 4.13875E−08, A12 = 0.00000E+00
Surface No. 6

K = 0.00000E+00, A4 = −1.06591E−03, A6 = 8.30821E−05,
A8 = −4.54885E−06 A10 = 7.34880E−08, A12 = 0.00000E+00
Surface No. 10

K = 0.00000E+00, A4 = −1.31726E−03, A6 = −7.10412E−05,
A8 = 1.62552E−05 A10 = −5.90765E−06, A12 = 0.00000E+00
Surface No. 15

K = 0.00000E+00, A4 = −3.32712E−03, A6 = −7.90057E−05,
A8 = −2.39575E−05 A10 = 1.51085E−06, A12 = 7.27418E−08
Surface No. 16

K = 0.00000E+00, A4 = −2.89379E−03, A6 = −4.33422E−05,
A8 = −1.45232E−05 A10 = 8.65554E−07, A12 = 4.64075E−08
Surface No. 17

K = 0.00000E+00, A4 = −3.67181E−03, A6 = 9.35482E−06,
A8 = 7.72944E−06 A10 = −6.92056E−07, A12 = 0.00000E+00
Surface No. 18

K = 0.00000E+00, A4 = −3.04844E−03, A6 = 9.39632E−05,
A8 = −3.14207E−06 A10 = −1.52038E−07, A12 = 0.00000E+00

TABLE 21

(Various data)

Zooming ratio 4.69790

|  | Wide-angle limit | Middle position | Telephoto limit |
|---|---|---|---|
| Focal length | 2.8298 | 4.9875 | 13.2939 |
| F-number | 3.24216 | 3.95272 | 6.92235 |
| View angle | 90.0000 | 44.0000 | 16.0000 |
| Image height | 3.6645 | 3.6773 | 3.7154 |
| Overall length of lens system | 32.5259 | 28.0325 | 32.5259 |
| BF | 0.49814 | 0.51903 | 0.53694 |
| d6 | 12.8191 | 5.8542 | 0.3294 |
| d14 | 2.7187 | 2.3100 | 2.7119 |
| d16 | 2.1447 | 5.0249 | 14.6412 |

Zoom lens unit data

| Lens unit | Initial surface No. | Focal length |
|---|---|---|
| 1 | 1 | −5.64035 |
| 2 | 7 | 7.31655 |
| 3 | 15 | 26.65844 |
| 4 | 17 | −18.89005 |

NUMERICAL EXAMPLE 8

The zoom lens system of Numerical Example 8 corresponds to Embodiment 8 shown in FIG. 22. Table 22 shows the surface data of the zoom lens system of Numerical Example 8. Table 23 shows the aspherical data. Table 24 shows the various data.

TABLE 22

(Surface data)

| Surface number | r | d | nd | vd |
|---|---|---|---|---|
| Object surface | ∞ |  |  |  |
| 1 | 15.20320 | 0.30000 | 1.88300 | 40.8 |
| 2 | 6.09070 | 3.76400 |  |  |
| 3* | 18.30960 | 0.30000 | 1.80470 | 41.0 |
| 4* | 5.99260 | 0.62270 |  |  |
| 5* | 7.02910 | 1.31320 | 2.10200 | 16.8 |
| 6* | 9.99760 | Variable |  |  |
| 7(Diaphragm) | ∞ | −0.20000 |  |  |
| 8 | 3.35830 | 1.87750 | 1.59282 | 68.6 |
| 9 | −55.70370 | 0.40000 | 2.00272 | 19.3 |
| 10 | 16.73170 | 0.54700 |  |  |
| 11* | 13.43110 | 0.60000 | 1.52996 | 55.8 |
| 12* | −109.93860 | Variable |  |  |
| 13* | −11.87510 | 0.60000 | 1.52996 | 55.8 |
| 14* | −36.86370 | Variable |  |  |
| 15* | −19.11670 | 0.63660 | 1.52996 | 55.8 |
| 16* | −311.25000 | 0.31000 |  |  |
| 17 | ∞ | 0.60000 | 1.51680 | 64.2 |
| 18 | ∞ | (BF) |  |  |
| Image surface | ∞ |  |  |  |

TABLE 23

(Aspherical data)

Surface No. 3

K = 0.00000E+00, A4 = −4.48117E−03, A6 = 3.25755E−04,
A8 = −1.13041E−05 A10 = 1.79883E−07, A12 = −1.00756E−09,
A14 = 0.00000E+00, A16 = 0.00000E+00
Surface No. 4

K = 0.00000E+00, A4 = −4.28795E−03, A6 = 2.92617E−04,
A8 = −7.21780E−06 A10 = 3.54352E−08, A12 = 0.00000E+00,
A14 = 0.00000E+00, A16 = 0.00000E+00
Surface No. 5

K = 0.00000E+00, A4 = −2.11899E−04, A6 = 3.38194E−05,
A8 = −4.93255E−06 A10 = 3.78156E−07, A12 = −2.32827E−08,
A14 = 8.83376E−10, A16 = −1.47055E−11
Surface No. 6

K = 0.00000E+00, A4 = −5.81130E−04, A6 = 8.55558E−05,
A8 = −9.17056E−06 A10 = 3.97899E−07, A12 = −7.09442E−09,
A14 = 0.00000E+00, A16 = 0.00000E+00
Surface No. 11

K = 0.00000E+00, A4 = −5.48904E−03, A6 = 7.59798E−04,
A8 = 1.79730E−04 A10 = −1.15141E−05, A12 = 9.47513E−07,
A14 = 0.00000E+00, A16 = 0.00000E+00
Surface No. 12

K = 0.00000E+00, A4 = 1.65468E−03, A6 = 1.71310E−03,
A8 = 1.48880E−04 A10 = 4.57085E−05, A12 = 0.00000E+00,
A14 = 0.00000E+00, A16 = 0.00000E+00
Surface No. 13

K = 0.00000E+00, A4 = −6.63388E−03, A6 = 2.52920E−03,
A8 = −4.80569E−05 A10 = −7.76933E−06, A12 = −1.20178E−19,
A14 = 0.00000E+00, A16 = 0.00000E+00
Surface No. 14

K = 0.00000E+00, A4 = −5.46239E−03, A6 = 2.09281E−03,
A8 = −6.75217E−05 A10 = 4.08703E−08, A12 = −6.14282E−19,
A14 = 0.00000E+00, A16 = 0.00000E+00
Surface No. 15

K = 0.00000E+00, A4 = −7.25468E−03, A6 = 9.41190E−04,
A8 = −3.92942E−05 A10 = 5.49659E−07, A12 = 0.00000E+00,
A14 = 0.00000E+00, A16 = 0.00000E+00

TABLE 23-continued (Aspherical data)

Surface No. 16

K = 0.00000E+00, A4 = −8.46392E−03, A6 = 9.62834E−04,
A8 = −3.97087E−05 A10 = 4.93654E−07, A12 = 0.00000E+00,
A14 = 0.00000E+00, A16 = 0.00000E+00

TABLE 24

(Various data)

Zooming ratio 4.66225

|  | Wide-angle limit | Middle position | Telephoto limit |
|---|---|---|---|
| Focal length | 3.3625 | 7.2572 | 15.6770 |
| F-number | 3.22437 | 4.49045 | 7.18257 |
| View angle | 64.2153 | 29.7286 | 14.5799 |
| Image height | 3.5200 | 3.8000 | 3.9020 |
| Overall length of lens system | 30.0026 | 25.0154 | 27.9167 |
| BF | 0.49888 | 0.52951 | 0.47158 |
| d6 | 12.7263 | 4.4252 | 0.5000 |
| d12 | 2.8234 | 3.1652 | 4.2510 |
| d14 | 2.2830 | 5.2245 | 11.0231 |

Zoom lens unit data

| Lens unit | Initial surface No. | Focal length |
|---|---|---|
| 1 | 1 | −7.35284 |
| 2 | 7 | 6.43029 |
| 3 | 13 | −33.33330 |
| 4 | 15 | −38.46149 |

NUMERICAL EXAMPLE 9

The zoom lens system of Numerical Example 9 corresponds to Embodiment 9 shown in FIG. 25. Table 25 shows the surface data of the zoom lens system of Numerical Example 9. Table 26 shows the aspherical data. Table 27 shows the various data.

TABLE 25

(Surface data)

| Surface number | r | d | nd | vd |
|---|---|---|---|---|
| Object surface | ∞ | | | |
| 1 | 24.32190 | 0.30000 | 1.88300 | 40.8 |
| 2 | 6.66940 | 3.00000 | | |
| 3* | 12.83160 | 0.30000 | 1.80470 | 41.0 |
| 4* | 5.23870 | 0.87770 | | |
| 5* | 7.78450 | 1.66710 | 2.10200 | 16.8 |
| 6* | 12.16120 | Variable | | |
| 7(Diaphragm) | ∞ | −0.20000 | | |
| 8 | 3.79110 | 2.84420 | 1.59282 | 68.6 |
| 9 | −6.64050 | 0.40000 | 2.00272 | 19.3 |
| 10 | −13.08460 | 0.33780 | | |
| 11* | 3.82260 | 0.60000 | 1.52996 | 55.8 |
| 12* | 2.65200 | Variable | | |
| 13 | −18.96520 | 0.60000 | 1.74993 | 45.4 |
| 14 | −34.86500 | 1.00640 | 1.62041 | 60.3 |
| 15 | −11.52100 | Variable | | |
| 16* | −7.05560 | 0.59360 | 1.52996 | 55.8 |
| 17* | −5.39400 | 0.31000 | | |
| 18 | ∞ | 0.60000 | 1.51680 | 64.2 |
| 19 | ∞ | (BF) | | |
| Image surface | ∞ | | | |

TABLE 26

(Aspherical data)

Surface No. 3

K = 0.00000E+00, A4 = −4.56617E−03, A6 = 3.31670E−04,
A8 = −1.39720E−05 A10 = 2.89680E−07, A12 = −2.20732E−09,
A14 = 0.00000E+00, A16 = 0.00000E+00
Surface No. 4

K = 0.00000E+00, A4 = −5.03940E−03, A6 = 3.84671E−04,
A8 = −1.66594E−05 A10 = 2.59018E−07, A12 = 0.00000E+00,
A14 = 0.00000E+00, A16 = 0.00000E+00
Surface No. 5

K = 0.00000E+00, A4 = −7.41635E−04, A6 = 8.95148E−05,
A8 = −9.37771E−06 A10 = 4.97634E−07, A12 = −2.23696E−08,
A14 = 8.15290E−10, A16 = −1.33199E−11
Surface No. 6

K = 0.00000E+00, A4 = −1.01145E−03, A6 = 9.54127E−05,
A8 = −1.07452E−05 A10 = 4.91533E−07, A12 = −8.38432E−09,
A14 = 0.00000E+00, A16 = 0.00000E+00
Surface No. 11

K = 0.00000E+00, A4 = −1.59441E−02, A6 = −7.56365E−04,
A8 = −5.25850E−04 A10 = 1.05299E−04, A12 = 9.47513E−07,
A14 = 0.00000E+00, A16 = 0.00000E+00
Surface No. 12

K = 0.00000E+00, A4 = −1.46982E−02, A6 = −1.13171E−03,
A8 = −4.51063E−04 A10 = 1.22256E−04, A12 = 0.00000E+00,
A14 = 0.00000E+00, A16 = 0.00000E+00
Surface No. 16

K = 0.00000E+00, A4 = 1.11848E−02, A6 = −7.33191E−04,
A8 = 1.70486E−05 A10 = −1.74139E−07, A12 = 0.00000E+00,
A14 = 0.00000E+00, A16 = 0.00000E+00
Surface No. 17

K = 0.00000E+00, A4 = 1.69848E−02, A6 = −1.01313E−03,
A8 = 9.22440E−06 A10 = 3.85349E−07, A12 = 0.00000E+00,
A14 = 0.00000E+00, A16 = 0.00000E+00

TABLE 27

(Various data)

Zooming ratio 4.65878

|  | Wide-angle limit | Middle position | Telephoto limit |
|---|---|---|---|
| Focal length | 3.3396 | 7.2086 | 15.5586 |
| F-number | 3.05669 | 4.29141 | 7.17124 |
| View angle | 70.4003 | 30.3275 | 14.8526 |
| Image height | 3.5200 | 3.8000 | 3.9020 |
| Overall length of lens system | 30.0175 | 25.9360 | 30.4641 |
| BF | 0.51372 | 0.51845 | 0.46020 |
| d6 | 11.7783 | 3.8537 | 0.5000 |
| d12 | 2.7343 | 5.2233 | 15.0671 |
| d15 | 1.7544 | 3.1038 | 1.2000 |

Zoom lens unit data

| Lens unit | Initial surface No. | Focal length |
|---|---|---|
| 1 | 1 | −7.27081 |
| 2 | 7 | 6.84806 |
| 3 | 13 | 50.00046 |
| 4 | 16 | 38.45982 |

NUMERICAL EXAMPLE 10

The zoom lens system of Numerical Example 10 corresponds to Embodiment 10 shown in FIG. 28. Table 28 shows the surface data of the zoom lens system of Numerical Example 10. Table 29 shows the aspherical data. Table 30 shows the various data.

TABLE 28

(Surface data)

| Surface number | r | d | nd | vd |
|---|---|---|---|---|
| Object surface | ∞ | | | |
| 1 | 17.04990 | 0.30000 | 1.88300 | 40.8 |
| 2 | 6.34710 | 3.57860 | | |
| 3* | 49.98660 | 0.30000 | 1.80470 | 41.0 |
| 4* | 7.48810 | 0.58900 | | |
| 5* | 8.13390 | 1.33130 | 2.10200 | 16.8 |
| 6* | 13.38480 | Variable | | |
| 7(Diaphragm) | ∞ | −0.20000 | | |
| 8 | 3.56570 | 2.82030 | 1.51680 | 64.2 |
| 9 | −5.98890 | 0.40000 | 2.00272 | 19.3 |
| 10 | −11.59690 | 0.15000 | | |
| 11* | 2.75640 | 0.64650 | 1.52996 | 55.8 |
| 12* | 2.28770 | Variable | | |
| 13* | 7.60770 | 0.60000 | 1.52996 | 55.8 |
| 14* | 5.04120 | Variable | | |
| 15* | 58.58910 | 1.20900 | 1.80470 | 41.0 |
| 16 | −17.58750 | Variable | | |
| 17 | −24.02720 | 0.50000 | 1.52996 | 55.8 |
| 18 | −50.00000 | 0.31000 | | |
| 19 | ∞ | 0.60000 | 1.51680 | 64.2 |
| 20 | ∞ | (BF) | | |
| Image surface | ∞ | | | |

TABLE 29

(Aspherical data)

Surface No. 3

K = 0.00000E+00, A4 = −3.41446E−03, A6 = 2.42374E−04,
A8 = −6.91185E−06 A10 = 7.09336E−08, A12 = 0.00000E+00,
A14 = 0.00000E+00, A16 = 0.00000E+00
Surface No. 4

K = 0.00000E+00, A4 = −2.98265E−03, A6 = 2.26192E−04,
A8 = −4.06884E−06 A10 = −9.20861E−09, A12 = 0.00000E+00,
A14 = 0.00000E+00, A16 = 0.00000E+00
Surface No. 5

K = 0.00000E+00, A4 = −1.60318E−04, A6 = 6.93122E−05,
A8 = −6.07853E−06 A10 = 4.28211E−07, A12 = −3.03173E−08,
A14 = 1.13058E−09, A16 = −1.50921E−11
Surface No. 6

K = 0.00000E+00, A4 = −4.83725E−04, A6 = 1.09967E−04,
A8 = −8.30018E−06 A10 = 1.83569E−07, A12 = −2.07628E−10,
A14 = 0.00000E+00, A16 = 0.00000E+00
Surface No. 11

K = 0.00000E+00, A4 = −7.45206E−03, A6 = −1.91587E−03,
A8 = −3.69489E−04 A10 = 7.79199E−06, A12 = 9.47513E−07,
A14 = 0.00000E+00, A16 = 0.00000E+00
Surface No. 12

K = 0.00000E+00, A4 = −4.50078E−03, A6 = −2.41520E−03,
A8 = −7.75872E−04 A10 = 5.69121E−05, A12 = 0.00000E+00,
A14 = 0.00000E+00, A16 = 0.00000E+00
Surface No. 13

K = 0.00000E+00, A4 = −1.26864E−02, A6 = 1.58808E−03,
A8 = −1.50148E−04 A10 = 9.54297E−06, A12 = 0.00000E+00,
A14 = 0.00000E+00, A16 = 0.00000E+00
Surface No. 14

K = 0.00000E+00, A4 = −1.43538E−02, A6 = 1.73680E−03,
A8 = −1.70727E−04 A10 = 9.50247E−06, A12 = 0.00000E+00,
A14 = 0.00000E+00, A16 = 0.00000E+00

TABLE 29-continued (Aspherical data)

Surface No. 15

K = 0.00000E+00, A4 = −5.69331E−04, A6 = 2.82817E−05,
A8 = −3.67676E−07 A10 = −8.31204E−09, A12 = 0.00000E+00,
A14 = 0.00000E+00, A16 = 0.00000E+00

TABLE 30

(Various data)

Zooming ratio 5.53873

| | Wide-angle limit | Middle position | Telephoto limit |
|---|---|---|---|
| Focal length | 3.3998 | 7.9973 | 18.8304 |
| F-number | 2.57456 | 3.94536 | 7.22984 |
| View angle | 64.4222 | 26.9312 | 11.6654 |
| Image height | 3.5200 | 3.8000 | 3.9020 |
| Overall length of lens system | 29.5039 | 25.5879 | 32.0039 |
| BF | 0.48792 | 0.51915 | 0.44564 |
| d6 | 11.9692 | 3.8733 | 0.5000 |
| d12 | 2.3000 | 3.7051 | 4.5000 |
| d14 | 1.6000 | 4.7540 | 13.7692 |
| d16 | 0.5000 | 0.1208 | 0.1000 |

Zoom lens unit data

| Lens unit | Initial surface No. | Focal length |
|---|---|---|
| 1 | 1 | −7.65504 |
| 2 | 7 | 6.77729 |
| 3 | 13 | −30.68157 |
| 4 | 15 | 16.92972 |
| 5 | 17 | −87.86522 |

NUMERICAL EXAMPLE 11

The zoom lens system of Numerical Example 11 corresponds to Embodiment 11 shown in FIG. 31. Table 31 shows the surface data of the zoom lens system of Numerical Example 11. Table 32 shows the aspherical data. Table 33 shows the various data.

TABLE 31

(Surface data)

| Surface number | r | d | nd | vd |
|---|---|---|---|---|
| Object surface | ∞ | | | |
| 1* | 2000.00000 | 0.30000 | 1.80470 | 41.0 |
| 2* | 5.23150 | 4.25300 | | |
| 3* | 8.57230 | 2.36940 | 2.10200 | 16.8 |
| 4* | 9.89710 | Variable | | |
| 5(Diaphragm) | ∞ | −0.20000 | | |
| 6 | 3.59130 | 2.91420 | 1.59282 | 68.6 |
| 7 | −10.54950 | 0.40000 | 1.92286 | 20.9 |
| 8 | −295.46390 | 0.38300 | | |
| 9* | 3.37780 | 0.60000 | 1.52996 | 55.8 |
| 10* | 2.75100 | Variable | | |
| 11* | 36.40950 | 0.60000 | 1.52996 | 55.8 |
| 12* | 9.36160 | Variable | | |
| 13* | 41.49000 | 2.20000 | 1.52996 | 55.8 |
| 14* | −6.75650 | 0.31000 | | |
| 15 | ∞ | 0.60000 | 1.51680 | 64.2 |
| 16 | ∞ | (BF) | | |
| Image surface | ∞ | | | |

TABLE 32

(Aspherical data)

Surface No. 1

K = 0.00000E+00, A4 = 1.55710E−03, A6 = −5.55554E−05,
A8 = 8.13001E−07 A10 = −5.16454E−09, A12 = 0.00000E+00,
A14 = 0.00000E+00, A16 = 0.00000E+00
Surface No. 2

K = 0.00000E+00, A4 = 9.93804E−04, A6 = 3.22831E−05,
A8 = −8.61786E−07 A10 = −1.10590E−07, A12 = 0.00000E+00,
A14 = 0.00000E+00, A16 = 0.00000E+00
Surface No. 3

K = 0.00000E+00, A4 = −4.73110E−04, A6 = 6.98924E−05,
A8 = −5.72653E−06 A10 = 3.68389E−07, A12 = −1.60896E−08,
A14 = 3.88946E−10, A16 = −3.95616E−12
Surface No. 4

K = 0.00000E+00, A4 = −5.05344E−04, A6 = 7.87312E−05,
A8 = −6.64803E−06 A10 = 3.20949E−07, A12 = −6.54684E−09,
A14 = 0.00000E+00, A16 = 0.00000E+00
Surface No. 9

K = 0.00000E+00, A4 = −1.00356E−02, A6 = −4.23711E−03,
A8 = 1.10553E−03 A10 = −5.10811E−04, A12 = 7.74125E−05,
A14 = 0.00000E+00, A16 = 0.00000E+00
Surface No. 10

K = 0.00000E+00, A4 = −5.82345E−03, A6 = −2.17327E−03,
A8 = −7.89908E−04 A10 = 1.79971E−04, A12 = 0.00000E+00,
A14 = 0.00000E+00, A16 = 0.00000E+00
Surface No. 11

K = 0.00000E+00, A4 = −5.26850E−03, A6 = 9.15284E−04,
A8 = −4.86427E−05 A10 = −3.75981E−06, A12 = 0.00000E+00,
A14 = 0.00000E+00, A16 = 0.00000E+00
Surface No. 12

K = 0.00000E+00, A4 = −4.64467E−03, A6 = 7.46853E−04,
A8 = −2.92234E−05 A10 = −3.45687E−06, A12 = 0.00000E+00,
A14 = 0.00000E+00, A16 = 0.00000E+00
Surface No. 13

K = 0.00000E+00, A4 = 6.55072E−05, A6 = 5.56360E−05,

TABLE 32-continued (Aspherical data)

A8 = −2.07669E−06 A10 = 4.60303E−08, A12 = 0.00000E+00,
A14 = 0.00000E+00, A16 = 0.00000E+00
Surface No. 14

K = 0.00000E+00, A4 = 3.18851E−03, A6 = −7.03962E−05,
A8 = −3.34723E−07 A10 = 5.98192E−08, A12 = 0.00000E+00,
A14 = 0.00000E+00, A16 = 0.00000E+00

TABLE 33

(Various data)

Zooming ratio 4.63960

|  | Wide-angle limit | Middle position | Telephoto limit |
|---|---|---|---|
| Focal length | 3.5955 | 7.7081 | 16.6816 |
| F-number | 2.83057 | 4.11051 | 7.19689 |
| View angle | 50.5735 | 26.7023 | 13.3603 |
| Image height | 3.4300 | 3.9020 | 3.9020 |
| Overall length of lens system | 31.4790 | 26.8210 | 32.6002 |
| BF | 0.52615 | 0.55112 | 0.52894 |
| d4 | 12.2980 | 3.8976 | 0.5000 |
| d10 | 2.3252 | 3.2593 | 2.3000 |
| d12 | 1.6000 | 4.3834 | 14.5417 |

Zoom lens unit data

| Lens unit | Initial surface No. | Focal length |
|---|---|---|
| 1 | 1 | −8.50591 |
| 2 | 5 | 7.05825 |
| 3 | 11 | −23.96283 |
| 4 | 13 | 11.13963 |

The following Table 34 shows the corresponding values to the individual conditions in the zoom lens systems of each of Numerical Examples.

TABLE 34

(Values corresponding to conditions)

| | Condition | Numerical Example | | | | | | | | | | |
|---|---|---|---|---|---|---|---|---|---|---|---|---|
| | | 1 | 2 | 3 | 4 | 5 | 6 | 7 | 8 | 9 | 10 | 11 |
| (1) | $D_{air}/f_W$ | 1.25 | 0.92 | 1.09 | 1.18 | 1.03 | 1.20 | 1.57 | 1.12 | 0.90 | 1.05 | 1.18 |
| (2) | $D_{air} \times \tan(\omega_W/2)/f_{G1}$ | −0.64 | −0.31 | −0.30 | −0.25 | −0.30 | −0.34 | −0.79 | −0.32 | −0.29 | −0.28 | −0.24 |
| (3) | $D_{back}/f_W$ | 0.49 | 0.42 | 0.42 | 0.41 | 0.42 | 0.62 | 0.55 | 0.42 | 0.42 | 0.41 | 0.39 |
| (4) | $\nu_{1n} - \nu_{1p}$ | 24.1 | 24.1 | 24.1 | 31.0 | 31.0 | 28.5 | 21.6 | 24.1 | 24.1 | 24.1 | 24.2 |
| (5) | $\sqrt{(-f_{G1} \times f_{G2})}/\text{Ir}$ | 1.51 | 1.55 | 1.81 | 1.75 | 1.89 | 1.84 | 1.69 | 1.69 | 1.71 | 1.86 | 1.96 |
| (6) | $n_{L1}$ | 1.88 | 1.88 | 1.88 | 1.73 | 1.73 | 1.77 | 1.88 | 1.88 | 1.88 | 1.88 | 1.80 |
| (7) | $L_W/L_T$ | 0.97 | 0.98 | 0.92 | 0.92 | 0.92 | 1.05 | 1.00 | 1.08 | 0.98 | 0.92 | 0.97 |
| (8) | $D_n/\sqrt{(f_W \times f_T)}$ | 0.049 | 0.042 | 0.038 | 0.038 | 0.042 | 0.042 | 0.049 | 0.041 | 0.042 | 0.037 | 0.039 |
| (9) | $n_{G1ave}$ | 1.930 | 1.930 | 1.930 | 1.879 | 1.879 | 1.893 | 1.897 | 1.930 | 1.930 | 1.930 | 1.953 |
| (10) | $\nu_{G2}$ | 81.6 | 68.6 | 64.2 | 68.6 | 68.6 | 68.6 | 81.6 | 68.6 | 68.6 | 64.2 | 68.6 |

The zoom lens system according to the present invention is applicable to a digital input device, such as a digital camera, a mobile terminal device such as a smart-phone, a surveillance camera in a surveillance system, a Web camera or a vehicle-mounted camera. In particular, the zoom lens system according to the present invention is suitable for a photographing optical system where high image quality is required like in a digital camera.

Although the present invention has been fully described by way of example with reference to the accompanying drawings, it is to be understood that various changes and modifications will be apparent to those skilled in the art. Therefore, unless otherwise such changes and modification depart from the scope of the present invention, they should be construed as being included therein.

What is claimed is:

1. A zoom lens system having a plurality of lens units, each lens unit being of intra-lens-unit axial dimension that is invariant in the lens system being zoomed from its wide-angle limit to its telephoto limit, and each lens unit composed either of a single lens element, or of a plurality of lens elements each separated from the other by an inter-lens-element air space, with the plurality of lens units each being separated from the other by an inter-lens-unit interval with no lens unit intervening, the zoom lens system, in object-side to image-side order, consisting of:
   a first lens unit having negative optical power and consisting of either two or three single lens elements;
   a second lens unit having positive optical power;
   a third lens unit having negative optical power and consisting of one single lens element; and
   a fourth lens unit having positive optical power and either consisting of one single lens element, or consisting of one cemented lens element being two single lens elements cemented together; wherein
   the inter-lens-unit intervals between the first and second lens units, between the second and third lens units, and between the third and fourth lens units each are an air space whose length along the zoom lens system's optical axis varies in the lens system being zoomed from its wide-angle limit to its telephoto limit,
   the first lens unit has at least one inter-lens-element air space between the first-lens-unit-constituting lens elements,
   in the lens system being zoomed, the first lens unit, the second lens unit and the third lens unit individually move along the optical axis to achieve change in magnification,
   the following condition (1) is satisfied:

$$D_{air}/f_w>0.75 \tag{1}$$

where,
   $D_{air}$ is that inter-lens air space that is object-side-most in the first lens unit, and
   $f_w$ is the entire zoom-lens system's focal length at the wide-angle limit, and
   the following condition (9) is satisfied:

$$n_{Glave}>1.8 \tag{9}$$

where,
   $n_{Glave}$ is an average of refractive indices to the d-line of the lens elements constituting the first lens unit.

2. The zoom lens system as claimed in claim 1, wherein the first lens unit includes at least one lens element having negative optical power and at least one lens element having positive optical power, and the following condition (4) is satisfied:

$$15<V_{1n}-V_{1p}<40 \tag{4}$$

where,
   $V_{1n}$ is an average of Abbe numbers to the d-line of the lens elements having negative optical power contained in the first lens unit, and
   $V_{1p}$ is an average of Abbe numbers to the d-line of the lens elements having positive optical power contained in the first lens unit.

3. The zoom lens system as claimed in claim 1, wherein the following condition (5) is satisfied:

$$1.4<\sqrt{(f_{G1} \times f_{G2})}/Ir<2.0 \tag{5}$$

where,
   $f_{G1}$ is a focal length of the first lens unit,
   $f_{G2}$ is a focal length of the second lens unit,
   Ir is a maximum image height (Ir $=f_T \times \tan(\omega_T)$),
   $f_T$ is a focal length of the entire system at a telephoto limit, and
   $\omega_T$ is a half value of a maximum view angle(°) at a telephoto limit.

4. The zoom lens system as claimed in claim 1, wherein the following condition (6) is satisfied:

$$n_{L1}>1.70 \tag{6}$$

where
   $n_{L1}$ is a refractive index to the d-line of a lens element located on the most object side in the first lens unit.

5. The zoom lens system as claimed in claim 1, wherein the following condition (7) is satisfied:

$$0.85<L_w/L_T<1.15 \tag{7}$$

where,
   $L_W$ is an overall length of lens system at a wide-angle limit (a distance from a lens surface on the most object side in the first lens unit to an image surface at a wide-angle limit), and
   $L_T$ is an overall length of lens system at a telephoto limit (a distance from a lens surface on the most object side in the first lens unit to the image surface at a telephoto limit).

6. The zoom lens system as claimed in claim 1, wherein the first lens unit includes at least one lens element having negative optical power, and the following condition (8) is satisfied:

$$D_n/\sqrt{(f_w \cdot f_T)}<0.070 \tag{8}$$

where,
   $D_n$ is a center thickness of a lens element having negative optical power and being located on the most image side in the first lens unit,
   $f_w$ is a focal length of the entire system at a wide-angle limit, and
   $f_T$ is a focal length of the entire system at a telephoto limit.

7. The zoom lens system as claimed in claim 1, wherein either a part of the lens elements constituting the first lens unit or the second lens unit is an escaping lens unit that, at the time of retracting, escapes along an axis different from that at the time of image taking.

8. An imaging device capable of outputting an optical image of an object as an electric image signal, comprising:
   a zoom lens system that forms an optical image of the object; and
   an image sensor that converts the optical image formed by the zoom lens system into the electric image signal, wherein
   the zoom lens system is a zoom lens system as claimed in claim 1.

9. A camera for converting an optical image of an object into an electric image signal and then performing at least one of displaying and storing of the converted image signal, comprising:
  an imaging device including a zoom lens system that forms an optical image of the object and an image sensor that converts the optical image formed by the zoom lens system into the electric image signal, wherein
  the zoom lens system is a zoom lens system as claimed in claim 1.

10. A zoom lens system having a plurality of lens units, each lens unit being of intra-lens-unit axial dimension that is invariant in the lens system being zoomed from its wide-angle limit to its telephoto limit, and each lens unit composed either of a single lens element, or of a plurality of lens elements each separated from the other by an inter-lens-element air space, with the plurality of lens units each being separated from the other by an inter-lens-unit interval with no lens unit intervening, the zoom lens system, in object-side to image-side order, consisting of
  a first lens unit having negative optical power;
  a second lens unit having positive optical power; and
  at least two subsequent lens units, the at least two subsequent lens units either consisting of
    a third lens unit having positive or negative optical power, with the third lens unit, being the object-side-most lens unit among the subsequent lens units, either consisting of one single lens element or consisting of one cemented lens element being two single lens elements cemented together, and
    a fourth lens unit having positive or negative optical power, with the fourth lens unit, being the image-side-most lens unit among the subsequent lens units, either consisting of one single lens element or consisting of one cemented lens element being two single lens elements cemented together, or consisting of
    a third lens unit having negative optical power, with the third lens unit, being the object-side-most lens unit among the subsequent lens units, consisting of one single lens element,
    a fourth lens unit having positive optical power, and
    a fifth lens unit having negative optical power, with the fifth lens unit, being the image-side-most lens unit among the subsequent lens units, consisting of one single lens element; wherein
  the inter-lens-unit intervals between the first and second lens units, between the second lens unit and the object-side-most lens unit among the subsequent lens units, and between the object-side-most lens unit among the subsequent lens units and, with respect thereto, the immediately image-side-ward subsequent lens unit each are an air space whose length along the zoom lens system's optical axis varies in the lens system being zoomed from its wide-angle limit to its telephoto limit,
  in the lens system being zoomed, at least three lens units among the lens units individually move along the optical axis to achieve change in magnification,
  the object-side-most lens unit among the subsequent lens units is located immediately image-side-ward of the second lens unit,
  the first lens unit consists of either two or three single lens elements, including a lens element having positive optical power and a lens element having negative optical power, and therein having at least one inter-lens-element air space between the first-lens-unit-constituting lens elements, and the following conditions (1), (2), and (3) are satisfied:

$$D_{air}/f_w > 0.75 \qquad (1)$$

$$D_{air} \times \tan(\omega_w/2)/f_{G1} < -0.23 \qquad (2)$$

$$D_{back}/f_w < 1.50 \qquad (3)$$

where,
  $D_{air}$ is that inter-lens air space that is object-side-most in the first lens unit,
  $f_w$ is the entire zoom-lens system's focal length at the wide-angle limit,
  $\omega_w$ is half the maximum view angle (°) at the wide-angle limit,
  $f_{G1}$ is the first lens unit's focal length, and
  $D_{back}$ is distance from the image-side-ward surface of the image-side-most lens element in the entire zoom lens system, to the system's imaging surface.

11. The zoom lens system as claimed in claim 10, wherein the following condition (4) is satisfied:

$$15 < \nu_{1n} - \nu_{1p} < 40 \qquad (4)$$

where,
  $\nu_{1n}$ is an average of Abbe numbers to the d-line of the lens elements having negative optical power contained in the first lens unit, and
  $\nu_{1p}$ is an average of Abbe numbers to the d-line of the lens elements having positive optical power contained in the first lens unit.

12. The zoom lens system as claimed in claim 10, wherein the following condition (5) is satisfied:

$$1.4 < \sqrt{(f_{G1} \times f_{G2})}/Ir < 2.0 \qquad (5)$$

where,
  $f_{G1}$ is a focal length of the first lens unit,
  $f_{G2}$ is a focal length of the second lens unit,
  Ir is a maximum image height ($Ir = f_T \times \tan(\omega_T)$),
  $f_T$ is a focal length of the entire system at a telephoto limit, and
  $\omega_T$ is a half value of a maximum view angle (°) at a telephoto limit.

13. The zoom lens system as claimed in claim 10, wherein the following condition (6) is satisfied:

$$n_{L1} > 1.70 \qquad (6)$$

where,
  $n_{L1}$ is a refractive index to the d-line of a lens element located on the most object side in the first lens unit.

14. The zoom lens system as claimed in claim 10, wherein the following condition (7) is satisfied:

$$0.85 < L_W/L_T < 1.15 \qquad (7)$$

where,
  $L_W$ is an overall length of lens system at a wide-angle limit (a distance from a lens surface on the most object side in the first lens unit to an image surface at a wide-angle limit), and
  $L_T$ is an overall length of lens system at a telephoto limit (a distance from a lens surface on the most object side in the first lens unit to the image surface at a telephoto limit).

15. The zoom lens system as claimed in claim 10, wherein the following condition (8) is satisfied:

$$D_n/\sqrt{(f_w \times f_T)} < 0.070 \qquad (8)$$

where,
- $D_n$ is a center thickness of a lens element having negative optical power and being located on the most image side in the first lens unit,
- $f_w$ is a focal length of the entire system at a wide-angle limit, and
- $f_T$ is a focal length of the entire system at a telephoto limit.

16. The zoom lens system as claimed in claim 10, wherein the following condition (9) is satisfied:

$$n_{Glave} > 1.8 \qquad (9)$$

where,
- $n_{Glave}$ is an average of refractive indices to the d-line of the lens elements constituting the first lens unit.

17. The zoom lens system as claimed in claim 10, wherein either a part of the lens elements constituting the first lens unit or the second lens unit is an escaping lens unit that, at the time of retracting, escapes along an axis different from that at the time of image taking.

18. An imaging device capable of outputting an optical image of an object as an electric image signal, comprising:
- a zoom lens system that forms an optical image of the object; and
- an image sensor that converts the optical image formed by the zoom lens system into the electric image signal, wherein
- the zoom lens system is a zoom lens system as claimed in claim 10.

19. A camera for converting an optical image of an object into an electric image signal and then performing at least one of displaying and storing of the converted image signal, comprising:
- an imaging device including a zoom lens system that forms an optical image of the object and an image sensor that converts the optical image formed by the zoom lens system into the electric image signal, wherein
- the zoom lens system is a zoom lens system as claimed in claim 10.

* * * * *